(12) United States Patent
Tsurumi

(10) Patent No.: US 8,754,959 B2
(45) Date of Patent: Jun. 17, 2014

(54) IMAGE PROCESSING DEVICE, DYNAMIC IMAGE REPRODUCTION DEVICE, AND PROCESSING METHOD AND PROGRAM IN THEM

(75) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 604 days.

(21) Appl. No.: 12/447,923

(22) PCT Filed: Aug. 22, 2008

(86) PCT No.: PCT/JP2008/064984
§ 371 (c)(1),
(2), (4) Date: Apr. 30, 2009

(87) PCT Pub. No.: WO2009/028409
PCT Pub. Date: Mar. 5, 2009

(65) Prior Publication Data
US 2010/0066860 A1 Mar. 18, 2010

(30) Foreign Application Priority Data
Aug. 24, 2007 (JP) .................................. 2007-219094
Dec. 7, 2007 (JP) .................................. 2007-317768

(51) Int. Cl.
*H04N 5/76* (2006.01)
*H04N 7/00* (2011.01)
*G06K 9/36* (2006.01)
*G06K 9/46* (2006.01)

(52) U.S. Cl.
USPC ........................... 348/231.2; 348/36; 382/236

(58) Field of Classification Search
USPC .................. 345/418–475; 348/36–39, 220.1, 348/222.1–231.6
See application file for complete search history.

(56) References Cited

U.S. PATENT DOCUMENTS

| | | |
|---|---|---|
| 5,469,274 A | 11/1995 | Iwasaki et al. |
| 5,649,032 A | 7/1997 | Burt et al. |

(Continued)

FOREIGN PATENT DOCUMENTS

| | | |
|---|---|---|
| JP | 5 260264 | 10/1993 |
| JP | 9 62861 | 3/1997 |

(Continued)

OTHER PUBLICATIONS

European Search Report issued Jul. 8, 2011, in Patent Application No. 08828856.8.

(Continued)

*Primary Examiner* — Timothy J Henn
*Assistant Examiner* — Pritham Prabhakher
(74) *Attorney, Agent, or Firm* — Oblon, Spivak, McClelland, Maier & Neustadt, L.L.P.

(57) ABSTRACT

An optical-flow calculating unit (122) detects the amount of movement of an image capturing apparatus at the time of shooting a shot moving image. A camerawork-parameter calculating unit (123) calculates transformation parameters on the basis of the amount of movement. An image transforming unit (160) transforms a captured image on the basis of the transformation parameters. An image combining unit (180) combines the transformed captured image with a history image. A display unit (260) displays, as a representative image, the history image generated by the image combining unit (180) from a certain number of images among captured images. When a selecting operation of selecting a position in the displayed representative image is accepted, a selecting unit (240) selects a recording position of the moving image on the basis of the selected position. A display control unit (250) plays the moving image, starting from the selected recording position of the moving image. Accordingly, a desired moving image can be quickly retrieved when captured moving images are browsed. Also, a desired frame can be quickly retrieved from the retrieved moving image.

17 Claims, 48 Drawing Sheets

(56) References Cited

U.S. PATENT DOCUMENTS

| | | | |
|---|---|---|---|
| 5,657,402 A | | 8/1997 | Bender et al. |
| 5,706,416 A | | 1/1998 | Mann et al. |
| 5,768,447 A | * | 6/1998 | Irani et al. .................. 382/305 |
| 5,920,657 A | * | 7/1999 | Bender et al. .............. 382/284 |
| 5,943,445 A | * | 8/1999 | Dufaux ........................ 382/236 |
| 5,999,662 A | | 12/1999 | Burt et al. |
| 6,081,551 A | * | 6/2000 | Etoh ............................ 375/240 |
| 6,192,393 B1 | * | 2/2001 | Tarantino et al. ........... 709/203 |
| 6,366,699 B1 | * | 4/2002 | Kuwano et al. ............. 382/199 |
| 6,393,163 B1 | | 5/2002 | Burt et al. |
| 6,895,126 B2 | | 5/2005 | Di Bernardo et al. |
| 6,977,664 B1 | * | 12/2005 | Jinzenji et al. .............. 345/629 |
| 7,327,494 B2 | | 2/2008 | Aiso |
| 7,366,360 B2 | * | 4/2008 | Takiguchi et al. ........... 382/284 |
| 7,428,345 B2 | * | 9/2008 | Caspi et al. ................. 382/294 |
| 7,623,682 B2 | * | 11/2009 | Park et al. ................... 382/107 |
| 7,680,353 B2 | * | 3/2010 | Jojic et al. ................... 382/254 |
| 7,911,482 B1 | * | 3/2011 | Mariano et al. ............. 345/676 |
| 2001/0005208 A1 | * | 6/2001 | Minami et al. .............. 345/474 |
| 2002/0154812 A1 | * | 10/2002 | Chen et al. .................. 382/154 |
| 2004/0017386 A1 | | 1/2004 | Liu et al. |
| 2004/0150657 A1 | | 8/2004 | Wittenburg et al. |
| 2006/0018547 A1 | * | 1/2006 | Ouchi ......................... 382/190 |
| 2006/0034374 A1 | * | 2/2006 | Park et al. ................ 375/240.16 |
| 2006/0034529 A1 | * | 2/2006 | Park et al. ................... 382/236 |
| 2006/0034530 A1 | * | 2/2006 | Park ............................. 382/236 |
| 2006/0109283 A1 | | 5/2006 | Shipman et al. |
| 2007/0103544 A1 | | 5/2007 | Nakazawa |
| 2007/0109398 A1 | * | 5/2007 | Teo ............................. 348/36 |

FOREIGN PATENT DOCUMENTS

| | | |
|---|---|---|
| JP | 11 120353 | 4/1999 |
| JP | 11 134352 | 5/1999 |
| JP | 2002 359798 | 12/2002 |
| JP | 2004 266670 | 9/2004 |
| JP | 2005 217874 | 8/2005 |
| JP | 2007 183588 | 7/2007 |
| WO | 2005 032125 | 4/2005 |

OTHER PUBLICATIONS

Akihito Akutsu, et al., "Video Tomography: An efficient method for Camerawork Extraction and Motion Analysis", Proceedings of the Second ACM International Conference on Multimedia, XP 55001196, 1994, pp. 349-356.

European Office Action issued Jan. 25, 2012 in patent application No. 08 828 856.8.

Yukinobu Taniguchi, et at, "PanoramaExcerpts: Video Cataloging by Automatic Synthesis and Layout of Panoramic Images", IEICE Transactions on Information and Systems, vol. E83-D, No. 12, XP009093074, Dec. 2000, pp. 2039-2046 with cover page.

U.S. Appl. No. 13/486,209, filed Jun. 1, 2012, Tsurumi.
U.S. Appl. No. 12/524,887, filed Jul. 29, 2009, Tsurumi.
U.S. Appl. No. 12/526,058, filed Aug. 6, 2009, Tsurumi.
U.S. Appl. No. 12/524,734, filed Jul. 28, 2009, Tsurumi.
U.S. Appl. No. 12/524,757, filed Jul. 28, 2009, Tsurumi.
U.S. Appl. No. 12/565,499, filed Sep. 23, 2009, Tsurumi.

* cited by examiner

FIG. 2

| MOVING IMAGE ID | FRAME NO. | CENTER POSITION | IMAGE SIZE |
|---|---|---|---|
| #123 | 1 | (x1, y1) | e1 |
| | 2 | (x2, y2) | e2 |
| | 3 | (x3, y3) | e3 |
| | ⋮ | ⋮ | ⋮ |
| #124 | ⋮ | ⋮ | ⋮ |
| #125 | ⋮ | ⋮ | ⋮ |
| ⋮ | ⋮ | ⋮ | ⋮ |

FIG. 3

| MOVING IMAGE ID | PANORAMIC IMAGE | PANORAMIC SIZE-REDUCED IMAGE |
|---|---|---|
| #123 | A1 | A11 |
| #124 | B1 | B11 |
| #125 | C1 | C11 |
| ⋮ | ⋮ | ⋮ |

FIG. 5
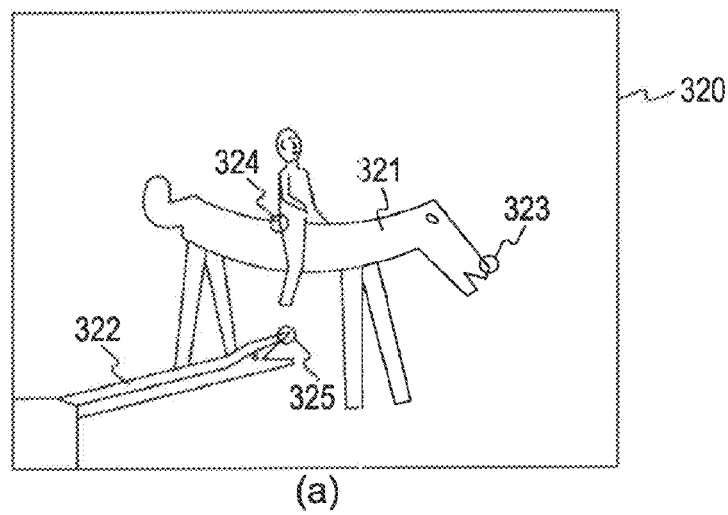
(a)
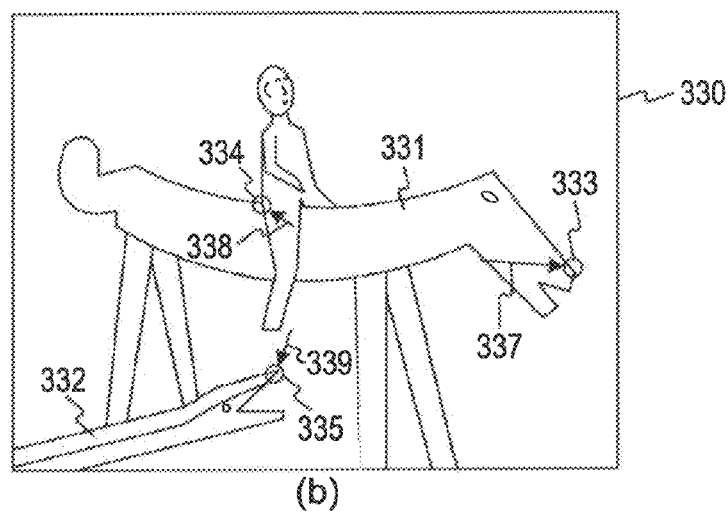
(b)
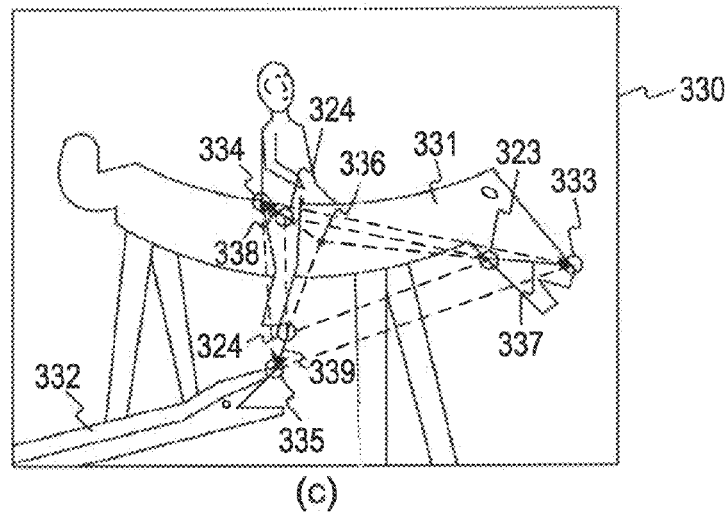
(c)

FIG. 8
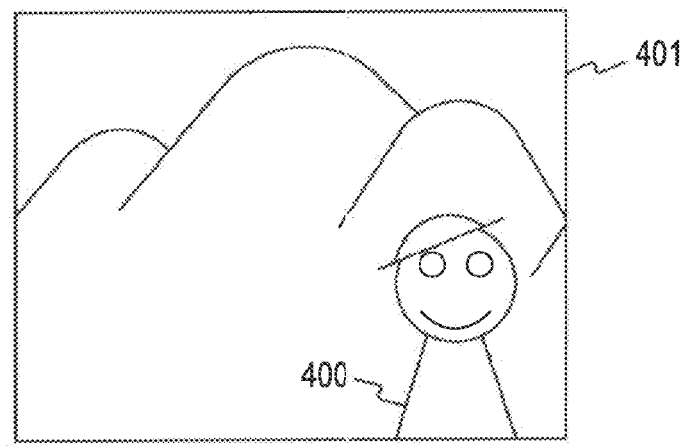
(a)
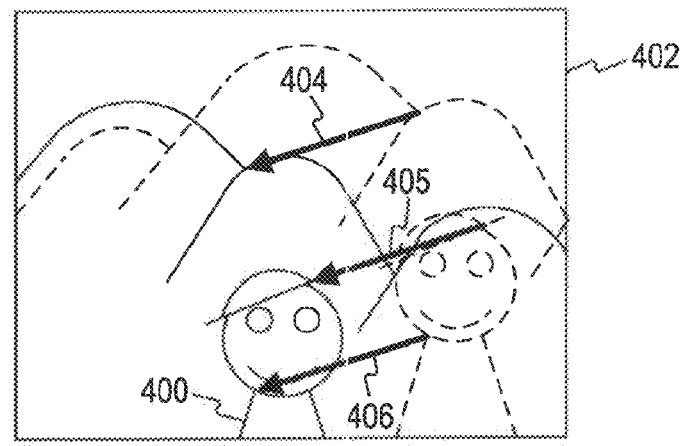
(b)
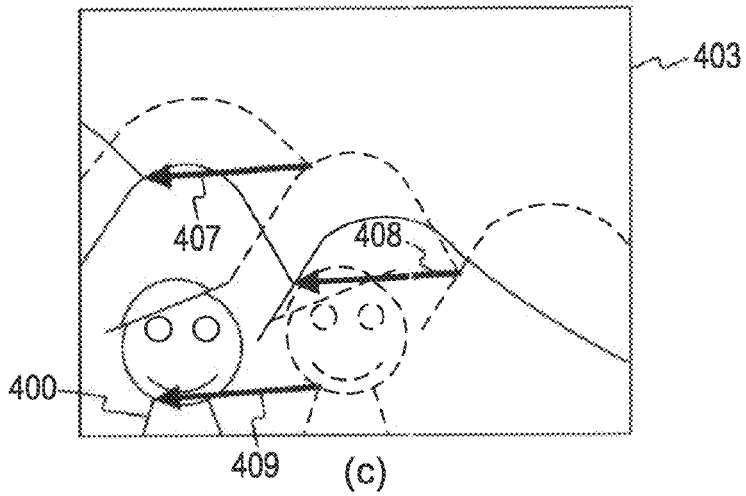
(c)

FIG. 10
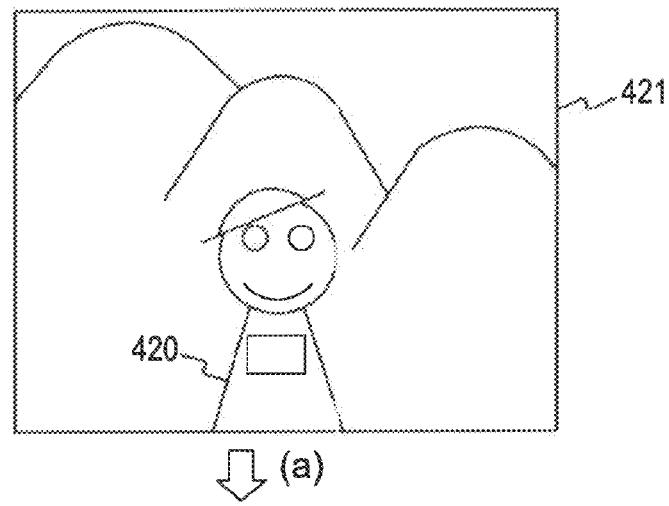
(a)
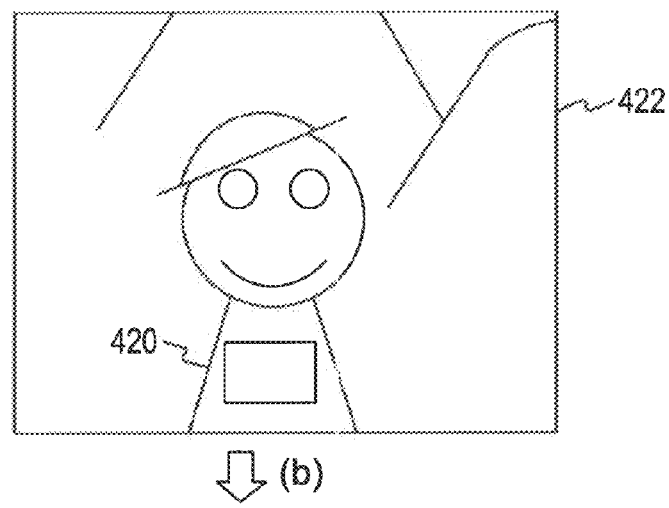
(b)
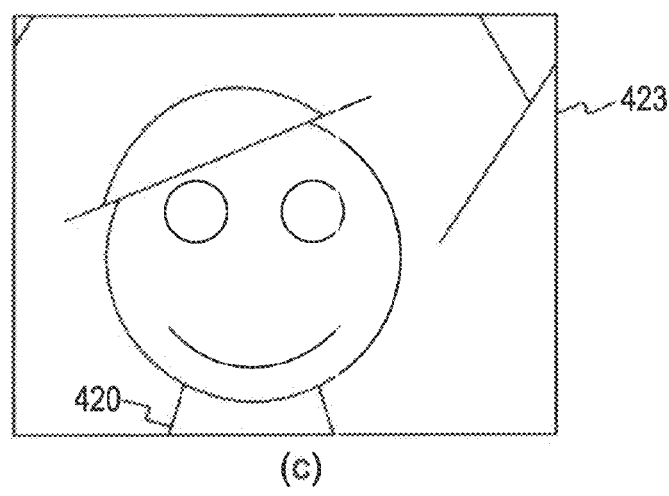
(c)

FIG. 13
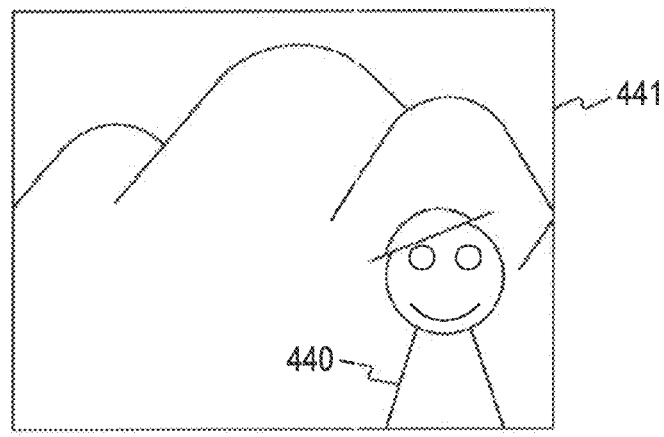
(a)
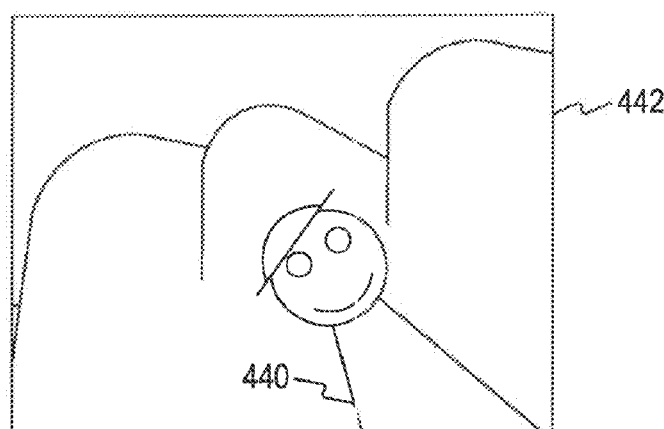
(b)
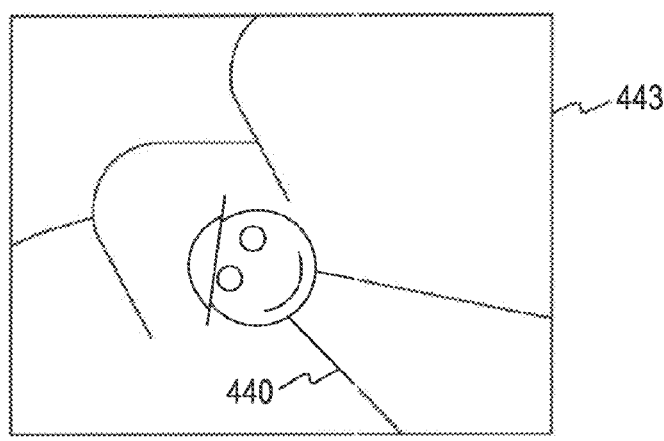
(c)

FIG. 14
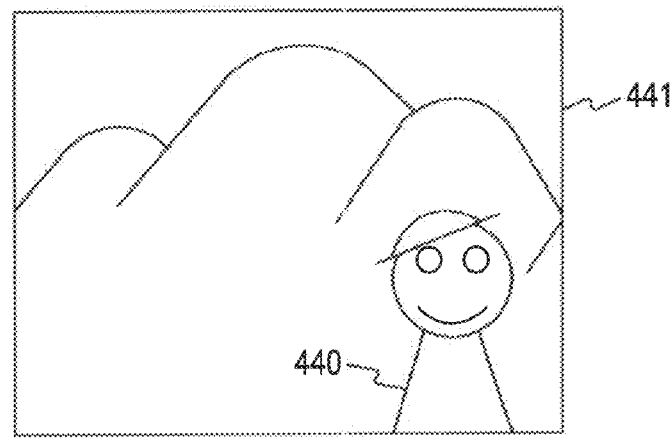
(a)
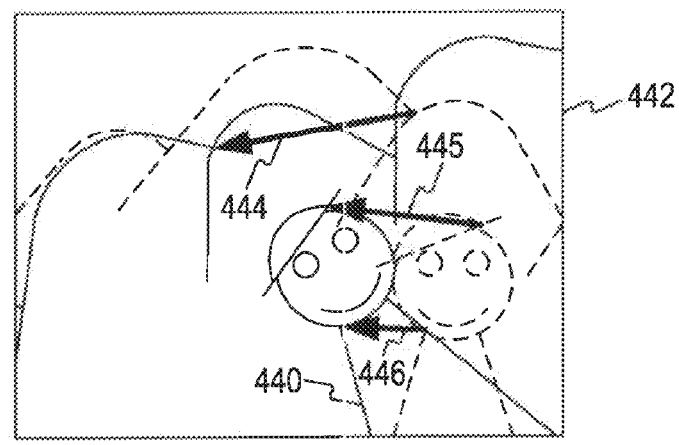
(b)
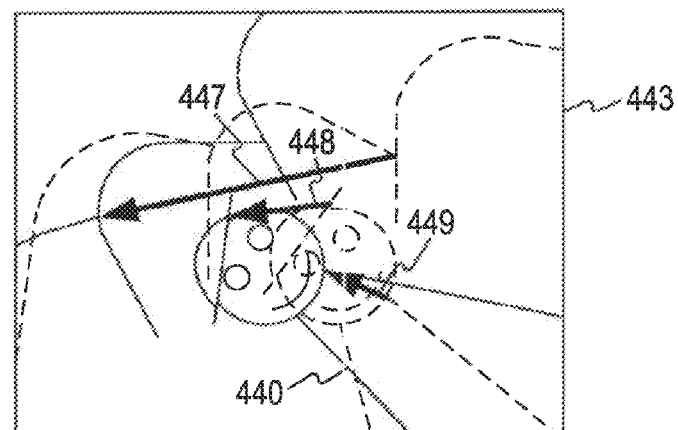
(c)

FIG. 22
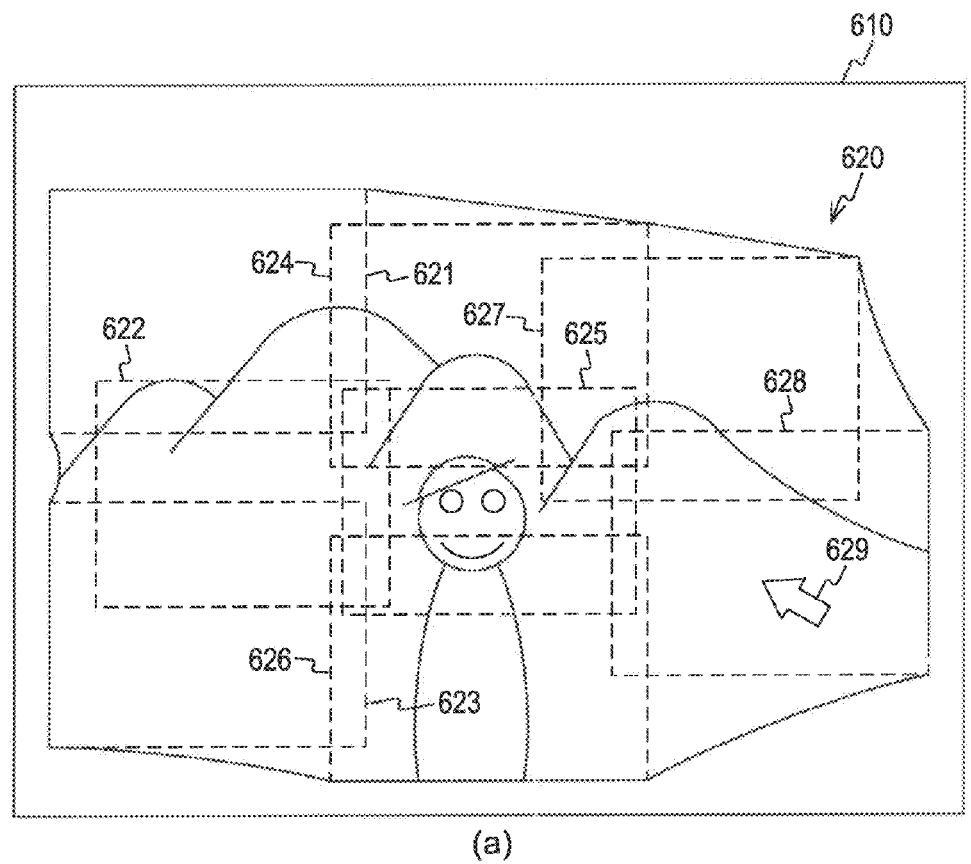
(a)
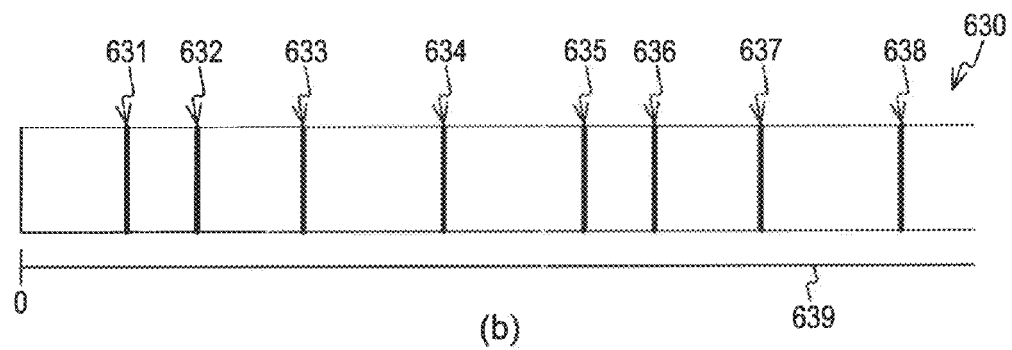
(b)

FIG. 26

| MOVING IMAGE ID | FRAME NO. | POSITION INFORMATION | INDEX IMAGE |
|---|---|---|---|
| #123 | 1 | (x11, y11) (x12, y12) (x13, y13) (x14, y14) | D1 |
| | 6 | (x61, y61) (x62, y62) (x63, y63) (x64, y64) | D6 |
| | 17 | (x71, y71) (x72, y72) (x73, y73) (x74, y74) | D17 |
| | ⋮ | ⋮ | ⋮ |
| #124 | ⋮ | | ⋮ |
| #125 | ⋮ | | ⋮ |
| ⋮ | ⋮ | | ⋮ |

FIG. 28
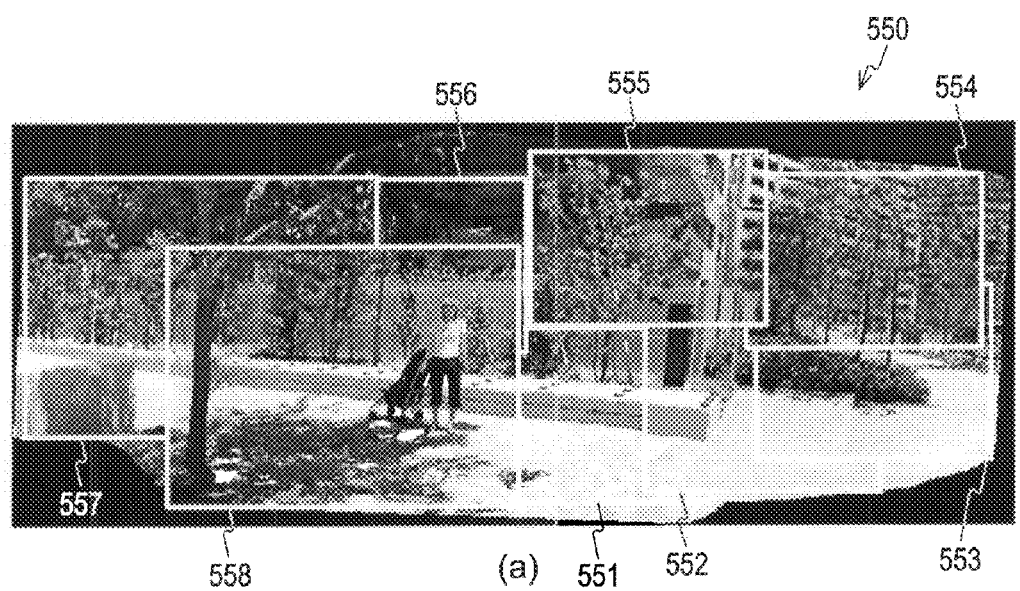
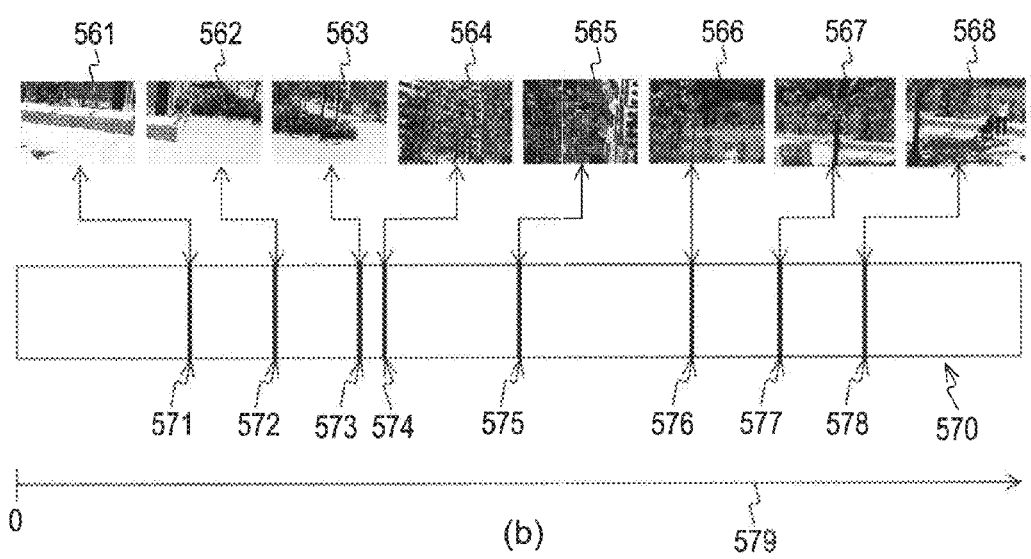

FIG. 31
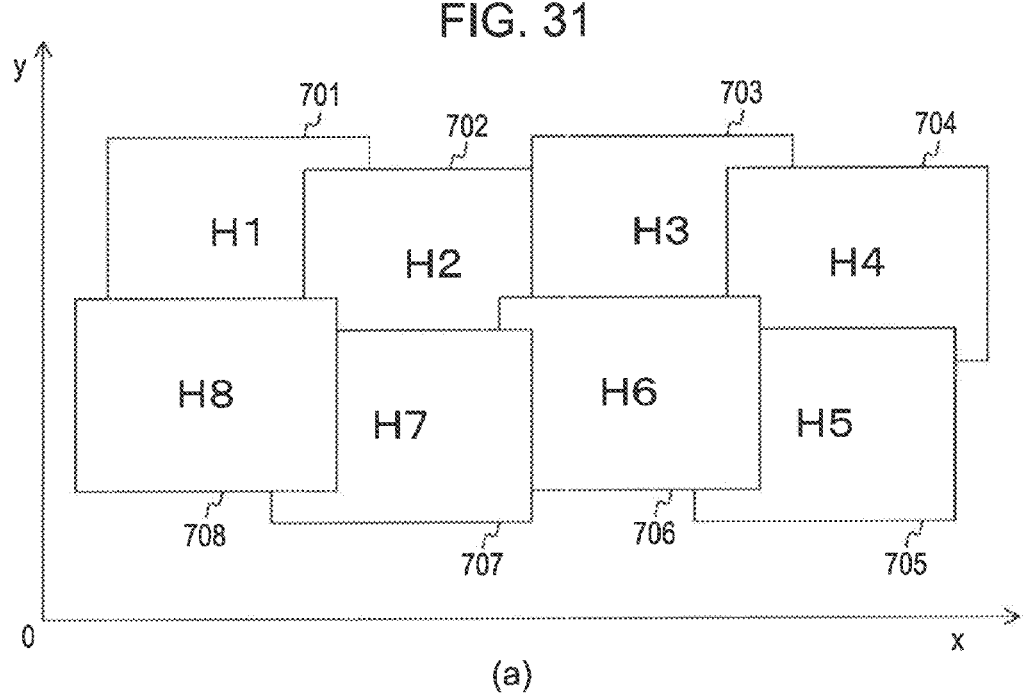
(a)
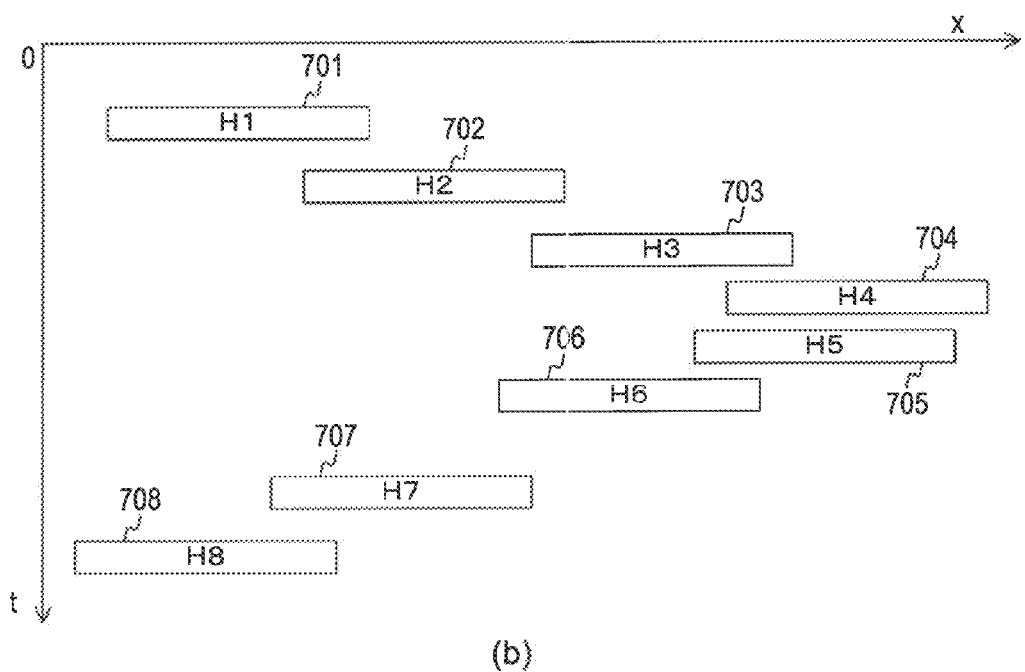
(b)

FIG. 32
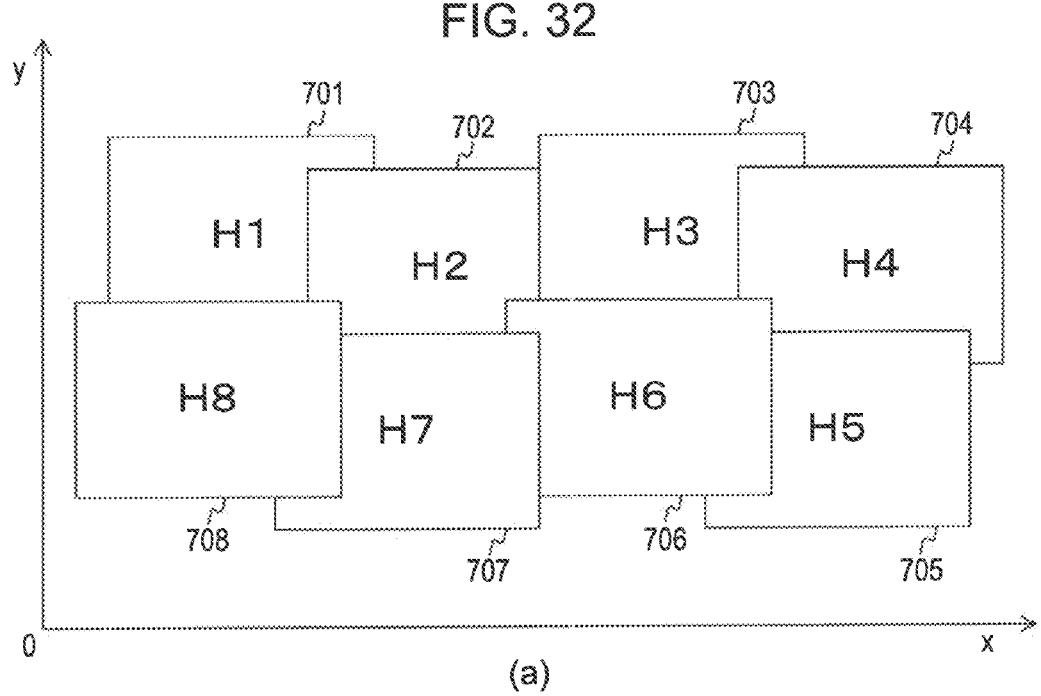
(a)
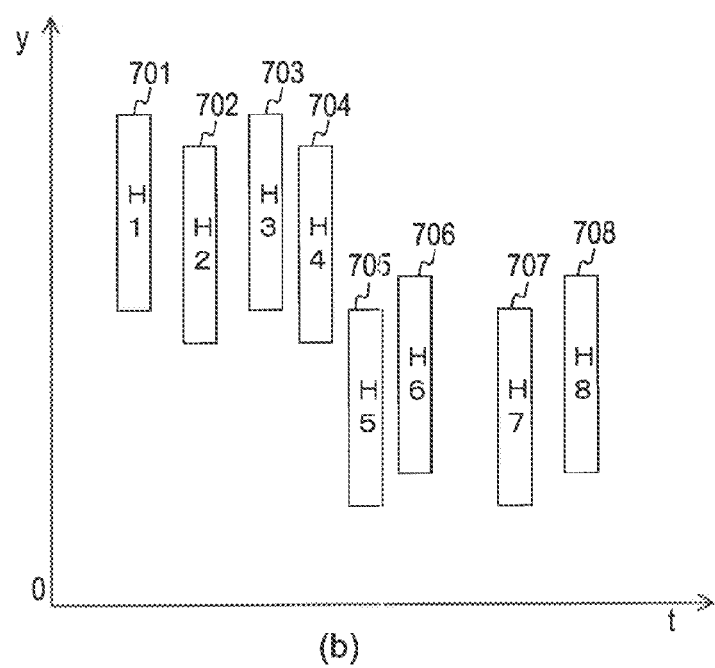
(b)

FIG. 33
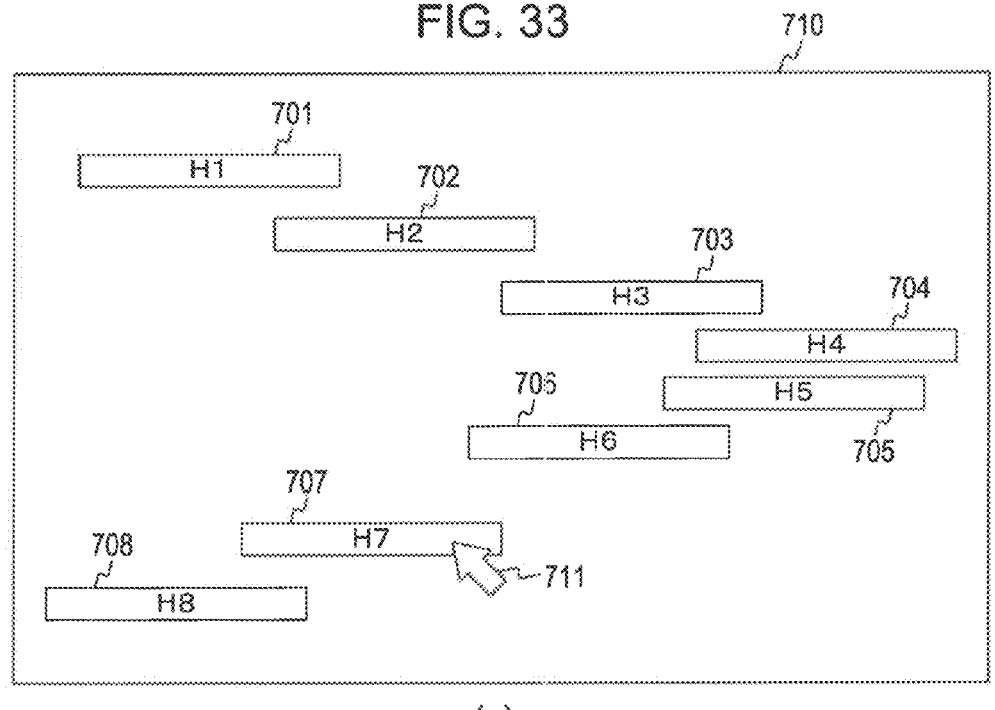
(a)
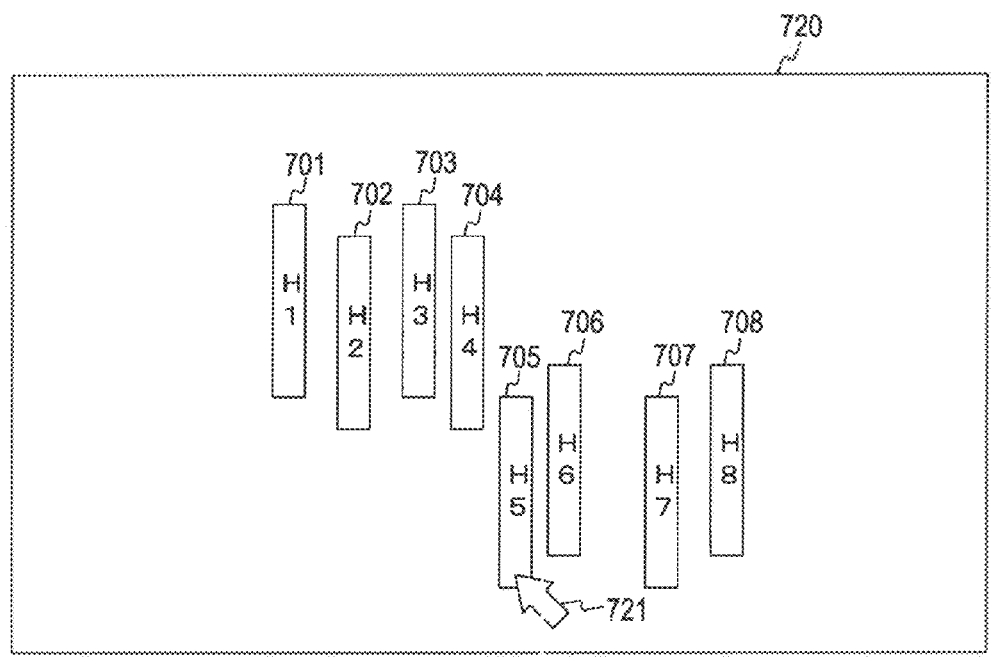
(b)

FIG. 34
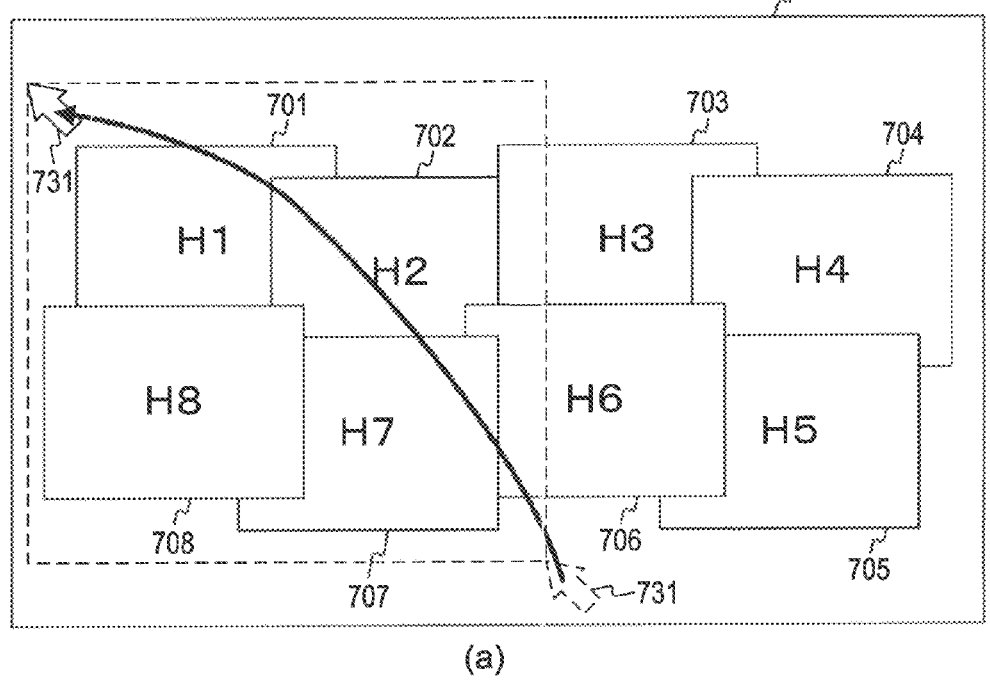
(a)
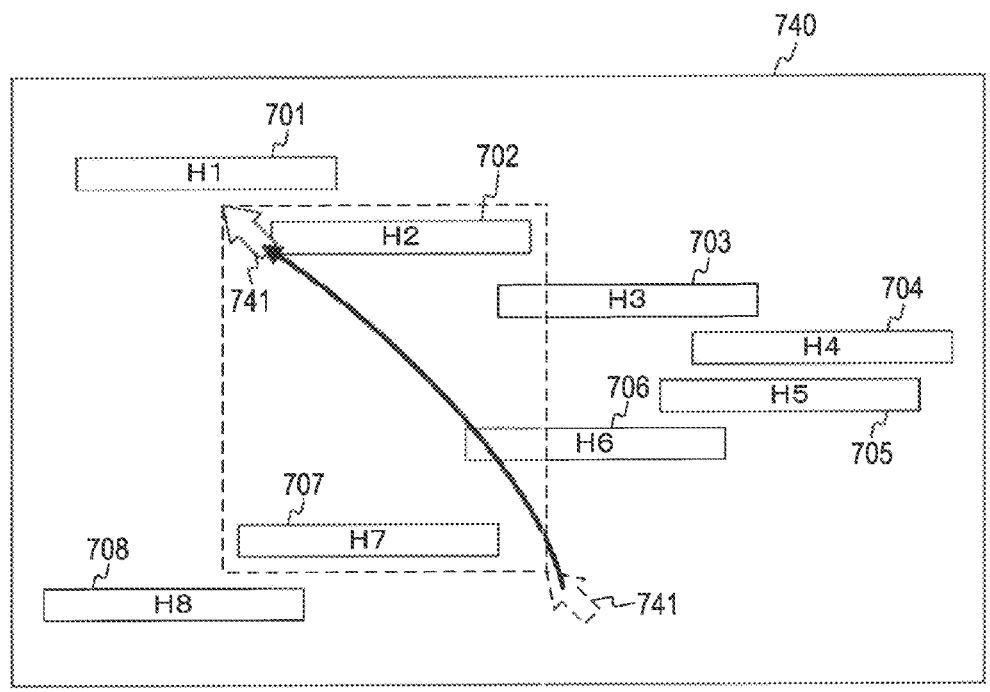
(b)

FIG. 36
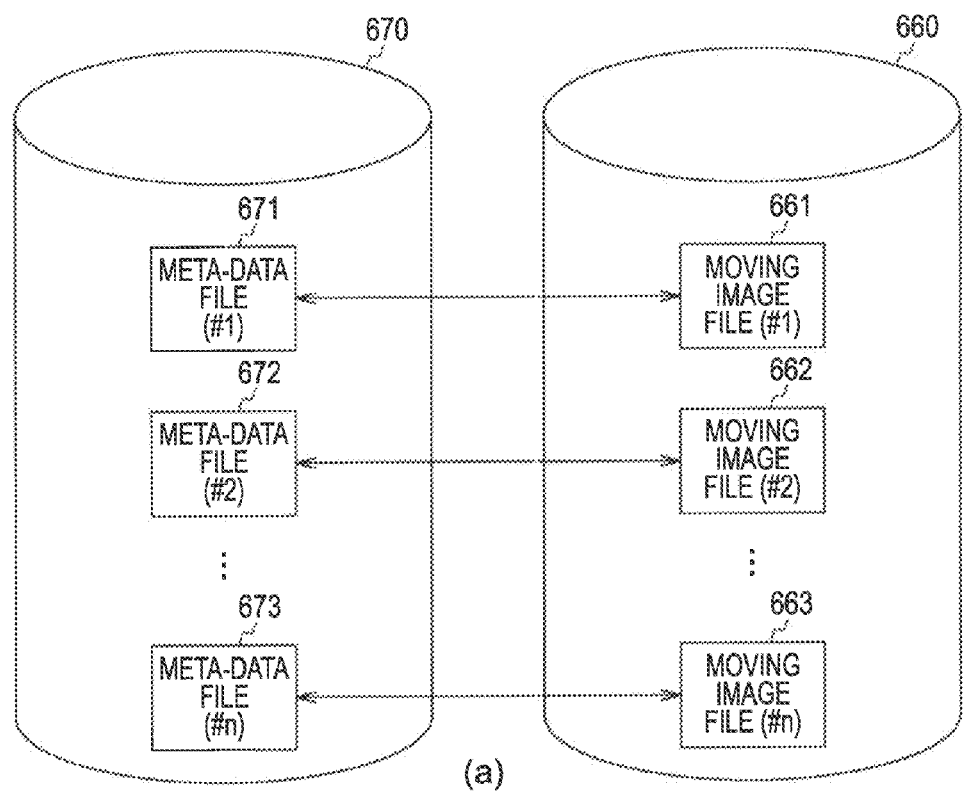
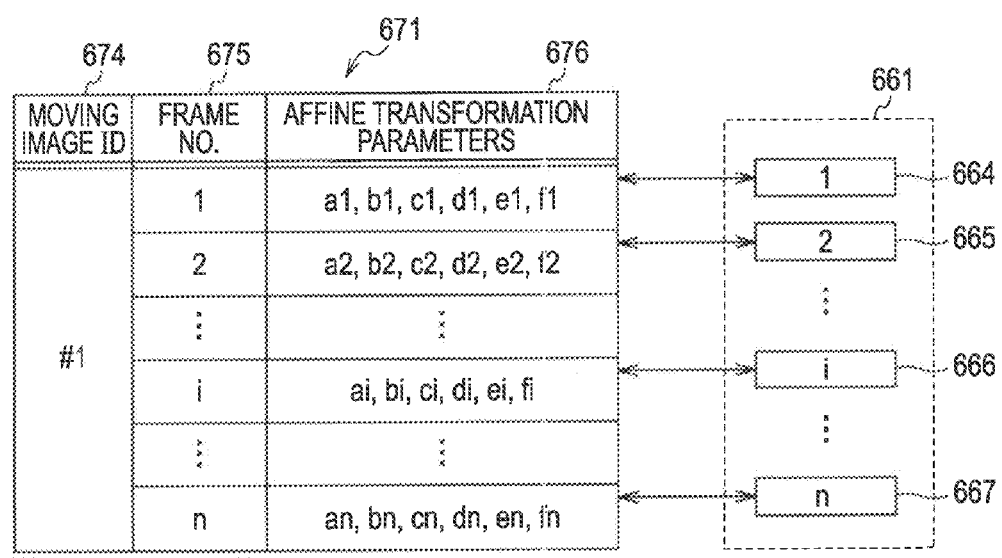

⇩ SIMD OPERATION 827          828          829
[A1]         [B1]         [C1]
[A2]    +    [B2]    =    [C2]
[A3]         [B3]         [C3]
[A4]         [B4]         [C4]

(b)

FIG. 44
RESULT OUTPUT

SIMD OPERATION

FIG. 47

$$\text{VECTOR A} = \left( \begin{array}{c} -1 \end{array} \times \underset{841}{\begin{array}{|c|} \hline 0 \\ \hline 1 \\ \hline 2 \\ \hline 3 \\ \hline \end{array}} + \begin{array}{c} 0 \end{array} \times \underset{842}{\begin{array}{|c|} \hline 1 \\ \hline 2 \\ \hline 3 \\ \hline 4 \\ \hline \end{array}} + \begin{array}{c} 1 \end{array} \times \underset{843}{\begin{array}{|c|} \hline 2 \\ \hline 3 \\ \hline 4 \\ \hline 5 \\ \hline \end{array}} \right)$$

$$\text{VECTOR B} = \left( \begin{array}{c} -2 \end{array} \times \underset{844}{\begin{array}{|c|} \hline 32 \\ \hline 33 \\ \hline 34 \\ \hline 35 \\ \hline \end{array}} + \begin{array}{c} 0 \end{array} \times \underset{845}{\begin{array}{|c|} \hline 33 \\ \hline 34 \\ \hline 35 \\ \hline 36 \\ \hline \end{array}} + \begin{array}{c} 2 \end{array} \times \underset{846}{\begin{array}{|c|} \hline 34 \\ \hline 35 \\ \hline 36 \\ \hline 37 \\ \hline \end{array}} \right)$$

$$\text{VECTOR C} = \left( \begin{array}{c} -1 \end{array} \times \underset{847}{\begin{array}{|c|} \hline 64 \\ \hline 65 \\ \hline 66 \\ \hline 67 \\ \hline \end{array}} + \begin{array}{c} 0 \end{array} \times \underset{848}{\begin{array}{|c|} \hline 65 \\ \hline 66 \\ \hline 67 \\ \hline 68 \\ \hline \end{array}} + \begin{array}{c} 1 \end{array} \times \underset{849}{\begin{array}{|c|} \hline 66 \\ \hline 67 \\ \hline 68 \\ \hline 69 \\ \hline \end{array}} \right)$$

VECTOR D = ( VECTOR A + VECTOR B ) + VECTOR C

IMAGE PROCESSING DEVICE, DYNAMIC IMAGE REPRODUCTION DEVICE, AND PROCESSING METHOD AND PROGRAM IN THEM

TECHNICAL FIELD

The present invention relates to an image processing apparatus, and more particularly, to an image processing apparatus capable of performing image processing of a moving image, a moving-image playing apparatus, a processing method therefor, and a program for causing a computer to execute the method.

BACKGROUND ART

In recent years, digital video cameras have been widely popular. Therefore, for example, at events at kindergartens children attend, images of the appearance of the events are often shot by parents or the like by using digital video cameras. When image shooting is done by parents or the like at such events, though images of their children are mainly shot, images of scenes or the like of the events are often shot, as needed, so that how the events appear can be understood. Also, when image shooting is done at each event at a kindergarten, the number of moving images that have been shot is increased.

Moving images shot in such a manner can be played at home using, for example, a moving-image playing apparatus on a display thereof. In the case where playing is done using a moving-image playing apparatus as above, for example, when the whole moving images shot at a plurality of events are to be played from the beginning, the playing time becomes long. Therefore, it can be considered that, if a viewer can search the whole moving images for desired portions and sequentially play the retrieved portions, the viewer can efficiently enjoy the moving images.

To this end, techniques for generating thumbnail images of individual portions of a moving image and, using the generated thumbnail images, playing the moving image starting from desired recording positions have been proposed. For example, a playing apparatus that generates a plurality of thumbnail images of screens showing individual scenes among a plurality of scenes of a moving image recorded on a recording medium, and displays these thumbnail images is proposed. By selecting a desired thumbnail image from among the displayed thumbnail images, the playing apparatus starts playing the moving image from the head of a scene corresponding to the selected thumbnail image (e.g., see Japanese Unexamined Patent Application Publication No. 11-289517 (FIG. 7)).

DISCLOSURE OF INVENTION

According to the above-described conventional art, in the case where moving images shot at a plurality of events at a kindergarten or the like are to be viewed, playback of a moving image can be started from the head of a desired scene, using thumbnail images displayed for these moving images.

Here, for example, in the case where moving images shot mainly of one's own child at a plurality of events at a kindergarten are to be viewed, it is considered that many similar scenes mainly including the child are to be played, although the events are different. In this case, thumbnail images to be generated are often similar. In addition, when the number of shot moving images is large, the number of thumbnail images to be generated is increased. It is considered that, when similar thumbnail images are displayed or when many thumbnail images are displayed as above, an appropriate search cannot be quickly conducted.

For example, even in the case where persons serving as photographic subjects are the same, whether or not a moving image is a search target may be easily determined according to the place where the moving image was shot, the surrounding atmosphere, and the like. Therefore, for example, in the case where moving images shot at a plurality of events at a kindergarten or the like are to be viewed, if reference can be easily made to the places where these events took place, the surrounding atmosphere, and the like, the details of the moving images can be easily understood. Thus, it is considered that a desired moving image can be quickly retrieved.

Therefore, it is an object of the present invention to easily understand the details of a moving image shot by an image capturing apparatus.

The present invention has been made in order to solve the foregoing problems, and, a first aspect thereof resides in an image processing apparatus, a processing method therefor, and a program for causing a computer to execute the method. The information processing apparatus is characterized by including: moving-image storage means for storing a captured moving image captured by an image capturing apparatus; image holding means for holding captured images constituting the captured moving image as history images; transformation-information calculating means for calculating transformation information for transforming, with reference to at least one captured image among the captured images, another captured image; image transforming means for transforming the captured image on the basis of the calculated transformation information; image combining means for combining the transformed captured image with the history images to generate a new history image and causing the image holding means to hold the new history image; image-position obtaining means for obtaining a coordinate position of the transformed captured image in the history image generated by the combining; image-position storage means for storing the obtained coordinate position and the captured image in association with each other; display means for displaying the history image as a representative image that represents the captured moving image; operation accepting means for accepting a selecting operation of selecting a position in the displayed representative image; and display control means for playing, on the basis of the selected position in the representative image, the captured moving image stored in the moving-image storage means, starting from a captured image corresponding to the selected position. Accordingly, the following operation is achieved: transformation information for transforming, with reference to at least one captured image among captured images constituting a captured moving image, another captured image is calculated; the captured image is transformed on the basis of the calculated transformation information; the transformed captured image is combined with history images to generate a new history image, and the new history image is caused to be held; a coordinate position of the transformed captured image in the history image is obtained, and is stored in association with the captured image; the history image is displayed as a representative image that represents the captured moving image; and, when a selecting operation of selecting a position in the displayed representative image is accepted, the captured moving image is played, starting from a captured image corresponding to the selected position in the representative image. Also, in this case, the transformation-information calculating means may include feature-point extracting means for extracting feature points in the first captured image and the second captured image on the basis of individual pixels constituting the first captured image and the second captured image constituting the captured moving image; movement-amount calculating means for calculating the amount of movement relating to the first captured image and the second captured image on the basis of the extracted individual feature points; and transformation-parameter calculating means for calculating the transformation information by calculating a predetermined transformation parameter on the basis of the calculated amount of movement. Also in this case, the feature-point extracting means may be implemented by a multi-core processor. The multi-core processor may extract feature amounts in the first captured image and the second captured image by performing parallel processing of, using a SIMD operation, individual pixels constituting the first captured image and the second captured image. Also in this case, the movement-amount calculating means may be implemented by a multi-core processor. The multi-core processor may calculate the amount of movement relating to the first captured image and the second captured image by performing parallel processing of, using a SIMD operation, the extracted individual feature points.

Also, in the first aspect, the image-position obtaining means may obtain a center position of the transformed captured image as the coordinate position; the image-position storage means may store the obtained center position and the captured image in association with each other; and the image processing apparatus may further include selecting means for selecting the captured image corresponding to the selected position by selecting, from among center positions stored in the image-position storage means, a center position that is closest to the selected position in the representative image. Accordingly, the following operation is achieved: a center position of the transformed captured image is obtained as the coordinate position, and is stored in association with the captured image; and the captured image corresponding to the selected position is selected by selecting, from among stored center positions, a center position that is closest to the selected position in the representative image.

Also, in the first aspect, the image-position obtaining means may obtain the center position of the transformed captured image and a size thereof as the coordinate position; the image-position storage means may store the obtained center position and size and the captured image in association with each other; and the selecting means may select, when a plurality of center positions that are closest to the selected position in the representative image are detected among the center positions stored in the image-position storage means, the captured image corresponding to the selected position by comparing sizes corresponding to the plurality of detected center positions. Accordingly, the following operation is achieved: a center position and size of the transformed captured image are obtained as the coordinate position, and are stored in association with the captured image; and, when a plurality of center positions that are closest to the selected position in the representative image are detected among stored center positions stored, the captured image corresponding to the selected position is selected by comparing sizes corresponding to the plurality of detected center positions.

Also, in the first aspect, the transformation-information calculating means may sequentially calculate the transformation information for each of frames constituting the captured moving image; the image transforming means may sequentially transform the captured images for each of the frames; the image combining means may sequentially combine, for each of the frames, the transformed captured image with the history images and generates a new history image; the image holding means may sequentially hold the new history image for each of the frames; and the image processing apparatus may further include representative-image storage means for storing, as the representative image, the history image generated by combining images corresponding to at least a certain number of frames among the frames constituting the captured moving image. Accordingly, the following operation is achieved: the transformation information for each of frames is sequentially calculated; the captured images are sequentially transformed for each of the frames; for each of the frames, the transformed captured image is sequentially combined with the history images to generate a new history image, and the new history image is sequentially held; and, as a representative image that represents the captured moving image, the history image generated by combining images corresponding to at least a certain number of frames among the frames constituting the captured moving image is stored.

Also, in the first aspect, the image combining means may generate a size-reduced image of the representative image; the image processing apparatus may further include representative-image storage means for storing the representative image and the size-reduced image in association with each other; and the display control means may display the size-reduced image stored in the representative-image storage means as a selectable image in a list. Accordingly, the following operation is achieved: a size-reduced image of the representative image is generated, and is stored in association with the representative image; and the stored size-reduced image is displayed as a selectable image in a list.

Also, a second aspect of the present invention resides in an image processing apparatus, a processing method therefor, and a program for causing a computer to execute the method. The image processing apparatus is characterized by including: moving-image input means for receiving a moving image captured by an image capturing apparatus as a captured moving image; transformation-information calculating means for calculating transformation information for transforming, with reference to at least one captured image among captured images constituting the captured moving image, another captured image; image transforming means for transforming the captured image on the basis of the calculated transformation information; index-image storage means for regarding at least one of the captured image and the transformed captured image as an index image of the captured moving image and storing a coordinate position and size of the index image in an image capturing space defined by the transformation information; and index-image extracting means for extracting an index image from the captured moving image on the basis of the transformed captured image, and the coordinate position and size of the index image, the coordinate position and size being stored in the index-image storage means. Accordingly, the following operation is achieved: when a captured moving image is input, transformation information for transforming, with reference to at least one captured image among captured images constituting the captured moving image, another captured image is calculated; the captured image is transformed on the basis of the calculated transformation information; and, on the basis of the transformed captured image and a coordinate position and size of an index image stored in the index-image storage means, an index image is extracted from the captured moving image.

Also, in the second aspect, the index-image extracting means may calculates a rate of overlap between the transformed captured image and the index image stored in the index-image storage means and extracts the index image on the basis of the calculated rate of overlap. Accordingly, the following operation is achieved: a rate of overlap between the transformed captured image and the index image stored in the index-image storage means is calculated, and the index image is extracted on the basis of the calculated rate of overlap.

Also, in the second aspect, the index-image extracting means may sequentially record the coordinate position and size of the extracted index image in the index-image storage means. Accordingly, the following operation is achieved: the coordinate position and size of the extracted index image are sequentially recorded in the index-image storage means.

Also, in the second aspect, the index-image extracting means may sequentially record the coordinate position and size of the extracted index image and the extracted index image in association with each other in the index-image storage means. Accordingly, the following operation is achieved: the coordinate position and size of the extracted index image and the index image are sequentially recorded in association with each other in the index-image storage means.

Also, in the second aspect, the image processing apparatus may further include display control means for arranging the index image in a two-dimensional space on the basis of the coordinate position and size of the index image, the coordinate position and size being stored in the index-image storage means, and displaying the index image. Accordingly, the following operation is achieved: on the basis of the coordinate position and size of the index image stored in the index-image storage means, the index image is arranged in a two-dimensional space and is displayed.

Also, in the second aspect, the index-image extracting means may sequentially record the coordinate position and size of the extracted index image, the extracted index image, and time information regarding the extracted index image in the captured moving image, in association with one another, in the index-image storage means; and the image processing apparatus may further include display control means for virtually arranging the index image in a three-dimensional space on the basis of the time information, coordinate position, and size of the index image, the time information, coordinate position, and size being stored in the index-image storage means, projecting the index image onto a plane, and displaying the index image. Accordingly, the following operation is achieved: the coordinate position and size of the extracted index image, the index image, and time information regarding the index image are sequentially recorded in association with one another in the index-image storage means; and, on the basis of the time information, coordinate position, and size of the index image, the time information, coordinate position, and size being stored in the index-image storage means, the index image is virtually arranged in a three-dimensional space, projected onto a plane, and displayed.

Also, in the second aspect, the image processing apparatus may further include: moving-image storage means for storing the captured moving image; operation accepting means for accepting a selecting operation of selecting the index image arranged in the three-dimensional space; and selecting means for selecting, on the basis of the selected index image, the time information stored in the index-image storage means. The display control means may play the captured moving image stored in the moving-image storage means, starting from a captured image corresponding to the selected time information. Accordingly, the following operation is achieved: when a selecting operation of selecting the index image arranged in the three-dimensional space is accepted, time information is selected on the basis of the selected index image, and the moving image is played, starting from a captured image corresponding to the selected time information.

Also, in the second aspect, the image processing apparatus may further include: image holding means for holding a history image; image combining means for adding a predetermined marker to the transformed captured image corresponding to the extracted index image, combining the transformed captured image with the history image to generate a new history image, and causing the image holding means to hold the new history image; and representative-image storage means for storing the history image as a representative image that represents the captured moving image. Accordingly, the following operation is achieved: a predetermined marker is added to the captured image corresponding to the extracted index image; the transformed captured image is combined with the history image to generate a new history image, and the new history image is caused to be held; and the history image is stored as the representative image.

Also, in the second aspect, the image processing apparatus may further include: moving-image storage means for storing the captured moving image; display means for displaying the representative image stored in the representative-image storage means; operation accepting means for accepting a selecting operation of selecting a position in the displayed representative image; selecting means for selecting the extracted index image on the basis of the selected position in the representative image; and display control means for playing the captured moving image stored in the moving-image storage means, starting form a captured image corresponding to the selected index image. Accordingly, the following operation is achieved: when a selecting operation of selecting a position in the displayed representative image is accepted, the index image is selected on the basis of the selected position in the representative image; and the moving image is played, starting from a captured image corresponding to the selected index image.

Also, a third aspect of the present invention resides in a moving-image playing apparatus, a processing method therefor, and a program for causing a computer to execute the method. The moving-image playing apparatus is characterized by including: moving-image storage means for storing a captured moving image captured by an image capturing apparatus; image holding means for holding captured images constituting the captured moving image as history images; transformation-information calculating means for calculating transformation information for transforming, with reference to at least one captured image among the captured images, another captured image; image transforming means for transforming the captured image on the basis of the calculated transformation information; image combining means for combining the transformed captured image with the history images to generate a new history image and causing the image holding means to hold the new history image; image-position obtaining means for obtaining a coordinate position of the transformed captured image in the history image generated by the combining; image-position storage means for storing the obtained coordinate position and the captured image in association with each other; display means for displaying the history image as a representative image that represents the captured moving image; operation accepting means for accepting a selecting operation of selecting a position in the displayed representative image; and display control means for playing, on the basis of the selected position in the representative image, the captured moving image stored in the moving-image storage means, starting from a captured image corresponding to the selected position. Accordingly, the following operation is achieved: transformation information for transforming, with reference to at least one captured image among captured images constituting a captured moving image, another captured image is calculated; the captured image is transformed on the basis of the calculated transformation information; the transformed captured image is combined with the history images to generate a new history image, and the new history image is caused to be held; a coordinate position of the transformed captured image in the history image is obtained, and is stored in association with the captured image; the history image is displayed as a representative image that represents the captured moving image; and, when a selecting operation of selecting a position in the displayed representative image is accepted, the captured moving image is played, starting from a captured image corresponding to the selected position in the representative image.

BRIEF DESCRIPTION OF DRAWINGS

FIG. 2 is a diagram schematically showing the details stored in an image-position storage unit 210 in the embodiment of the present invention.

FIG. 3 is a diagram schematically showing the details stored in a representative-image storage unit 220 in the embodiment of the present invention.

FIG. 5 includes diagrams showing simplified images obtained by omitting the background and the like of the image corresponding to the frame included in the moving image.

FIG. 8 includes diagrams in which, in individual images shown in FIG. 7, an image corresponding to the immediately preceding frame is indicated by broken lines, and additionally, exemplary detected optical flows are shown.

FIG. 10 includes diagrams showing an example of transition in a moving image shot by a camera.

FIG. 13 includes diagrams showing an example of transition in a moving image shot by a camera.

FIG. 14 includes diagrams in which, in individual images shown in FIG. 13, an image corresponding to the immediately preceding frame is indicated by broken lines, and additionally, exemplary detected optical flows are shown.

FIG. 22 includes a diagram showing a display example of a panoramic image display screen displayed on the display unit 260 in the embodiment of the present invention, and a diagram schematically showing a moving image and some of frames constituting the moving image.

FIG. 26 is a diagram schematically showing the details stored in an index-image storage unit 280 in the embodiment of the present invention.

FIG. 28 includes a diagram showing an example of a panoramic image, and additionally, a diagram showing the relationship between frames included in a moving image corresponding to the panoramic image and index images.

FIG. 31 includes diagrams schematically showing the case where index images stored in the index-image storage unit 280 in the embodiment of the present invention are virtually arranged in a three-dimensional space.

FIG. 32 includes diagrams schematically showing the case where the index images stored in the index-image storage unit 280 in the embodiment of the present invention are virtually arranged in the three-dimensional space.

FIG. 33 includes diagrams showing display examples of index images 701 to 708 virtually arranged in the three-dimensional space.

FIG. 34 includes diagrams showing display examples of the index images 701 to 708 virtually arranged in the three-dimensional space.

FIG. 36 includes diagrams schematically showing individual files recorded in a moving-image storage unit 660 and in a meta-data storage unit 670 in the embodiment of the present invention.

FIG. 42 includes diagrams schematically showing the outline of an arithmetic scheme of performing processing of a plurality of items of data using individual commands, and a diagram showing the outline of a SIMD operation in which processing of a plurality of items of data is performed using a single command.

FIG. 44 includes diagrams schematically showing the data structure and the flow of a process in the case where a filtering process is performed using a Sobel filter 830 on image data stored in a main memory 781 in the embodiment of the present invention.

FIG. 47 is a diagram schematically showing a vector operation method of performing vector operations using SIMD commands on items of vector data 841 to 849 in the case where a filtering process is performed using the Sobel filter 830 in the embodiment of the present invention.

BEST MODES FOR CARRYING OUT THE INVENTION

Next, embodiments of the present invention will now herein be described in detail with reference to the drawings.

Figure 1:
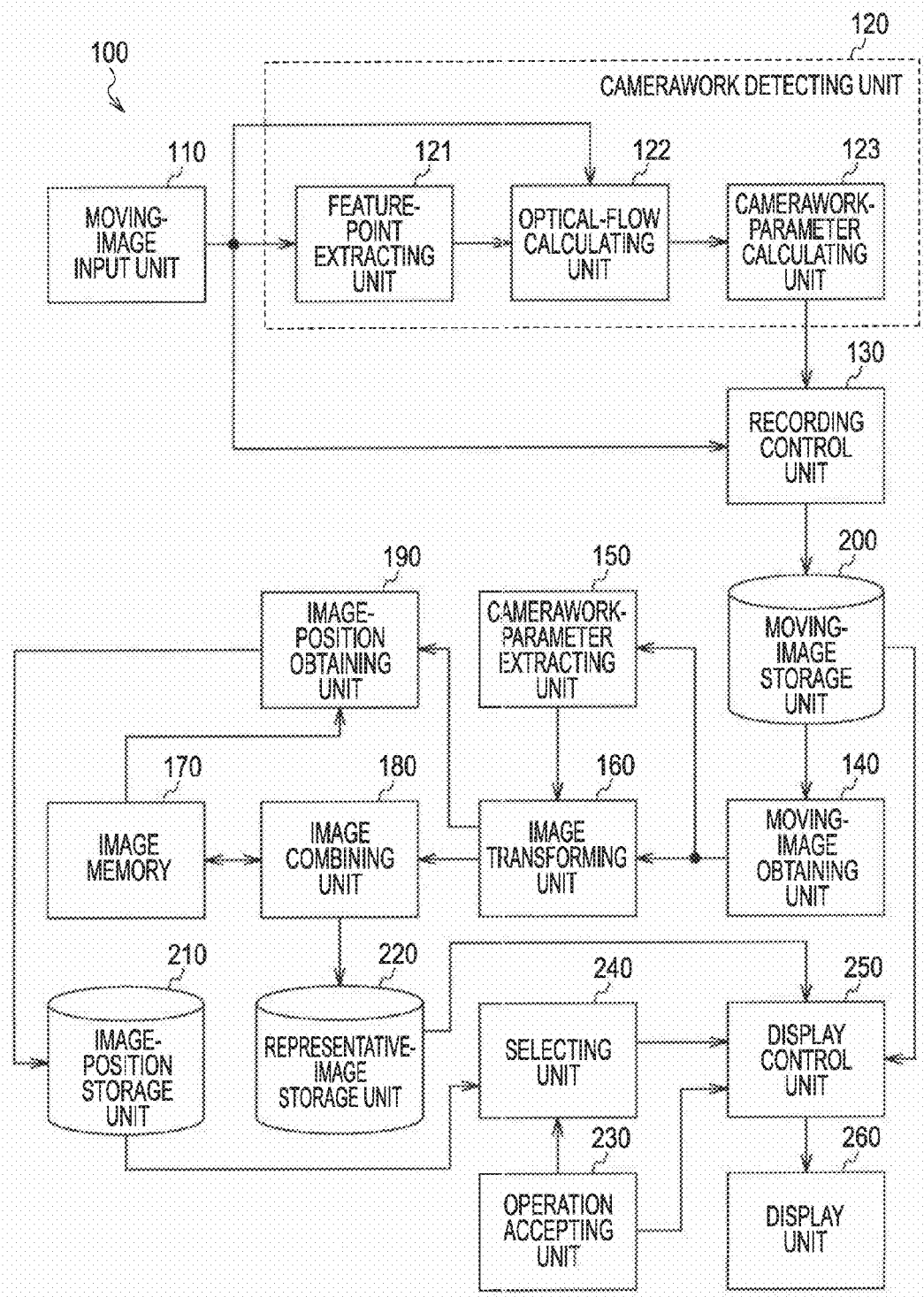
FIG. 1 is a block diagram showing a functional structure example of an image processing apparatus 100 in an embodiment of the present invention.

FIG. 1 is a block diagram showing a functional structure example of an image processing apparatus 100 in an embodiment of the present invention. The image processing apparatus 100 includes a moving-image input unit 110, a camerawork detecting unit 120, a recording control unit 130, a moving-image obtaining unit 140, a camerawork-parameter extracting unit 150, an image transforming unit 160, an image memory 170, an image combining unit 180, an image-position obtaining unit 190, a moving-image storage unit 200, an image-position storage unit 210, a representative-image storage unit 220, an operation accepting unit 230, a selecting unit 240, a display control unit 250, and a display unit 260. The image processing apparatus 100 can be implemented by, for example, a personal computer that can extract, by performing a video image analysis, a feature amount of a moving image shot by an image capturing apparatus such as a digital video camera, and apply various types of image processing using the extracted feature amount.

The moving-image input unit 110 is a moving-image input unit that receives a moving image captured by an image capturing apparatus such as a digital video camera (hereinafter simply called a "camera"), and outputs the input moving image to the camerawork detecting unit 120.

The camerawork detecting unit 120 is configured to detect camera movement information (camerawork) at the time of capturing an image, by analyzing a moving image output from the moving-image input unit 110. The camerawork detecting unit 120 includes a feature-point extracting unit 121, an optical-flow calculating unit 122, and a camerawork-parameter calculating unit 123. That is, the camerawork detecting unit 120 extracts feature points from each of images constituting the moving image, additionally extracts optical flows (motion vectors) corresponding to the feature points, selects a feature point that shows a dominant motion by analyzing the optical flows corresponding to the extracted feature points, and estimates the camera movement on the basis of the optical flow corresponding to the feature point that shows the dominant motion. Here, the dominant motion means a regular motion indicated by a relatively large number of optical flows, among optical flows corresponding to a plurality of feature points.

The feature-point extracting unit 121 is configured to extract feature points from images corresponding to frames constituting a moving image output from the moving-image input unit 110 and to output the extracted feature points to the optical-flow calculating unit 122. Here, the feature-point extracting unit 121 extracts, for the head frame among frames constituting a moving image output from the moving-image input unit 110, feature points from the entire image, and, for frames other than the head frame, extracts feature points from a region part, an image of which was newly shot, compared with an image corresponding to the immediately preceding frame. Note that, for example, a point with a steeper edge gradient in the vertical direction or the horizontal direction (generally called a "corner point"; hereinafter called a "corner point") can be extracted as a feature point. The corner point is a feature point that is strong in calculating an optical flow and can be obtained using edge detection. Note that the extraction of corner points will be described in detail with reference to FIG. 4 and FIG. 5. Also, in this example, the feature-point extracting unit 121 extracts feature points from the entire image for the head frame, and, for frames other than that at the head, extracts feature points from a region part, an image of which was newly shot, compared with the immediately preceding image. However, in accordance with the processing capability or the like, the feature-point extracting unit 121 may extract feature points from the entire image for each of frames other than that at the head.

The optical-flow calculating unit 122 is configured to calculate an optical flow corresponding to each feature point output from the feature-point extracting unit 121, and outputs an optical flow obtained by calculation to the camerawork-parameter calculating unit 123. Specifically, the optical-flow calculating unit 122 obtains, as optical flows of the current frame, optical flows corresponding to individual feature points in an image corresponding to the immediately preceding frame by comparing images individually corresponding to two consecutive frames included in a moving image output from the moving-image input unit 110 (the current frame and the immediately preceding frame). Also, optical flows are obtained for each of frames constituting a moving image. Note that detection methods such as a gradient method and a block matching method can be used as detection methods for detecting optical flows. Note that the calculation of optical flows will be described in detail with reference to FIG. 4 and FIG. 5.

The camerawork-parameter calculating unit 123 is configured to perform a camerawork-parameter calculating process of extracting camerawork parameters using the optical flows corresponding to individual feature points, which are output from the optical-flow calculating unit 122, and outputs the calculated camerawork parameters to the recording control unit 130. Here, in the embodiment of the present invention, images constituting a moving image to be played are transformed in accordance with the camera movement and are displayed. In order to perform transformation of the images, the camera movement is extracted using optical flows calculated by the optical-flow calculating unit 122, and, on the basis of the extracted movement, camerawork parameters (transformation parameters) are calculated. Note that, in the embodiment of the present invention, an example in which an affine transformation is used as an image transformation method of transforming images constituting a moving image to be played will be described. Also, an example in which affine transformation parameters corresponding to an inverse matrix of the matrix of affine transformation parameters calculated on the basis of the optical flows are used as camerawork parameters will be described. That is, in the embodiment of the present invention, affine transformation parameters used as transformation information are defined as affine transformation parameters corresponding, not to an affine matrix representing the motion of feature points between consecutive images, but to an affine matrix indicating, when one of consecutive images is used as a reference image, where an image subsequent to the reference image moves. Also, an example where affine transformation parameters are used as camerawork parameters will be described. Note that other image transformation methods, such as projective transformation, may be used. Note that an affine transformation parameter can be obtained by calculation using vectors of three points. Also, a projective transformation parameter can be obtained by calculation using vectors of four points. Here, camerawork parameters are transformation information for transforming, with reference to at least one captured image among captured images constituting a captured moving image, another captured image, and at least includes position information and posture information described in the camera coordinate system. That is, camerawork parameters include information regarding the position and posture of a camera in the case where an image is being shot by a photographer. Also, on the basis of affine transformation parameters obtained by the camerawork-parameter calculating unit 123, the camera movement in response to an operation entered by the photographer, such as zooming in, zooming out, panning, tilting, and rotation, can be estimated. Note that the calculation of affine transformation parameters will be described in detail with reference to FIG. 4 and FIG. 5.

The recording control unit 130 is configured to record, in the moving-image storage unit 200, a moving image output from the moving-image input unit 110 and affine transformation parameters output from the camerawork-parameter calculating unit 123 as a moving image file by associating the corresponding frame and affine transformation parameters with each other.

The moving-image storage unit 200 is configured to store a moving image file in which a frame and affine transformation parameters that correspond to each other are associated with each other. Also, the moving-image storage unit 200 supplies a moving image file to the moving-image obtaining unit 140 in response to a request from the moving-image obtaining unit 140.

The moving-image obtaining unit 140 is configured to obtain a moving image file stored in the moving-image storage unit 200, and outputs the obtained moving image file to the camerawork-parameter extracting unit 150 and the image transforming unit 160.

The camerawork-parameter extracting unit 150 is configured to extract, on a frame-by-frame basis, affine transformation parameters recorded in association with a moving image file output from the moving-image obtaining unit 140, and outputs the extracted affine transformation parameters to the image transforming unit 160.

The image transforming unit 160 is configured to apply, on a frame-by-frame basis, an affine transformation to images constituting a moving image in a moving image file output from the moving-image obtaining unit 140, using affine transformation parameters output from the camerawork-parameter extracting unit 150, and to output the affine-transformed images to the image combining unit 180 and the image-position obtaining unit 190. Specifically, the image transforming unit 160 performs an affine transformation of an image corresponding to the current frame output from the moving-image obtaining unit 140, using affine transformation parameters output from the camerawork-parameter extracting unit 150. Note that the image transformation will be described in detail with reference to FIG. 7 to FIG. 15 and the like.

The image memory 170 includes a work buffer that holds a composite image generated by the combining performed by the image combining unit 180. The image memory 170 is configured to supply a held composite image to the image combining unit 180 and the image-position obtaining unit 190. That is, the image memory 170 is an image memory that holds history images.

The image combining unit 180 is configured to combine a transformed image output from the image transforming unit 160 with a composite image held in the image memory 170, and outputs a composite image generated by the combining to the image memory 170. Specifically, the image combining unit 180 combines images by overwriting a composite image corresponding to each of frames, up to the immediately preceding frame, held in the image memory 170, with an affine-transformed image obtained by the image transforming unit 160. In addition, when image combining for one moving image, from the head frame to the last frame, is completed, the image combining unit 180 generates a size-reduced image of a composite image held in the image memory 170, and outputs the generated size-reduced image, and the composite image held in the image memory 170 as a panoramic image, to the representative-image storage unit 220 so that the size-reduced image and the composite image will be recorded. The panoramic image is a representative image that represents a moving image input from the moving-image input unit 110, and is an image generated so as to include the major part of each image shooting space included in the moving image. Note that the image combining will be described in detail with reference to FIG. 7 to FIG. 15 and the like.

The image-position obtaining unit 190 is configured to obtain, on the basis of a transformed image output from the image transforming unit 160 and a composite image held in the image memory 170, the center position of the transformed image output from the image transforming unit 160 and the size (area) of the image in the work buffer of the image memory 170, and outputs the obtained center position of the transformed image and the size of the image, together with a frame number corresponding to the transformed image, to the image-position storage unit 210. That is, the image-position obtaining unit 190 obtains the coordinate position of a transformed image output from the image transforming unit 160 in a panoramic image (representative image) generated by the image combining unit 180. Note that the center position of the image and the size of the image will be described in detail with reference to FIG. 2.

The image-position storage unit 210 is configured to store a frame number of the image and the center position and size of the image in association with each other, which are output from the image-position obtaining unit 190, and outputs the stored frame number and the stored center position and size of the image to the selecting unit 240. Note that each item of information stored in the image-position storage unit 210 will be described in detail with reference to FIG. 2.

The representative-image storage unit 220 is configured to store a composite image output from the image combining unit 180 as a panoramic image regarding a moving image stored in the moving-image storage unit 200, and additionally to store a size-reduced image output from the image combining unit 180 as a panoramic size-reduced image regarding the moving image stored in the moving-image storage unit 200, and supplies the stored panoramic image to the display control unit 250.

The operation accepting unit 230 includes various operation keys and the like and is configured to output, upon accepting an operation input entered using these keys, the details of the accepted operation input to the selecting unit 240 or the display control unit 250. The operation accepting unit 230 includes, for example, a mouse (pointing device). A cursor (mouse pointer) that moves in accordance with an operation input entered using the mouse is displayed on the display unit 260. The cursor is a mouse pointer used to indicate an instruction or an operation target on a screen displayed on the display unit 260.

The selecting unit 240 is configured to, when a position selecting operation is entered on a panoramic image, which is accepted by the operation accepting unit 230, select a frame number from among frame numbers stored in the image-position storage unit 210, on the basis of the center position and size of the image, which are stored in the image-position storage unit 210, and to output the selected frame number and a moving image ID corresponding to this to the display control unit 250. Note that the selection will be described in detail with reference to FIG. 22.

The display control unit 250 is configured to control displaying of, in response to an operation input of the operation accepting unit 230, a panoramic image stored in the representative-image storage unit 220 or a moving image stored in the moving-image storage unit 200 on the display unit 260. Also, when a frame number and a moving image ID are input from the selecting unit 240, the display control unit 250 searches the moving-image storage unit 200 for a moving image corresponding to the moving image ID, and additionally starts playing the retrieved moving image from a position corresponding to the frame number.

The display unit 260 is configured to, under control of the display control unit 250, display a panoramic image stored in the representative-image storage unit 220 or a moving image stored in the moving-image storage unit 200. For example, the display unit 260 can be implemented by a display of a personal computer or a television. Note that display examples of a composite image will be described in detail with reference to FIG. 20 and the like.

FIG. 2 is a diagram schematically showing the details stored in the image-position storage unit 210 in the embodiment of the present invention.

In the image-position storage unit 210, information regarding an image obtained by an affine transformation performed by the image transforming unit 160 and combining performed by the image combining unit 180 is stored in time series on a frame-by-frame basis. Specifically, a moving image ID 211, a frame number 212, a center position 213, and an image size 214 are stored in association with one another in the image-position storage unit 210.

The moving image ID 211 is an ID corresponding to each moving image stored in the moving-image storage unit 200.

The frame number 212 is an identification number of a frame included in a moving image stored in the moving-image storage unit 200. For example, it is assumed that the frame number of the head frame is "1", and the frame number of the second one is "2". Frame numbers are similarly given to the third frame and onward. As above, for each of frames constituting a moving image obtained by the moving-image obtaining unit 140, a frame number of a frame corresponding to an affine-transformed image obtained by the image transforming unit 160 is recorded in time series in the frame number 212.

The center position 213 is information that indicates the center position of an affine-transformed image, which is obtained by the image transforming unit 160, in the work buffer of the image memory 170. For example, when the work buffer of the image memory 170 has xy coordinates, the coordinate values corresponding to the center position of an affine-transformed image obtained by the image transforming unit 160 are recorded.

The image size 214 is an image size that indicates the size of an affine-transformed image obtained by the image transforming unit 160 in the work buffer of the image memory 170. For example, the area of an affine-transformed image obtained by the image transforming unit 160 is recorded as the image size. Note that, in the embodiment of the present invention, an example in which the center position and the image size are used as position information of an affine-transformed image obtained by the image transforming unit 160 will be described. However, other position information, such as coordinates corresponding to four vertices of the image, may be used as position information of the affine-transformed image.

FIG. 3 is a diagram schematically showing the details stored in the representative-image storage unit 220 in the embodiment of the present invention.

In the representative-image storage unit 220, for each moving image stored in the moving-image storage unit 200, a composite image and a size-reduced image generated by the image combining unit 180 are stored as a panoramic image and a panoramic size-reduced image. Specifically, a moving image ID 221, a panoramic image 222, and a panoramic size-reduced image 223 are stored in association with one another in the representative-image storage unit 220. For example, one panoramic image and one panoramic size-reduced image are stored for one moving image.

The moving image ID 211 is an ID corresponding to a moving image stored in the moving-image storage unit 200.

The panoramic image 222 is a composite image generated by the combining performed by the image combining unit 180, for each moving image stored in the moving-image storage unit 200. Note that, in FIG. 3, panoramic images stored in the representative-image storage unit 220 are abbreviated and shown as "A1, B1", and "C1".

The panoramic size-reduced image 223 is a size-reduced image generated by reducing the size of a composite image generated by the image combining unit 180 for each moving image stored in the moving-image storage unit 200, which is obtained by reducing the size of a panoramic image stored in the panoramic image 222. Note that, in FIG. 3, individual panoramic size-reduced images stored in the representative-image storage unit 220 are abbreviated and shown as "A11, B11", and "C11".

Next, a detection method of detecting affine transformation parameters used in image transformation will be described in detail with reference to the drawings.

Figure 4:
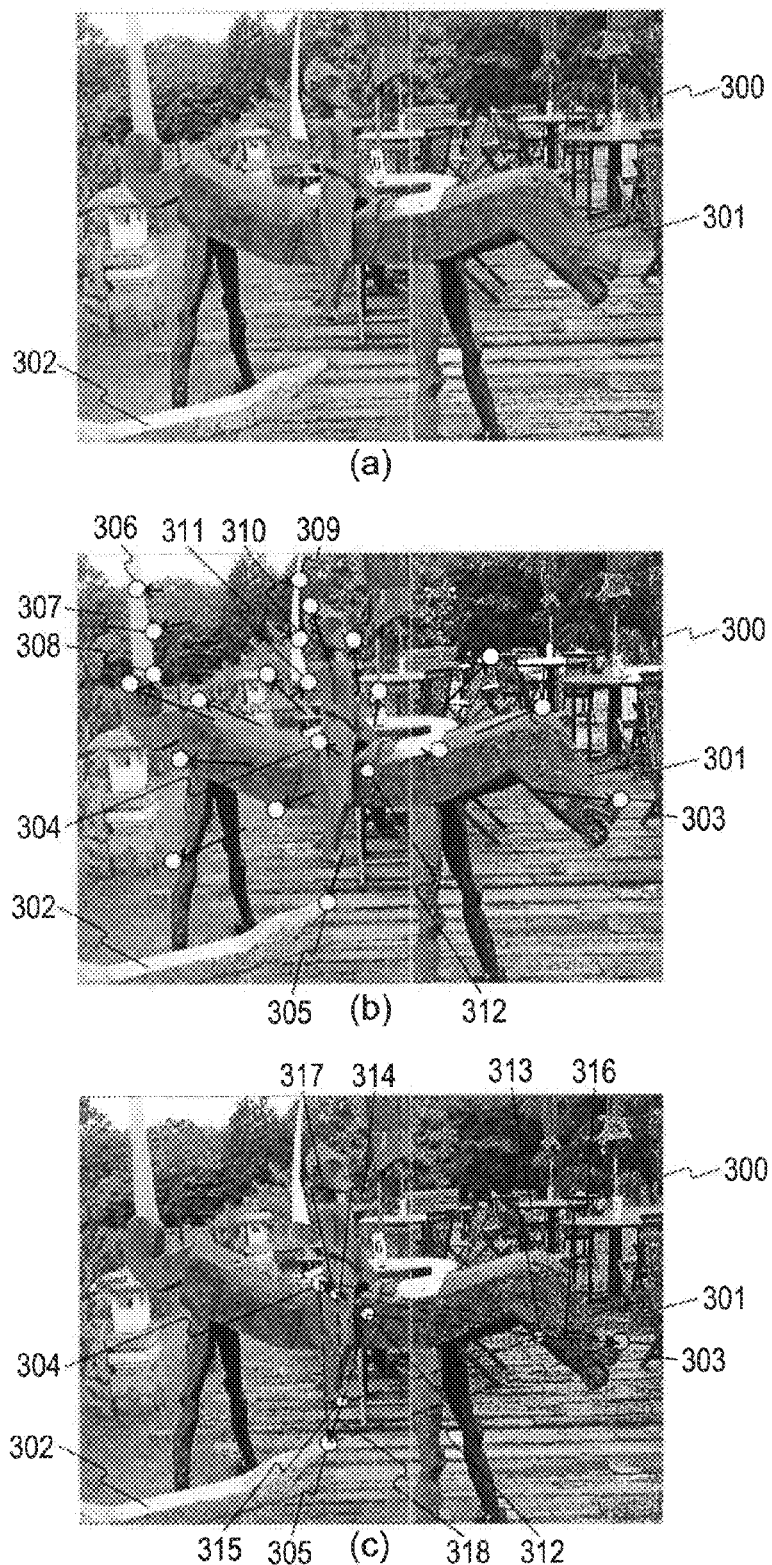
FIG. 4 includes diagrams showing an example of an image corresponding to a frame included in a moving image.

FIG. 4(a) to (c) includes diagrams showing an example of an image corresponding to a frame included in a moving image. FIG. 5(a) is a diagram showing a simplified image obtained by omitting the background and the like of an image corresponding to a frame that is one frame before a frame corresponding to an image 300 shown in FIG. 4. Also, FIG. 5(b) and (c) includes diagrams showing simplified images obtained by omitting the background and the like of the image 300 shown in FIG. 4.

The images 300, 320, and 330 shown in FIG. 4 and FIG. 5 include images 301, 321, and 331 of a horse, on which a person is mounting, and images 302, 322, and 332 of a snake positioned just before the horse's images 301, 321, and 331. Also, as shown in FIG. 4, flags, chairs, and the like exist in the background of these images, and the flags are fluttering in the wind.

The image 320 shown in FIG. 5(a) is a simplified image of an image corresponding to a frame that is one frame before a frame corresponding to the images 300 and 330 shown in FIGS. 4(a) to (c) and FIGS. 5(b) and (c). Also, the images 320 and 330 corresponding to two consecutive frames are images that show transition in the case where a subject in the screen becomes gradually larger. That is, at the time this image was captured, a zoom-in operation, which is an operation for gradually increasing the size of a subject in the screen, is performed.

In the embodiment of the present invention, a method of detecting feature points in each of images constituting a moving image and calculating affine transformation parameters using optical flows corresponding to the feature points will be described by way of example. Also, in this example, the case where corner points are used as feature points will be described.

Here, in FIG. 5(a) to (c), a method of calculating affine transformation parameters using optical flows corresponding to three corner points detected in the images 320 and 330 will be described by way of example.

For example, it is assumed that, in the image 320 shown in FIG. 5(a), a corner point 323 near the mouth of the horse's image 321, a corner point 324 near the hip of the person in the horse's image 321, and a corner point 325 near the mouth of the snake's image 322 are detected as feature points. In this case, in the image 330 shown in FIG. 5(b), optical flows 337, 338, and 339 corresponding to the corner points 323, 324, and 325 in the image 320 are detected using a gradient method, a block matching method, or the like. On the basis of the detected optical flows 337, 338, and 339, corner points 333, 334, and 335 corresponding to the corner points 323, 324, and 325 in the image 320 are detected.

Here, for example, the horse's images 321 and 331 and the snake's images 322 and 332 included in the images 320 and 330 shown in FIGS. 5(a) and (b) are positioned on the ground, and accordingly, do not move independently of the camera movement. Therefore, the camera movement can be accurately estimated on the basis of the optical flows obtained for the corner points detected in the horse's images 321 and 331 and the snake's images 322 and 332. For example, as shown in FIG. 5(c), on the basis of the three optical flows 337 to 339 detected in the image 330, it can be estimated that the image 330 is obtained by enlarging the image 320, with a point 336 serving as the center. Accordingly, the camera movement at the time of shooting the image 330 can be determined as a zoom-in operation performed with the point 336 serving as the center. As above, corner points in an object that does not move independently of the camera movement are detected, and, on the basis of optical flows obtained for these corner points, the camera movement with certain regularity can be accurately detected. Therefore, affine transformation parameters can be calculated and obtained using optical flows obtained for these corner points.

However, the case where, as in a flag fluttering in the wind or the like, an object that moves independently of the camera movement is included in an image is conceivable. For example, the image 300 shown in FIG. 4 includes flags fluttering in the wind. In the case where corner points in such an object that moves independently of the camera movement are detected, and the camera movement is estimated using optical flows obtained for these corner points, the camera movement cannot be accurately estimated.

For example, optical flows detected in the image 300 shown in FIG. 4(b) are denoted by arrows, and additionally, corner points detected from the optical flows are denoted by empty circles at the tip of the arrows. Here, corner points 303 to 305 are corner points corresponding to the corner points 333 to 335 shown in FIGS. 5(b) and (c). Also, corner points 306 to 311 are corner points detected in flags existing in the background of the horse's image 301. Since these flags are fluttering in the wind, the flag movement due to the effect of the wind is detected as optical flows. That is, optical flows individually corresponding to the corner points 306 to 311 are detected in the flags which move independently of the camera movement. Therefore, when three optical flows used in the case of calculating affine transformation parameters include an optical flow corresponding to at least one corner point among the corner points 306 to 311, the accurate camera movement cannot be detected. In this case, accurate affine transformation parameters cannot be calculated.

As shown above, for example, there are instances where optical flows corresponding to objects that move independently of the camera movement (optical flows individually corresponding to the corner points 306 to 311 shown in FIG. 4(b)) and optical flows with certain regularity with respect to the camera movement (optical flows other than the individual optical flows corresponding to the corner points 306 to 311 shown in FIG. 4(b)) are detected in a shot image.

Therefore, in the embodiment of the present invention, an example in which an affine-transformation-parameter calculating process of calculating affine transformation parameters is performed a plurality of times on the basis of three optical flows, thus obtaining a plurality of affine transformation parameters, and, from among these affine transformation parameters, an optimal affine transformation parameter is selected, will be described. Note that, in this example, the size of a moving object included in each of images constituting a moving image is relatively small, with respect to the area of the image.

Here, an affine transformation will be briefly described. In two dimensions, when the position of a movement source is (x, y) and the position of a movement destination subsequent to an affine transformation is (x', y'), the matrix of the affine transformation can be expressed by equation 1.

[Eq. 1]

$$[x'\ y'\ 1] = [x\ y\ 1] \begin{bmatrix} a & d & 0 \\ b & e & 0 \\ c & f & 1 \end{bmatrix} \quad \text{(Eq. 1)}$$

Here, a to f are affine transformation parameters. Also, an affine matrix AM including these affine transformation parameters can be expressed by the following equation. In this case, a zoom component XZ in the X direction, a zoom component YZ in the Y direction, a translation component XT in the X direction, a translation component YT in the Y direction, and a rotation component R can be individually obtained by the following equations. Note that, in the case of an identity matrix, a=e=1 and b=c=d=f=0.

$$AM = \begin{bmatrix} a & b & c \\ d & e & f \end{bmatrix} \quad \text{[Eq. 2]}$$

$$XZ = \sqrt{a^2 + d^2}$$

$$YZ = \sqrt{b^2 + e^2}$$

$$XT = c$$

$$YT = f$$

$$R = \tan^{-1}\left[\frac{d}{a}\right]$$

Next, an affine-transformation-parameter calculating method will be described.

At first, in an image corresponding to the current frame, which is one frame among frames constituting a moving image, three feature points are selected from among feature points based on which optical flows are detected. For example, three corner points are randomly selected from among corner points (denoted by empty circles) detected in the image 300 shown in FIG. 4(b). Note that four feature points are selected at random when projective transformation parameters are used as camerawork parameters.

Then, using three optical flows corresponding to the selected three feature points, affine transformation parameters are calculated. For example, affine transformation parameters are calculated using optical flows (denoted by arrows connected to empty circles) corresponding to three corner points selected from among the corner points (denoted by empty circles) in the image 300 shown in FIG. 4(b). The affine transformation parameters can be obtained using equation 1.

Then, on the basis of the obtained affine transformation parameters, the score for the affine transformation parameters is calculated. Specifically, using the obtained affine transformation parameters, the positions of the movement destinations of all feature points in an image corresponding to a frame immediately preceding the current frame are obtained. A difference value between the positions of two corresponding feature points is calculated, on a feature-point-by-feature-point basis, by comparing the position of one feature obtained using the affine transformation parameters with the position of the other feature point detected in the current frame. As the difference value, for example, the absolute distance between the positions of the two corresponding feature points is calculated. Then, the calculated difference value is compared with a preset threshold on a feature-point-by-feature-point basis, and the number of feature points whose difference values are smaller than the threshold is obtained as the score for the affine transformation parameters. As above, three feature points are randomly selected from among feature points based on which optical flows are detected. On the basis of optical flows corresponding to these feature points, a process of calculating the score for the affine transformation parameters is repeated a predetermined number of times, whereby a plurality of scores for affine transformation parameters are calculated. This predetermined number of times may be set, as needed, in accordance with the type of image to be compared, the processing capability of the image processing apparatus 100, or the like. Alternatively, a fixed value may be used as the predetermined number of times. As the predetermined number of times, for example, about 20 times can be set by taking into consideration the processing capability of the image processing apparatus 100.

For example, the case where three corner points other than the corner points 306 to 311 are selected from among corner points detected in the image 300 shown in FIG. 4(b) is considered. When affine transformation parameters are calculated using three optical flows corresponding to the above-selected three corner points, as has been described above, since the three optical flows have certain regularity, affine transformation parameters that transform an image corresponding to the immediately preceding frame in accordance with the certain regularity are obtained. Therefore, regarding the positions of corner points obtained using the affine transformation parameters and the positions of corner points detected in the current frame, difference values obtained for corner points other than the corner points 306 to 311 are calculated as relatively small values. Thus, the score for the affine transformation parameters becomes a large value.

In contrast, the case where three corner points at least including one of the corner points 306 to 311 are selected from among corner points detected in the image 300 shown in FIG. 4(b) is considered. When affine transformation parameters are calculated using three optical flows corresponding to the above-selected three corner points, as has been described above, since the three optical flows include an optical flow that does not have certain regularity, affine transformation parameters that do not transform an image corresponding to the immediately preceding frame in accordance with the certain regularity are obtained. Therefore, difference values obtained for the positions of corner points obtained using the affine transformation parameters and the positions of corner points detected in the current frame are calculated as relatively large values at arbitrary corner points. Thus, the score for the affine transformation parameters becomes a small value.

Then, among the obtained plurality of scores for affine transformation parameters, affine transformation parameters whose score has the greatest value are selected as representative affine transformation parameters. Affine transformation parameters of an inverse matrix corresponding to the matrix of the selected affine transformation parameters are recorded in association with the current frame in the moving-image storage unit 200. In this way, in the case where affine transformations of images constituting a moving image are to be performed, affine transformations can be performed using optimal affine transformation parameters.

As shown above, even when each of images constituting a moving image includes an object that moves (moving object), such as a person or a car, if the size of the moving object is relatively small with respect to the area of the image, the camera movement can be extracted without being affected by the moving object.

Also, a movement that is regarded to be intentionally caused by a photographer, such as zooming-in, zooming-out, panning, tilting, and rotation, can be estimated by extracting the camera movement.

Next, the operation of the image processing apparatus 100 in the embodiment of the present invention will be described with reference to the drawings.

Figure 6:
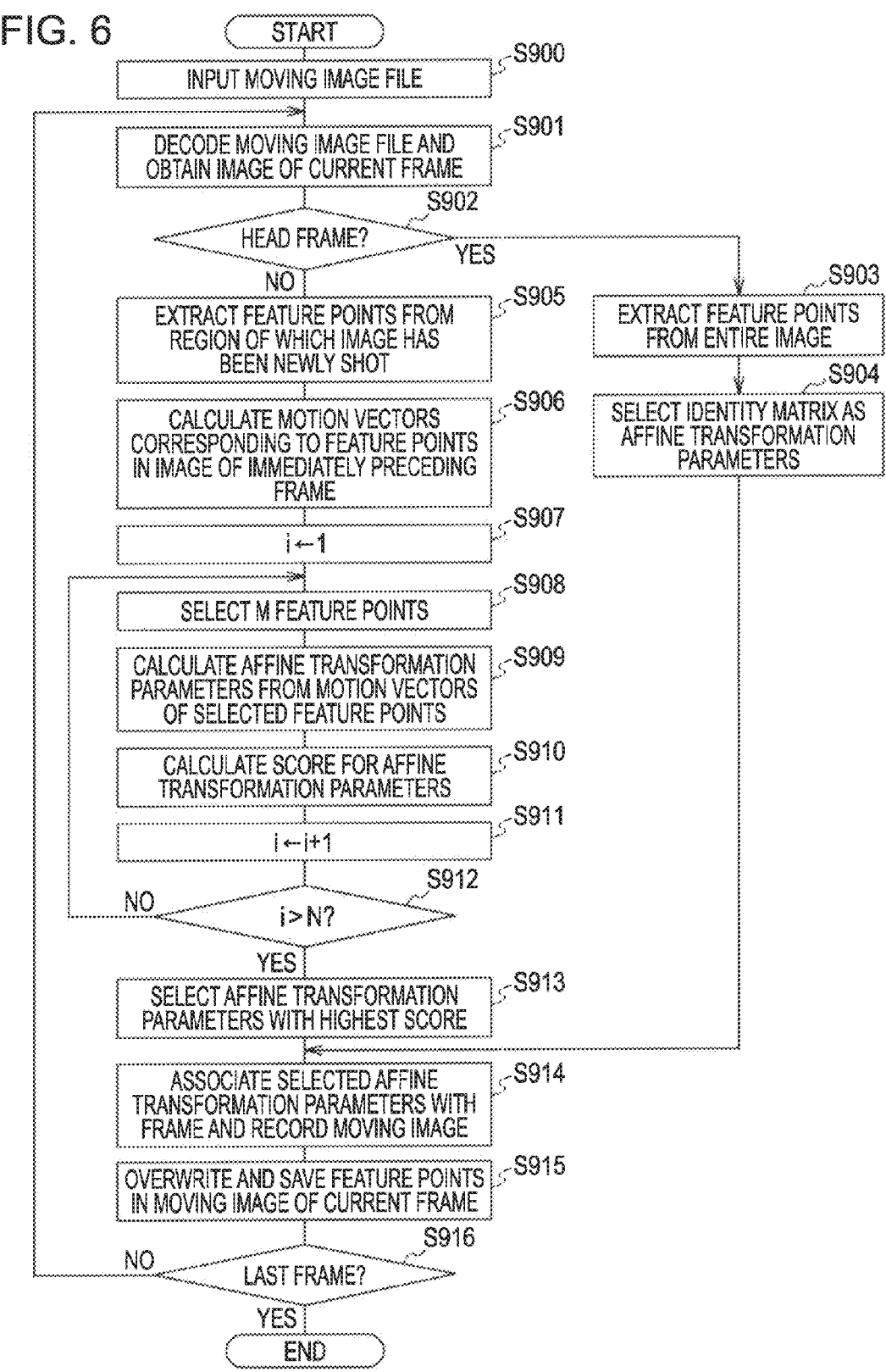
FIG. 6 is a flowchart showing a processing procedure of an affine-transformation-parameter detecting process performed by the image processing apparatus 100 in the embodiment of the present invention.

FIG. 6 is a flowchart showing a processing procedure of an affine-transformation-parameter detecting process performed by the image processing apparatus 100 in the embodiment of the present invention.

At first, a moving image file is input to the moving-image input unit 110 (step S900). Then, the moving image file input to the moving-image input unit 110 is decoded, and an image of one frame is obtained in the order of time series (step S901). Then, it is determined whether or not the obtained one frame is the head frame of the moving image file input to the moving-image input unit 110 (step S902). When the obtained one frame is the head frame (step S902), feature points are extracted from the entire image corresponding to the head frame (step S903). For example, as shown in FIG. 4(*b*), a plurality of corner points are extracted in the image. Then, affine transformation parameters in an identity matrix are selected as affine transformation parameters (step S904), and the flow proceeds to step S914.

In contrast, when the obtained one frame is not the head frame (step S902), feature points are extracted from a region whose image was newly shot, with reference to an image corresponding to the immediately preceding frame (step S905). That is, since feature points that have already been extracted in the image corresponding to the immediately preceding frame can be obtained by optical flows corresponding to these feature points, these feature points are not extracted in the image corresponding to the current frame.

Then, optical flows corresponding to the individual feature points extracted from the image corresponding to the immediately preceding frame are calculated (step S906). That is, as shown in FIG. 4(*b*), optical flows corresponding to the individual corner points are calculated.

Then, a variable i is initialized to "1" (step S907). Then, M feature points are selected from among the feature points based on which the optical flows have been detected (step S908). For example, three feature points are selected at random when affine transformation parameters are used as camerawork parameters. Also, four feature points are selected at random when projective transformation parameters are used as camerawork parameters. Then, affine transformation parameters are calculated on the basis of the M optical flows calculated in correspondence with the selected M feature points (step S909).

Then, on the basis of the affine transformation parameters obtained by calculation, the score for the affine transformation parameters is calculated (step S910). Specifically, using the affine transformation parameters obtained by calculation, the positions of the movement destinations of all feature points in the image corresponding to the immediately preceding frame are obtained. A difference value between the positions of two corresponding feature points is calculated, on a feature-point-by-feature-point basis, by comparing the position of one feature point obtained using the affine transformation parameters with the position of the other feature point in the image corresponding to the current frame, which has been obtained at the time of calculating the optical flows in step S906. As the difference value, for example, the absolute distance between the two corresponding positions is calculated. Then, the calculated difference value is compared with a preset threshold on a feature-point-by-feature-point basis, and the number of feature points whose difference values are smaller than the threshold is obtained as the score for the affine transformation parameters.

Then, "1" is added to the variable i (step S911), and it is determined whether or not the variable i is greater than a constant N (step S912). When the variable i is less than or equal to the constant N (step S912), the flow returns to step S908, and the affine-transformation-parameter-score calculating process is repeated (steps S908 to S910). For example, 20 can be used as the constant N.

In contrast, when the variable i is greater than the constant N (step S912), among the obtained scores for the affine transformation parameters, the affine transformation parameters whose score has the greatest value are selected as representative affine transformation parameters (step S913). Then, affine transformation parameters of an inverse matrix corresponding to the matrix of the selected representative affine transformation parameters are recorded in association with the current frame in the moving-image storage unit 200 (step S914). Note that, when the current frame is the head frame, the selected affine transformation parameters of an identity matrix are recorded in association with the head frame in the moving-image storage unit 200. Then, the image corresponding to the current frame and the feature points in this image are written over and saved (step S915).

Then, it is determined whether or not the current frame is the last frame of the moving image file input to the moving-image input unit 110 (step S916). When the current frame is not the last frame (step S916), the flow returns to step S901, and the affine-transformation-parameter detecting process is repeated (steps S901 to S915). In contrast, when the current frame is the last frame (step S916), the affine-transformation-parameter detecting process is terminated.

In the embodiment of the present invention, the example in which, as detection of camerawork parameters, affine transformation parameters are detected on the basis of optical flows detected in images constituting a moving image has been described. Alternatively, a sensor such as an acceleration sensor or a gyro sensor or a zoom button used at the time of performing a zoom operation may be provided on the camera. The amount of the camera movement at the time of shooting an image may be detected using the sensor or the zoom button, and, on the basis of the amount of the camera movement, camerawork parameters may be obtained. Note that the detected amount of the camera movement at the time of shooting an image can be used at the time of determining whether or not camerawork parameters obtained by the camerawork-parameter calculating unit 123 are correct. Also, a plurality of camerawork parameters may be detected by the camerawork-parameter calculating unit 123, and, on the basis of the detected amount of the camera movement at the time of shooting an image, one camerawork parameter may be selected from among the plurality of camerawork parameters.

Next, the case in which a moving image is generated by the combining using the above-described affine transformation parameters will be described in detail with reference to the drawings. Note that individual images shown in FIG. 7 to FIG. 15 are simplified, for the sake of the description, and additionally, the amount of movement between two consecutive frames is enlarged and shown.

At first, the case in which, at the time of shooting an image using a camera, although the magnification remains unchanged, the lens of the camera is moved in any of upward, downward, leftward, and rightward directions, with the camera position serving as the center, will be described.

Figure 7:
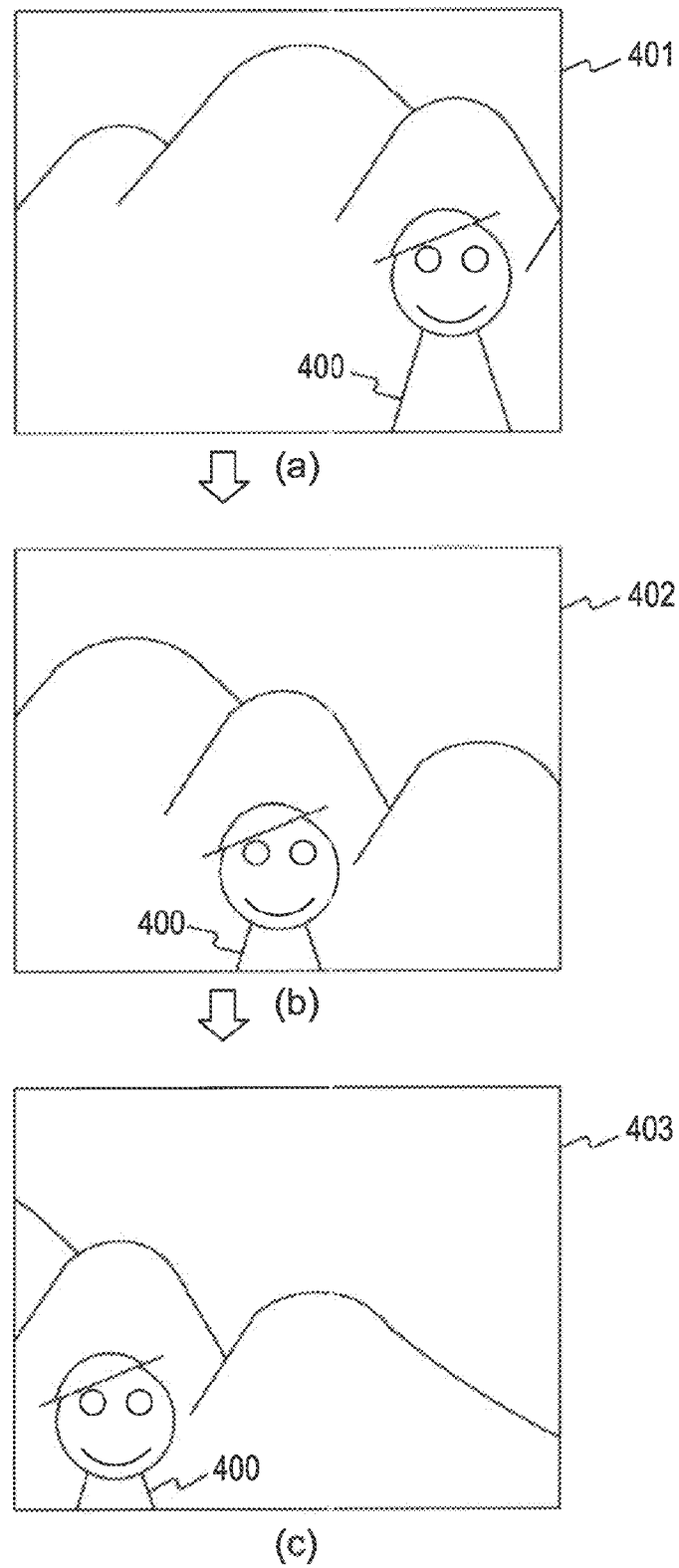
FIG. 7 includes diagrams showing an example of transition in a moving image shot by a camera.

FIG. 7 includes diagrams showing an example of transition in a moving image shot by the camera. In FIG. 7, the diagrams show images 401 to 403 corresponding to consecutive frames included in the moving image in the case where the image of a person 400 with a mountain in the background has been shot. In this example, the case where a photographer is shooting the image while moving the lens of the camera in the rightward and upward directions is illustrated. In this case, the person 400 included in the moving image shot by the camera moves from the right side to the left side, and additionally moves downward in images constituting the moving image.

FIG. 8 includes diagrams in which, in the individual images shown in FIG. 7, an image corresponding to the immediately preceding frame is indicated by broken lines, and additionally, exemplary detected optical flows are shown. The image 401 shown in FIG. 8(a) is the same as the image 401 shown in FIG. 7(a). Also, portions indicated by solid lines in the image 402 shown in FIG. 8(b) are the same as the image 402 shown in FIG. 7(b), and portions indicated by broken lines in the image 402 shown in FIG. 8(b) are the same as portions indicated by solid lines in the image 401 shown in FIG. 8(a). Also, arrows 404 to 406 in the image 402 shown in FIG. 8(b) illustrate exemplary optical flows detected in the image 402. Similarly, portions indicated by solid lines in the image 403 shown in FIG. 8(c) are the same as the image 403 shown in FIG. 7(c), and portions indicated by broken lines in the image 403 shown in FIG. 8(c) are the same as the portions indicated by the solid lines in the image 402 shown in FIG. 8(b). Also, arrows 407 to 409 in the image 403 shown in FIG. 8(c) illustrate exemplary optical flows detected in the image 403.

As shown in FIGS. 8(b) and (c), the person 400 and the mountain in the background, which are included in the image, move in accordance with the camera movement. On the basis of optical flows detected from this movement, affine transformation parameters can be obtained on a frame-by-frame basis.

Figure 9:
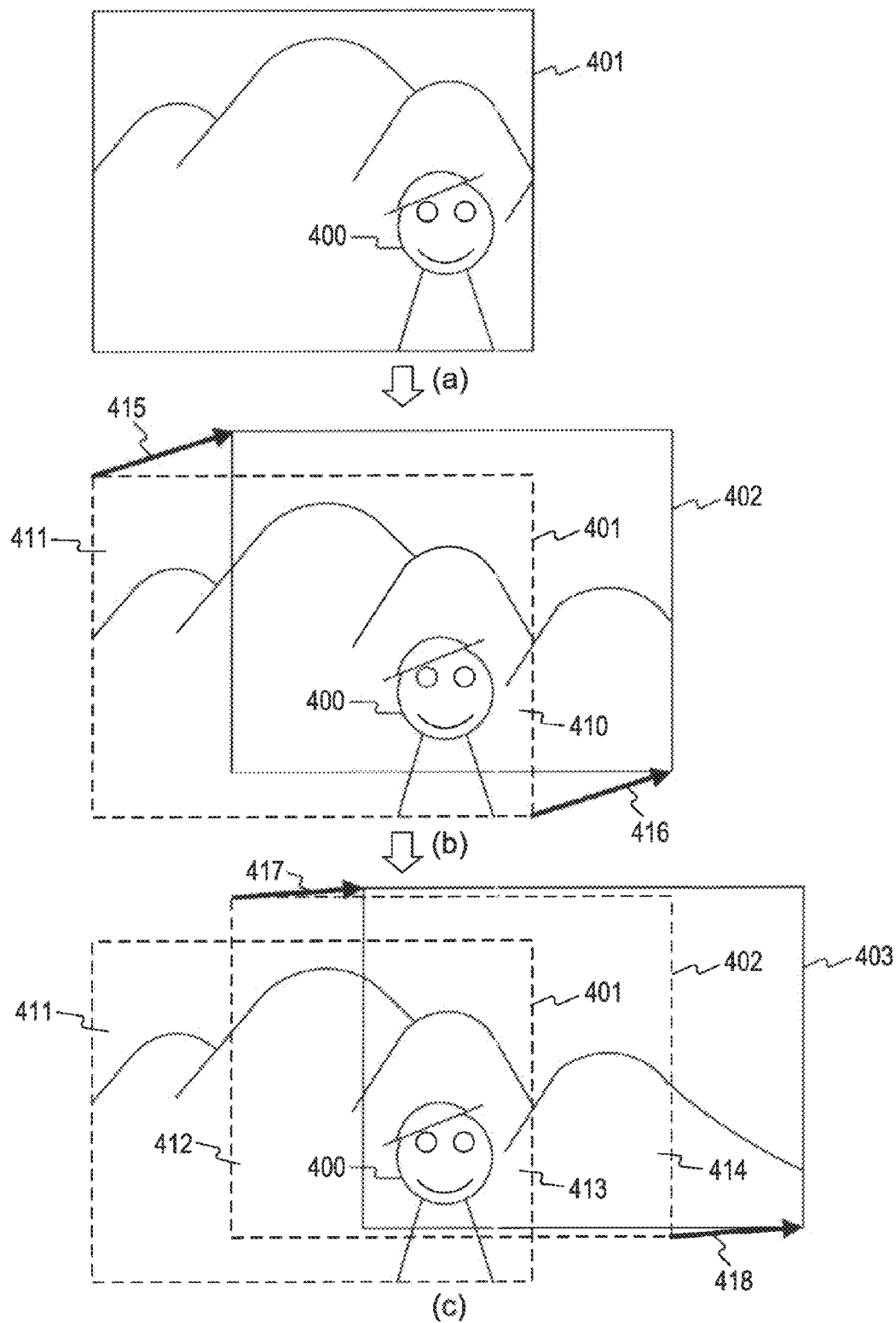
FIG. 9 includes diagrams showing an image combining example in the case where a moving image including images 401 to 403 shown in FIG. 7 is generated by the combining.

FIG. 9 includes diagrams showing an image combining example in the case where a moving image including the images 401 to 403 shown in FIG. 7 is generated by the combining.

As shown in FIG. 9(a), at first, since there is only the image 401 corresponding to the head frame, no combining is performed. Here, when the matrix of affine transformation parameters (3×3 matrix) corresponding to the image 401 is A1, the value of A1 is obtained, and, with reference to the position and size of the image 401 of the head frame, the image 401 is affine-transformed using the obtained A1 matrix. Here, since A1 is an identity matrix, the position and size of the image 401 are not transformed. Then, when the image 402 corresponding to the next frame is to be combined, the image 402 is affine-transformed using affine transformation parameters associated with this frame. Specifically, when the matrix of affine transformation parameters corresponding to the image 402 is A2 and the matrix of affine transformation parameters corresponding to the image 401 is A1, the value of A1×A2 is obtained, and, with reference to the position and size of the image 401 of the head frame, the image 402 is affine-transformed using the obtained A1×A2 matrix. In the image shown in FIG. 9(b), only the position of the image 402 is transformed. The image 402, which has been affine-transformed using the affine transformation parameters, is written over so as to overlap the image 401 corresponding to the immediately preceding frame. That is, within the region of the image 401, an image of the image 402 is written over a region 410 overlapping the image 402. Also, within the region of the image 401, an image of the image 401 is combined in a region 411 that does not overlap the image 420. That is, when the image 402 corresponding to the second frame is to be combined, as shown in FIG. 9(b), the entire portion of the image 402 and a portion of the image 401 corresponding to the region 411 are combined. Also, the affine transformation parameters used to affine-transform the image 402 are held in the image transforming unit 160.

Then, when the image 403 corresponding to the next frame is to be combined, the image 403 is affine-transformed using affine transformation parameters associated with this frame. That is, the image 403 is affine-transformed using affine transformation parameters obtained using a matrix of affine transformation parameters corresponding to the image 403 and the matrix of the affine transformation parameters corresponding to the image 402, which are used in the immediately preceding affine transformation. Specifically, when the matrix of affine transformation parameters corresponding to the image 403 is A3, the matrix of affine transformation parameters corresponding to the image 402 is A2, and the matrix of affine transformation parameters corresponding to the image 401 is A1, the value of A1×A2×A3 is obtained, and, with reference to the position and size of the image 401 of the head frame, the image 403 is affine-transformed using the obtained A1×A2×A3 matrix. In the image shown in FIG. 9(c), only the position of the image 403 is transformed. The image 403, which has been affine-transformed using the affine transformation parameters, is written over so as to overlap a composite image of the images 401 and 402 corresponding to the preceding frames. That is, within the region of the composite image of the images 401 and 402, an image of the image 403 is written over regions 413 and 414 overlapping the image 403. Also, within the region of the composite image of the images 401 and 402, the composite image of the images 401 and 402 is combined in regions 411 and 412 that do not overlap the image 403. That is, when the image 403 corresponding to the third frame is to be combined, as shown in FIG. 9(c), the entire portion of the image 403, the portion of the image 401 corresponding to the region 411, and a portion of the image 420 corresponding to the region 412 are combined. Also, the affine transformation parameters used to affine-transform the image 403 are held in the image transforming unit 160. That is, the affine transformation parameters obtained by multiplying the matrices of the affine transformation parameters corresponding to the images 402 and 403, respectively, are held in the image transforming unit 160. As above, when an image corresponding to the current frame is to be affine-transformed, the image corresponding to the current frame is affine-transformed using affine transformation parameters obtained using a matrix of affine transformation parameters corresponding to the current frame and a matrix of affine transformation parameters corresponding to each of frames preceding the current frame. The affine transformation parameters obtained at the time of the affine transformation are held in the image transforming unit 160, and used in the next affine transformation. Also, the values of coordinates corresponding to the center position of the affine-transformed image and the image size indicating the size of the image in the work buffer of the image memory 170 are recorded in the image-position storage unit 210. Also, the same applies to the cases in FIG. 12 and FIG. 15.

Next, the case in which, at the time of shooting an image using a camera, although the lens direction of the camera remains unchanged, the magnification is changed will be described.

FIG. 10 includes diagrams showing an example of transition in a moving image shot by the camera. In FIG. 10, the diagrams show images 421 to 423 corresponding to consecutive frames included in the moving image in the case where the image of a person 420 with a mountain in the background has been shot. In this example, the case where a photographer is shooting the image while increasing the magnification of the lens of the camera is illustrated. In this case, the person 420 included in the moving image shot by the camera gradually becomes larger in images constituting the moving image. Note that movement of the camera position will not be taken into consideration in this example, though the camera position may move slightly at the time of increasing the magnification.

Figure 11:
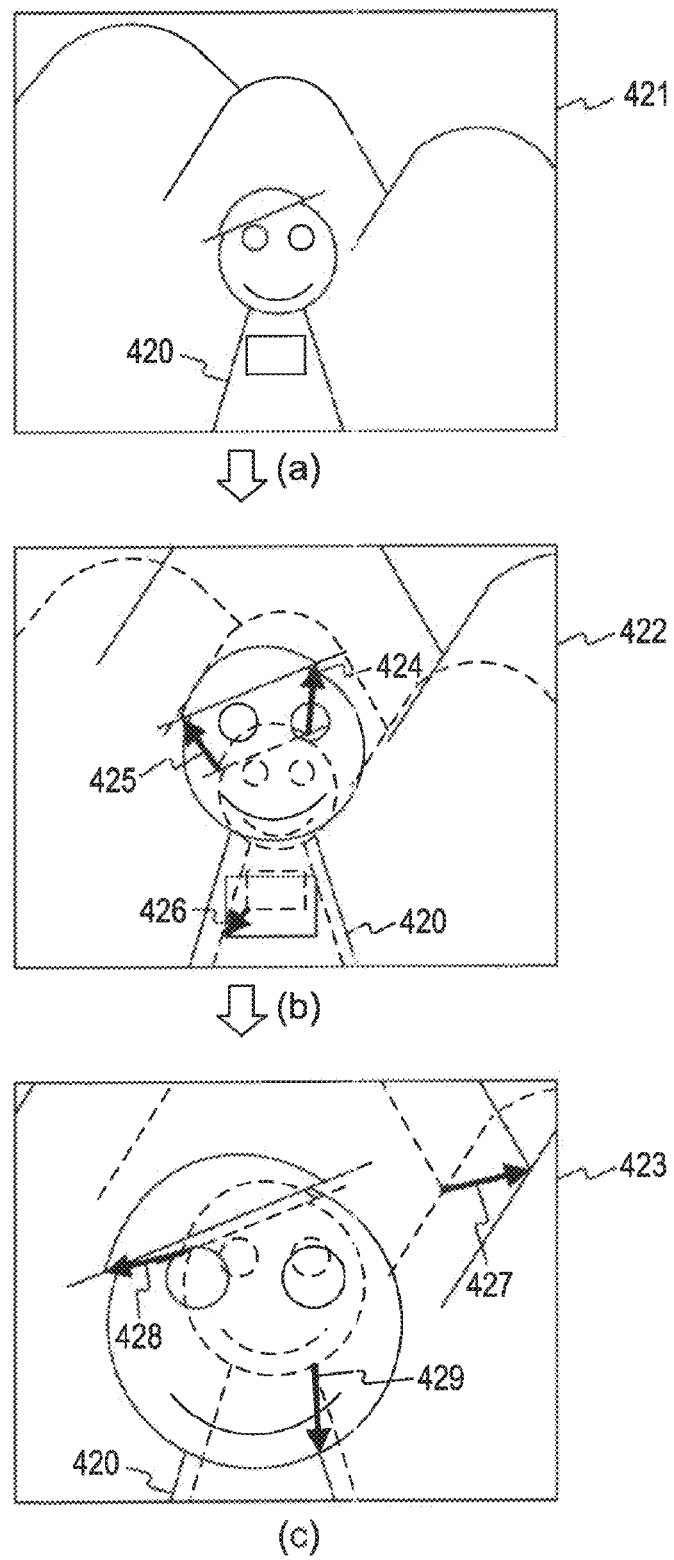
FIG. 11 includes diagrams in which, in individual images shown in FIG. 10, an image corresponding to the immediately preceding frame is indicated by broken lines, and additionally, exemplary detected optical flows are shown.

FIG. 11 includes diagrams in which, in the individual images shown in FIG. 10, an image corresponding to the immediately preceding frame is indicated by broken lines, and additionally, exemplary detected optical flows are shown. The image 421 shown in FIG. 11(a) is the same as the image 421 shown in FIG. 10(a). Also, portions indicated by solid lines in the image 422 shown in FIG. 11(b) are the same as the image 422 shown in FIG. 10(b), and portions indicated by broken lines in the image 422 shown in FIG. 11(b) are the same as portions indicated by solid lines in the image 421 shown in FIG. 10(a). Also, arrows 424 to 426 in the image 422 shown in FIG. 11(b) illustrate exemplary optical flows detected in the image 422. Similarly, portions indicated by solid lines in the image 423 shown in FIG. 11(c) are the same as the image 423 shown in FIG. 10(c), and portions indicated by broken lines in the image 423 shown in FIG. 11(c) are the same as the portions indicated by the solid lines in the image 422 shown in FIG. 10(b). Also, arrows 427 to 429 in the image 423 shown in FIG. 11(c) illustrate exemplary optical flows detected in the image 423.

As shown in FIGS. 11(b) and (c), the sizes of the person 420 and the mountain in the background, which are included in the image, change as the magnification changes. On the basis of optical flows detected from this change, affine transformation parameters can be obtained on a frame-by-frame basis.

Figure 12:
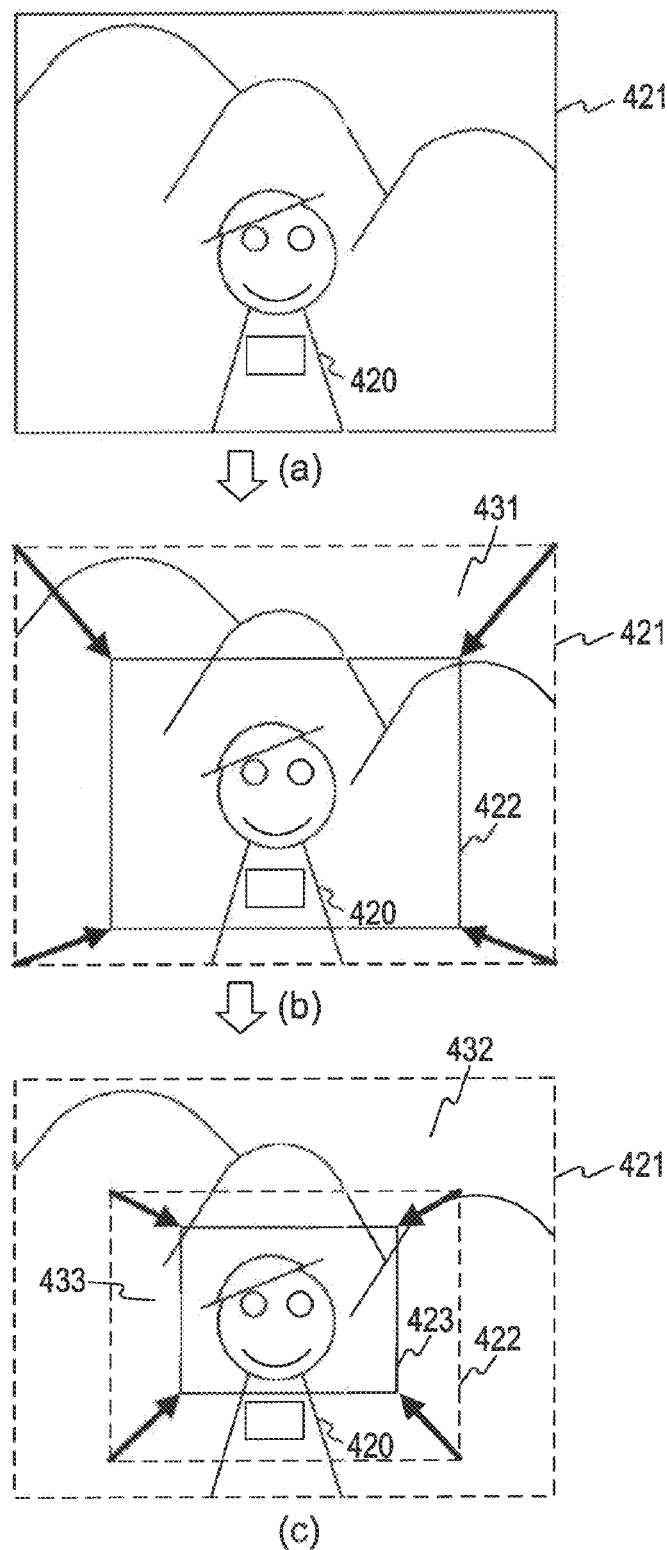
FIG. 12 includes diagrams showing a combining example in the case where a moving image including images 421 to 423 shown in FIG. 10 is generated by the combining.

FIG. 12 includes diagrams showing a combining example in the case where a moving image including the images 421 to 423 shown in FIG. 10 is generated by the combining.

As shown in FIG. 12(a), at first, since there is only the image 421 corresponding to the head frame, no combining is performed. Then, when the image 422 corresponding to the next frame is to be combined, the image 422 is affine-transformed using affine transformation parameters associated with this frame. In the image shown in FIG. 12(b), only the size of the image 422 is transformed. The image 422, which has been affine-transformed using the affine transformation parameters, is written over so as to overlap the image 421 corresponding to the immediately preceding frame. That is, within the region of the image 421, an image of the image 422 is written over a region overlapping the image 422. In this case, since the image 421 overlaps the entire region of the image 422, the entire image of the image 422 is written over the image 421. Also, within the region of the image 421, an image of the image 421 is combined in a region 431 that that does not overlap the image 422. That is, when the image 422 corresponding to the second frame is to be combined, as shown in FIG. 12(b), the entire portion of the image 422 and a portion of the image 421 corresponding to the region 431 are combined. Also, the affine transformation parameters used to affine-transform the image 422 are held in the image transforming unit 160.

Then, when the image 423 corresponding to the next frame is to be combined, the image 423 is affine-transformed using affine transformation parameters associated with this frame. That is, the image 423 is affine-transformed using affine transformation parameters obtained using a matrix of affine transformation parameters corresponding to the image 423 and the matrix of the affine transformation parameters corresponding to the image 422, which are used in the immediately preceding affine transformation. In the image shown in FIG. 12(c), only the size of the image 423 is transformed. The affine-transformed image 423 is written over so as to overlap a composite image of the images 421 and 422 corresponding to the preceding frames. That is, within the region of the composite image of the images 421 and 422, an image of the image 423 is written over a region overlapping the image 423. In this case, since the image 423 overlaps the entire regions of the images 421 and 422, the entire image of the image 423 is written over the composite image of the images 421 and 422. Also, within the region of the composite image of the images 421 and 422, the composite image of the images 421 and 422 is combined in regions 432 and 433 that do not overlap the image 423. That is, when the image 423 corresponding to the third frame is to be combined, as shown in FIG. 12(c), the entire portion of the image 423, the portion of the image 421 corresponding to the region 432, and a portion of the image 422 corresponding to the region 433 are combined. Also, the affine transformation parameters used to affine-transform the image 423 are held in the image transforming unit 160. That is, the affine transformation parameters obtained by using the affine transformation parameters corresponding to the images 422 and 423, respectively, are held in the image transforming unit 160.

Next, the case in which, at the time of shooting an image using a camera, although the lens direction and the magnification of the camera remain unchanged, the camera is rotated around the image shooting direction serving as the center of rotation will be described.

FIG. 13 includes diagrams showing an example of transition in a moving image shot by the camera. In FIG. 13, the diagrams show images 441 to 443 corresponding to consecutive frames included in the moving image in the case where the image of a person 440 with a mountain in the background has been shot. In this example, the case where a photographer is shooting the image while rotating the camera around the image shooting direction serving as the center of rotation is illustrated. In this case, the person 440 included in the moving image shot by the camera rotates in images constituting the moving image. Note that movement of the camera position will not be taken into consideration in this example, though the camera position may move slightly due to the rotation of the camera.

FIG. 14 includes diagrams in which, in the individual images shown in FIG. 13, an image corresponding to the immediately preceding frame is indicated by broken lines, and additionally, exemplary detected optical flows are shown. The image 441 shown in FIG. 14(a) is the same as the image 441 shown in FIG. 13(a). Also, portions indicated by solid lines in the image 442 shown in FIG. 14(b) are the same as the image 442 shown in FIG. 13(b), and portions indicated by broken lines in the image 442 shown in FIG. 14(b) are the same as portions indicated by solid lines in the image 441 shown in FIG. 13(a). Also, arrows 444 to 446 in the image 442 shown in FIG. 14(b) illustrate exemplary optical flows detected in the image 442. Similarly, portions indicated by solid lines in the image 443 shown in FIG. 14(c) are the same as the image 443 shown in FIG. 13(c), and portions indicated by broken lines in the image 443 shown in FIG. 14(c) are the same as the portions indicated by the solid lines in the image 442 shown in FIG. 13(b). Also, arrows 447 to 449 in the image 443 shown in FIG. 14(c) illustrate exemplary optical flows detected in the image 443.

As shown in FIGS. 14(b) and (c), the person 440 and the mountain in the background, which are included in the image, rotate in accordance with the rotation of the camera. On the basis of optical flows detected from this rotation movement, affine transformation parameters can be obtained on a frame-by-frame basis.

Figure 15:
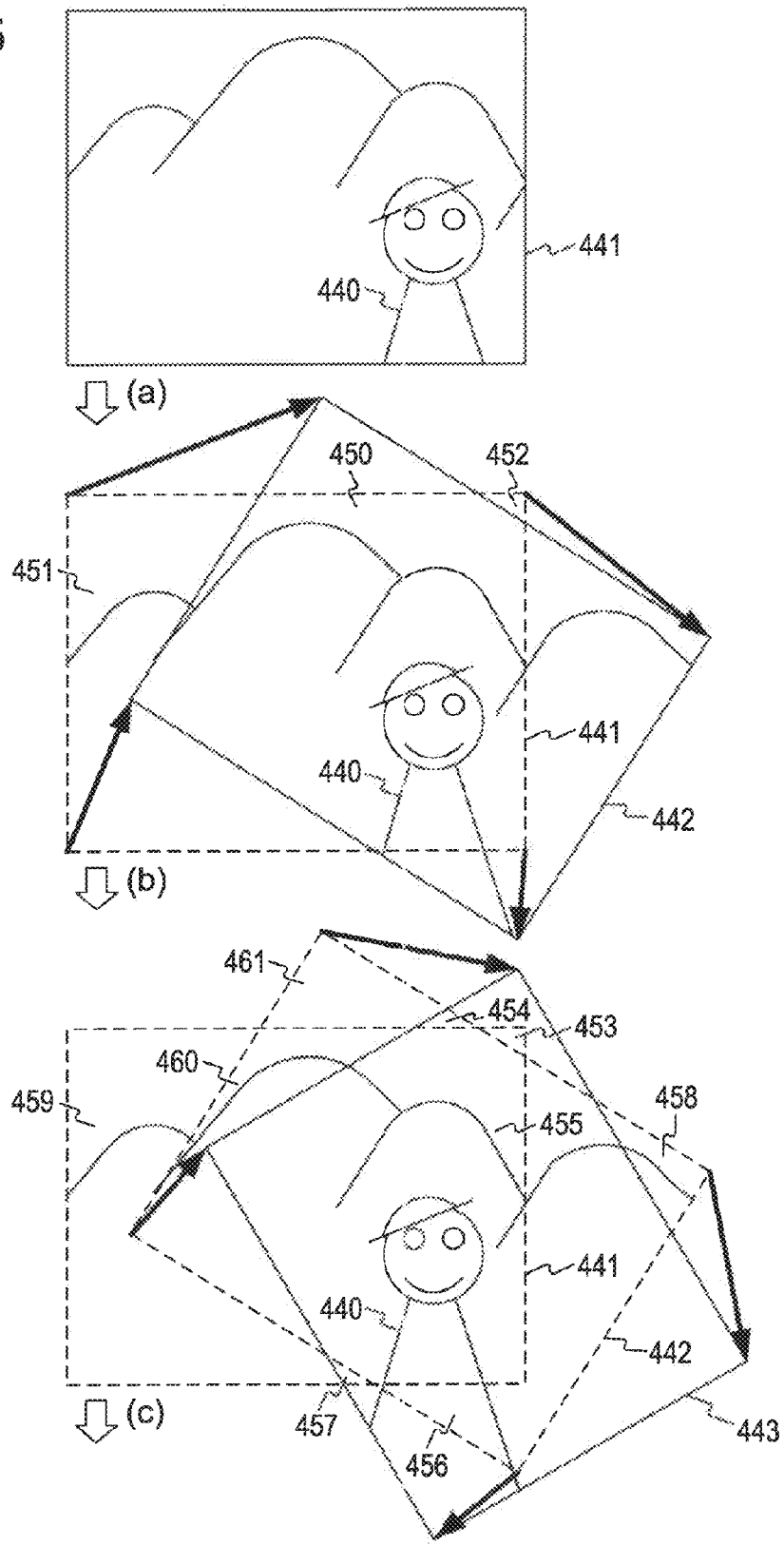
FIG. 15 includes diagrams showing a combining example in the case where a moving image including images 441 to 443 shown in FIG. 13 is generated by the combining.

FIG. 15 includes diagrams showing a combining example in the case where a moving image including the images 441 to 443 shown in FIG. 13 is generated by the combining.

As shown in FIG. 15(a), at first, since there is only the image 441 corresponding to the head frame, no combining is performed. Then, when the image 442 corresponding to the next frame is to be combined, the image 442 is affine-transformed using affine transformation parameters associated with this frame. In the image shown in FIG. 15(b), only the angle of the image 442 is transformed. The image 442, which has been affine-transformed using the affine transformation parameters, is written over so as to overlap the image 441 corresponding to the immediately preceding frame. That is, within the region of the image 441, an image of the image 442 is written over a region 450 overlapping the image 442. Also, within the region of the image 441, an image of the image 441 is combined in regions 451 and 452 that that do not overlap the image 442. That is, when the image 442 corresponding to the second frame is to be displayed, as shown in FIG. 15(b), the entire portion of the image 442 and portions of the image 441 corresponding to the regions 451 and 452 are combined. Also, the affine transformation parameters used to affine-transform the image 442 are held in the image transforming unit 160.

Then, when the image 443 corresponding to the next frame is to be combined, the image 443 is affine-transformed using affine transformation parameters associated with this frame. That is, the image 443 is affine-transformed using affine transformation parameters obtained using a matrix of affine transformation parameters corresponding to the image 443 and the matrix of the affine transformation parameters corresponding to the image 442, which are used in the immediately preceding affine transformation. In the image shown in FIG. 15(c), only the angle of the image 443 is transformed. The affine-transformed image 443 is written over so as to overlap a composite image of the images 441 and 442 corresponding to the preceding frames. That is, within the region of the composite image of the images 441 and 442, an image of the image 443 is written over regions 453 to 457 overlapping the image 443. Also, within the region of the composite image of the images 441 and 442, the composite image of the images 441 and 442 is further combined in regions 458 to 461 that do not overlap the image 443. That is, when the image 443 corresponding to the third frame is to be combined, as shown in FIG. 15(c), the entire portion of the image 443, the portion of the image 441 corresponding to the region 459, and portions of the image 442 corresponding to the regions 458 and 460 are combined. Also, the affine transformation parameters used to affine-transform the image 443 are held in the image transforming unit 160. That is, the affine transformation parameters obtained by using the affine transformation parameters corresponding to the images 442 and 443, respectively, are held in the image transforming unit 160.

The cases where the position, magnification, and angle of each of images constituting the moving image are sequentially changed have been described above. However, the embodiment is similarly applicable to the case where these changes are combined.

Next, a display example in the case where a moving image actually shot by a camera is generated by the combining will be illustrated. In an image combining example illustrated below, a composite image is displayed only in a region where images corresponding to the current frame and the preceding frame are combined, and the other region is shown in black. Also, a border is added to the periphery of the image corresponding to the current frame. Furthermore, in the image combining example illustrated below, a composite image that is currently being generated is illustrated by way of example.

Figure 16:
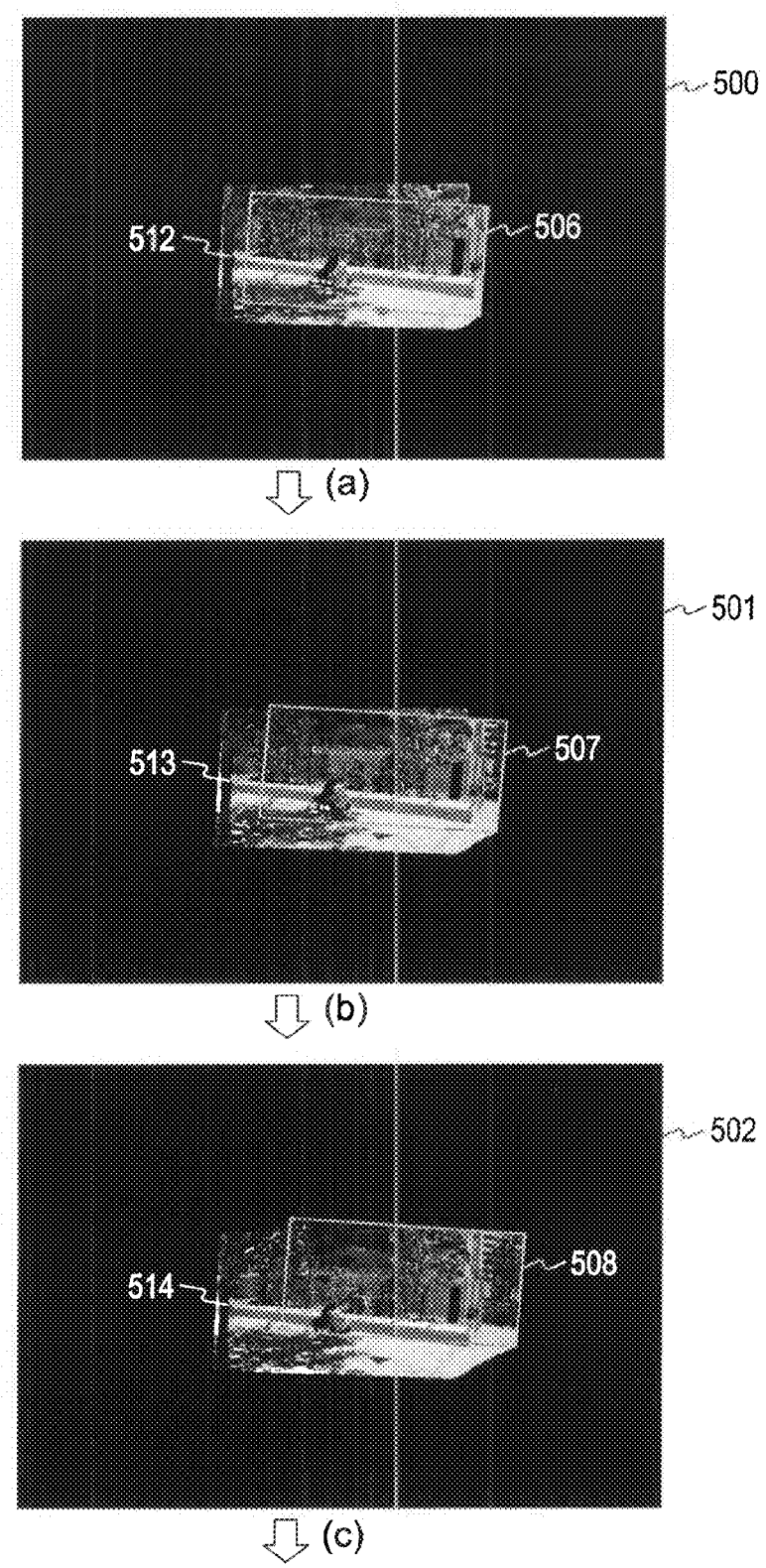
FIG. 16 includes diagrams showing an example of transition in a moving image shot by a camera.
Figure 17:
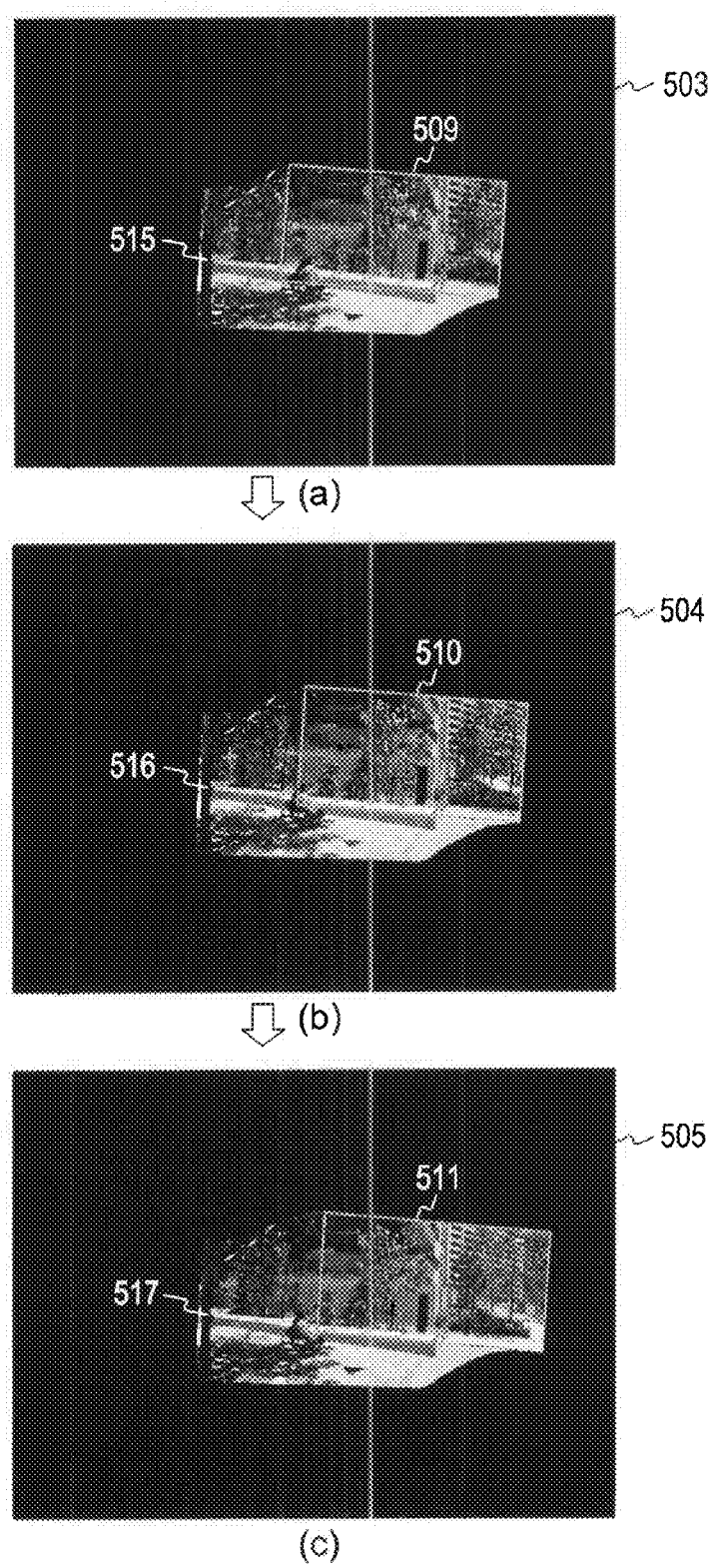
FIG. 17 includes diagrams showing an example of transition in a moving image shot by a camera.

FIG. 16 to FIG. 19 include diagrams showing an example of transition in a moving image shot by the camera. FIG. 16 and FIG. 17 are diagrams showing images 500 to 505 constituting a moving image in the case where the image of a parent and a child playing in a playground within an apartment has been shot while moving the camera.

In the images 500 to 505 shown in FIG. 16 and FIG. 17, images corresponding to the current frame are images 506 to 511. Also, composite images that are images generated by the combining in correspondence with the preceding individual frames are images 512 to 517. As shown in FIG. 16 and FIG. 17, a target being shot (the playground within the apartment or the like) included in the shot image is fixed to the screen, and the images 506 to 511 corresponding to the current frame move on the screen in accordance with the camera movement.

Figure 18:
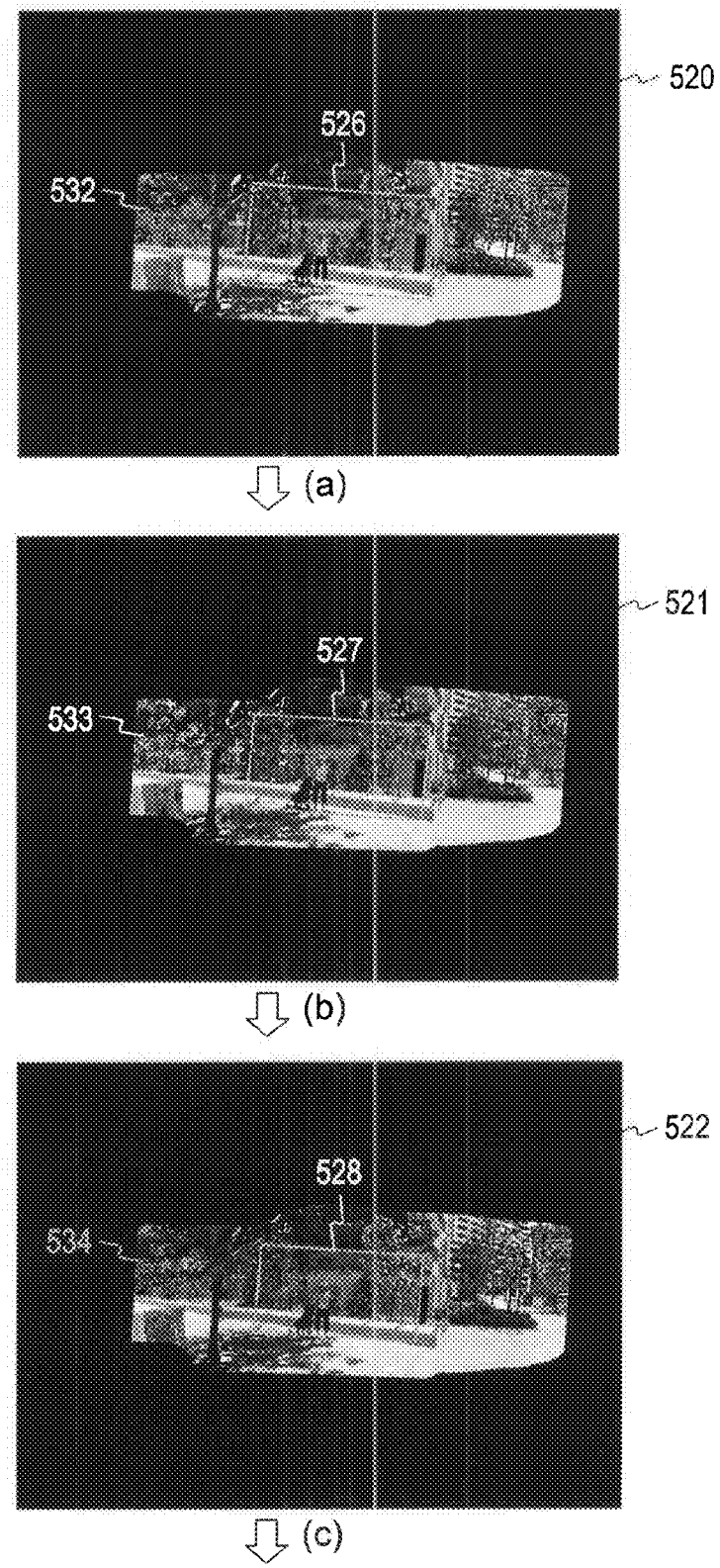
FIG. 18 includes diagrams showing an example of transition in a moving image shot by a camera.
Figure 19:
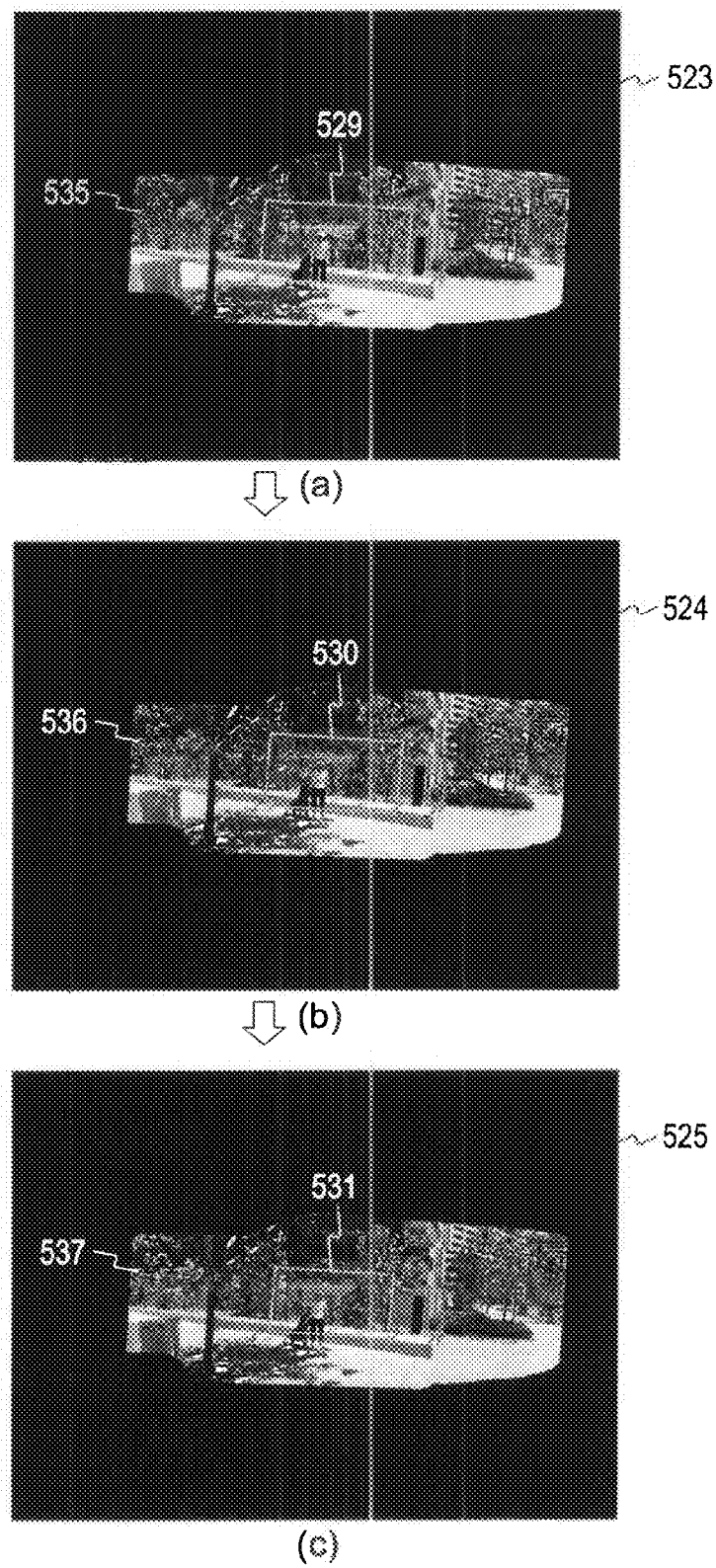
FIG. 19 includes diagrams showing an example of transition in a moving image shot by a camera.

FIG. 18 and FIG. 19 are diagrams showing images 520 to 525 corresponding to frames constituting a moving image in the case where the image of a parent and a child playing in a playground within an apartment has been shot while performing a zoom-in operation.

In the images 520 to 525 shown in FIG. 18 and FIG. 19, images corresponding to the current frame are images 526 to 531. Also, composite images that are images generated by the combining in correspondence with the preceding individual frames are images 532 to 537. As shown in FIG. 18 and FIG. 19, a target being shot (the playground within the apartment or the like) included in the shot image is fixed to the screen, and the images 526 to 531 corresponding to the current frame move on the screen in accordance with the camera movement.

As above, in the image combining examples shown in FIG. 16 to FIG. 19, images corresponding to the current frame move on a display while involving size enlargement/reduction, whereby a wide image is generated.

Figure 20:
FIG. 20 is a diagram showing an example of a panoramic image generated by the combining performed using an image combining unit 180 on a moving image shot by a camera.

FIG. 20 is a diagram showing an example of a panoramic image generated by the combining performed using the image combining unit 180 on a moving image shot by a camera. A panoramic image 540 shown in FIG. 20 is a panoramic image generated from a moving image that has been shot mainly of a parent and a child playing in a playground within an apartment. As shown in FIG. 20, together with the parent and the child serving as central subjects of the shot image, the background such as the playground within the apartment, which has been shot as needed, is included in the panoramic image 540. Therefore, the details of the moving image can be easily understood. Also, the space where the image has been shot can be quickly understood.

Next, the case in which a moving image is played using a panoramic image will be described in detail with reference to the drawings.

Figure 21:
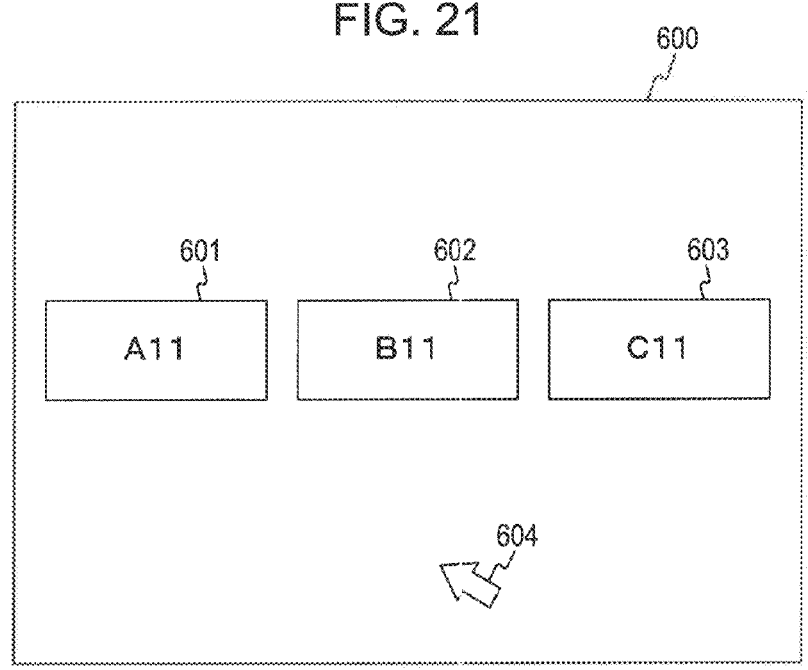
FIG. 21 is a diagram showing a display example of a panoramic image list screen displayed on a display unit 260 in the embodiment of the present invention.

FIG. 21 is a diagram showing a display example of a panoramic image list screen displayed on the display unit 260 in the embodiment of the present invention. The panoramic image list screen is a screen to be displayed in the case of selecting, for example, a desired moving image to be played when moving images stored in the moving-image storage unit 200 are to be played. Note that individual panoramic images shown in FIG. 21 are abbreviated and shown as "A11", "B11", and "C11", respectively, as in the panoramic size-reduced images stored in the panoramic size-reduced image 223 of the representative-image storage unit 220 shown in FIG. 3. Note that the panoramic image list screen is displayed on the display unit 260 in response to an operation input from the operation accepting unit 230, which has been entered by a user.

On a panoramic image list screen 600, panoramic size-reduced images 601 to 603 ("A11", "B11", and "C11") recorded in the panoramic size-reduced image 223 of the representative-image storage unit 220 are individually displayed, and additionally a cursor 604 for performing a selecting operation is displayed. As above, when moving images recorded in the moving-image storage unit 200 are to be played, since panoramic size-reduced images corresponding to the individual moving images are displayed on the panoramic image list screen 600, the details of the individual images can be easily understood, and accordingly, a moving image can be easily selected. Therefore, a moving image to be played can be efficiently selected.

Here, a selecting method of selecting a moving image to be played will be described. As shown in FIG. 21, when the panoramic size-reduced images 601 to 603 are displayed on the panoramic image list screen 600, the user operates the cursor 604 by entering an operation input from the operation accepting unit 230 and selects a desired panoramic size-reduced image from among the panoramic size-reduced images 601 to 603. For example, a desired panoramic size-reduced image is double clicked using a mouse. A panoramic image corresponding to the panoramic size-reduced image selected by this selecting operation is, for example, as shown in FIG. 22(*a*), enlarged and displayed on the display unit 260.

FIG. 22(*a*) is a diagram showing a display example of a panoramic image display screen displayed on the display unit 260 in the embodiment of the present invention. On a panoramic image display screen 610, a panoramic image 620 corresponding to the panoramic size-reduced image selected on the panoramic image list screen 600 is displayed on the entire screen, and additionally a cursor 629 is displayed. Here, borders 621 to 628 indicated by dotted lines within the panoramic image 620 are added for the sake of the description, and the borders 621 to 628 are not actually displayed. Also, the borders 621 to 628 show some of images constituting a moving image corresponding to the panoramic image 620.

FIG. 22(*b*) is a diagram schematically showing a moving image 630 corresponding to the panoramic image 620, and frames 631 to 638 that are some of frames constituting the moving image 630. Here, it is assumed that the frames included in the moving image 630 are arranged in time series, starting from "0", which is indicated by an arrow 639. Also, it is assumed that the frames 631 to 638 correspond to images within the borders 621 to 628, respectively, shown in FIG. 22(*a*).

Here, a playing method of playing the moving image 630 using the panoramic image 620 displayed on the panoramic image display screen 610 will be described. In the panoramic image 620 displayed on the panoramic image display screen 610, the user operates the cursor 629 by entering an operation input from the operation accepting unit 230 and selects a desired portion in the panoramic image 620. For example, a desired portion of the panoramic image 620 is double clicked using a mouse. On the basis of the position selected by this selecting operation, playback of the moving image 630 starts from a predetermined position. Specifically, in the coordinates recorded in the center position 213 of the image-position storage unit 210 in correspondence with the moving image 630, a coordinate point that exists within the minimum distance from the position selected by the selecting operation in the panoramic image 620 is detected, and the frame number 212 and the moving image ID 211 corresponding to this coordinate point are selected. When the selected frame number 212 and moving image ID 211 are output to the display control unit 250, the display control unit 250 searches the moving-image storage unit 200 for a moving image corresponding to the moving image ID 211, and additionally starts playing the retrieved moving image from a position corresponding to the frame number 212. The moving image, starting from that position, is displayed on the display unit 260. Note that, in the coordinates recorded in the center position 213 of the image-position storage unit 210, if a plurality of coordinate points that exist within the minimum distance from the position selected by the selecting operation in the panoramic image 620 are detected, for example, an image with a large area recorded in the image size 214 is selected. Alternatively, an image with a large frame number may be selected. Note that an appropriate frame number and moving image ID may be selected on the basis of other evaluation functions.

For example, in the panoramic image 620 shown in FIG. 22(*a*), if a cursor exists in the vicinity of the center of the border 628, when a double click is performed using a mouse, the frame number of a frame corresponding to an image within the frame 628 is selected from the image-position storage unit 210, and additionally, the moving image ID corresponding to the panoramic image 620 is selected from the image-position storage unit 210. On the basis of the selected moving image ID and the frame number, playback of the moving image 630 starts from the position of the frame 638.

Next, the operation of the image processing apparatus 100 in the embodiment of the present invention will be described with reference to the drawings.

Figure 23:
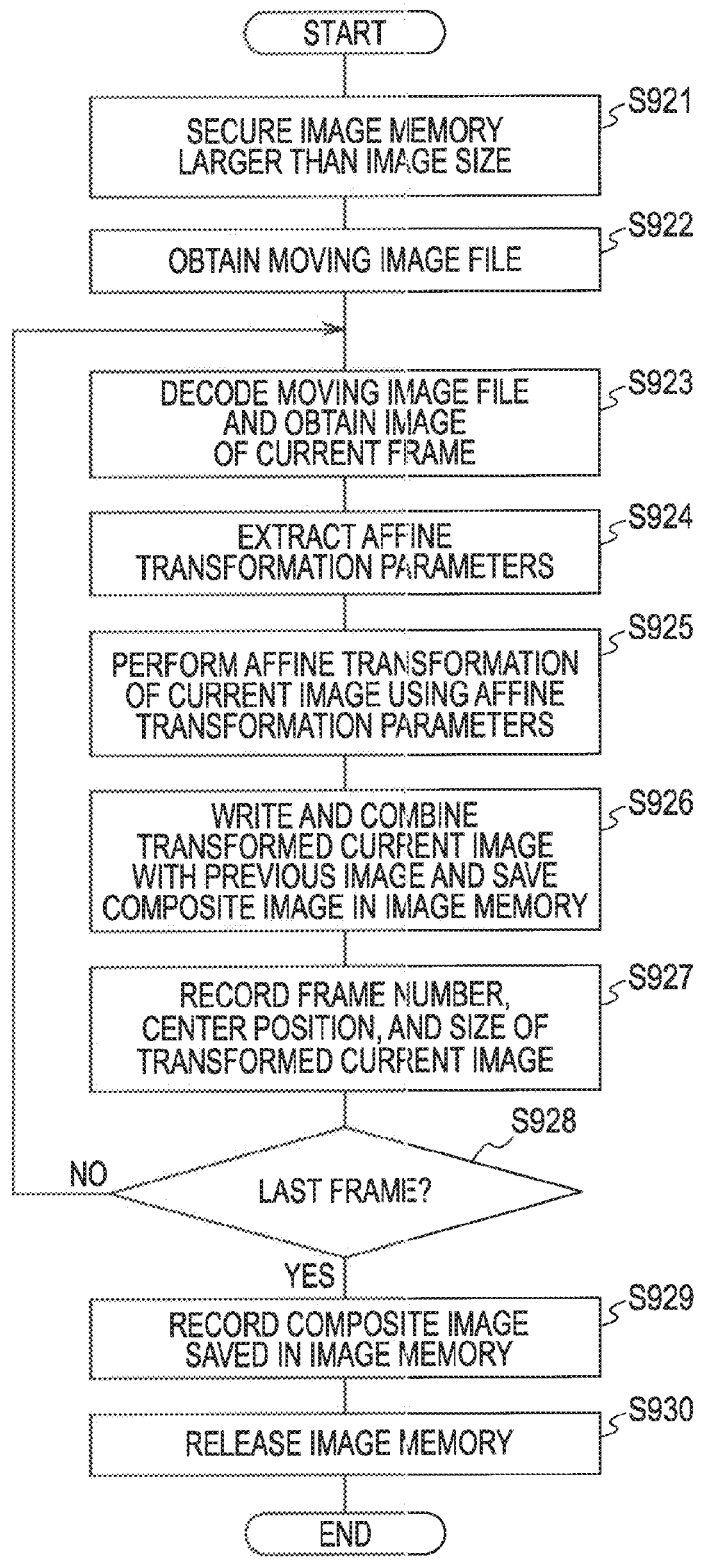
FIG. 23 is a flowchart showing a processing procedure of a panoramic-image generating process performed by the image processing apparatus 100 in the embodiment of the present invention.

FIG. 23 is a flowchart showing a processing procedure of a panoramic-image generating process performed by the image processing apparatus 100 in the embodiment of the present invention.

At first, a work buffer larger than the size of images constituting a moving image is secured in the image memory 170 (step S921). Then, a moving image file is obtained from the moving-image storage unit 200 (step S922). Then, the obtained moving image file is decoded, and the current frame, which is one frame, is obtained (step S923).

Then, affine transformation parameters corresponding to the obtained current frame are extracted from the moving image file (step S924). Here, when the current frame is the head frame, affine transformation parameters of an identity matrix are extracted. Then, the image corresponding to the current frame is affine-transformed using the obtained affine transformation parameters (step S925). Here, when the current frame is the head frame, an affine transformation is performed using the affine transformation parameters of the identity matrix. Therefore, the actual image is not transformed. Then, the affine-transformed image corresponding to the current frame is written over and combined with a composite image of individual images corresponding to frames preceding the current frame, and a composite image combined with the image corresponding to the current frame is saved in the image memory 170 (step S926). Here, when the current frame is the head frame, the image corresponding to the head frame is saved in the image memory 170. Then, the center position and the image size of the affine-transformed image corresponding to the current frame in the work buffer of the image memory 170 are recorded, together with the frame number of the current frame, in the image-position storage unit 210 (step S927). Here, when the current frame is the head frame, the center position and the image size of the image corresponding to the head frame in the work buffer of the image memory 170 are recorded, together with the frame number "1", in the image-position storage unit 210.

Then, it is determined whether or not, among frames constituting the input moving image file, the current frame is the last frame (step S928). When the current frame is not the last frame (step S928), the flow returns to step S923, and the composite-image generating process is repeated (steps S923 to S927).

In contrast, when the current frame is the last frame (step S928), the composite image held in the image memory 170 is output to and recorded in the representative-image storage unit 220 (step S929). In this case, a size-reduced image of the composite image held in the image memory 170 is generated, and the size-reduced image is output to and recorded in the representative-image storage unit 220. Then, the secured work buffer is released (step S930), and the panoramic-image generating process is terminated.

Figure 24:
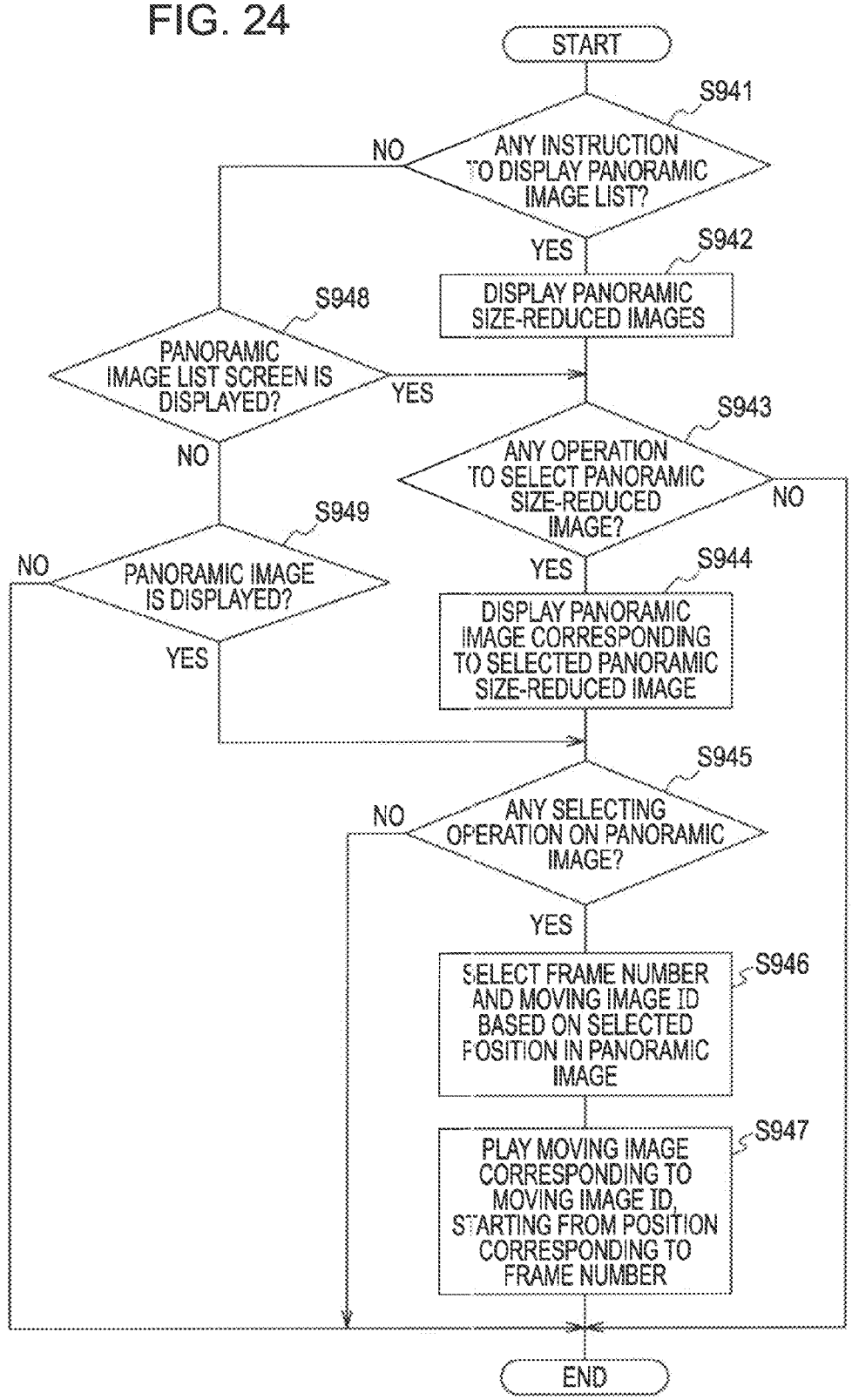
FIG. 24 is a flowchart showing a processing procedure of a moving-image playing process performed by the image processing apparatus 100 in the embodiment of the present invention.

FIG. 24 is a flowchart showing a processing procedure of a moving-image playing process performed by the image processing apparatus 100 in the embodiment of the present invention. In this processing procedure, the case in which a moving image stored in the moving-image storage unit 200 is played, starting from a desired position, using a panoramic image stored in the representative-image storage unit 220 will be described by way of example.

At first, it is determined whether or not an operation input for displaying a panoramic image list screen is accepted by the operation accepting unit 230 (step S941). When an operation input for displaying a panoramic image list screen is accepted (step S941), a panoramic image list screen is displayed on the display unit 260 (step S942). For example, as shown in FIG. 21, the panoramic image list screen 600 is displayed. In contrast, when an operation input for displaying a panoramic image list screen is not accepted (step S941), it is determined whether or not a panoramic image list screen is displayed on the display unit 260 (step S948). When a panoramic image list screen is displayed (step S948), the flow proceeds to step S943. When a panoramic image list screen is not displayed (step S948), the flow proceeds to step S949.

Then, it is determined whether or not an operation input for selecting one panoramic image from among panoramic images included in the panoramic image list screen displayed on the display unit 260 is accepted by the operation accepting unit 230 (step S943). When an operation input for selecting a panoramic image is accepted (step S943), a panoramic image display screen displaying the selected panoramic image on the entire screen is displayed on the display unit 260 (step S944). For example, as shown in FIG. 22(a), the panoramic image display screen 610 is displayed. In contrast, when an operation input for selecting a panoramic image is not accepted (step S943), the moving-image playing process is terminated.

When an operation input for displaying a panoramic image list screen is not accepted (step S941), and, when a panoramic image list screen is not displayed (step S948), it is determined whether or not a panoramic image display screen is displayed on the display unit 260 (step S949). When a panoramic image display screen is displayed (step S949), the flow proceeds to step S945. When a panoramic image display screen is not displayed (step S949), the moving-image playing process is terminated.

Then, it is determined whether or not an operation input for selecting a portion of the panoramic image included in the panoramic image display screen displayed on the display unit 260 is accepted by the operation accepting unit 230 (step S945). For example, as shown in FIG. 22(a), a portion of the panoramic image 620 is selected using the cursor 629. When an operation input for selecting a portion of the panoramic image included in the panoramic image display screen is accepted (step S945), on the basis of the selected position in the panoramic image, the frame number and the moving image ID are selected from the image-position storage unit 210 (step S946). Then, a moving image corresponding to the selected moving image ID is retrieved from the moving-image storage unit 200, and additionally playback of the retrieved moving image starts from a position corresponding to the selected frame number (step S947). In contrast, when an operation input for selecting a portion of the panoramic image included in the panoramic image display screen is not accepted (step S945), the moving-image playing process is terminated.

As above, the example in which a moving image is played, starting from a desired position, by selecting an arbitrary position in a panoramic image has been described. Furthermore, index images that are representative images included in a moving image may be extracted from the moving image, and the index images may be displayed on a panoramic image. By selecting one of the index images on the panoramic image, the moving image can be played, starting from a desired position. This example will be described in detail below with reference to the drawings.

Figure 25:
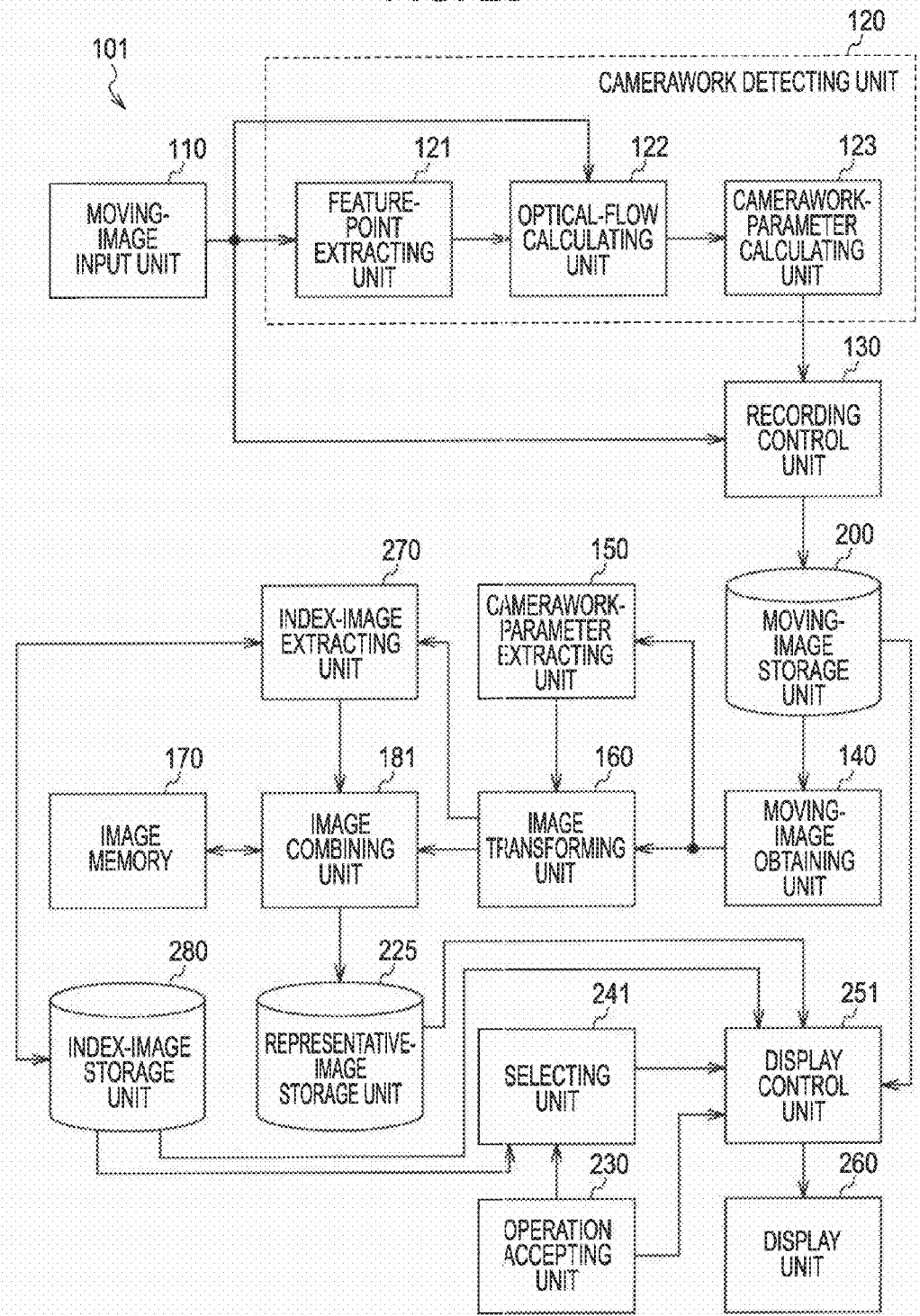
FIG. 25 is a block diagram showing a functional structure example of an image processing apparatus 101 in an embodiment of the present invention.

FIG. 25 is a block diagram showing a functional structure example of an image processing apparatus 101 in an embodiment of the present invention. Here, the image processing apparatus 101 is an apparatus obtained by modifying part of the image processing apparatus 100 shown in FIG. 1. The image processing apparatus 101 is an image processing apparatus in which, instead of the image combining unit 180, the image-position obtaining unit 190, the representative-image storage unit 220, the image-position storage unit 210, the selecting unit 240, and the display control unit 250 of the image processing apparatus 100, an image combining unit 181, an index-image extracting unit 270, a representative-image storage unit 225, an index-image storage unit 280, a selecting unit 241, and a display control unit 251 are provided. Note that structures other than the image combining unit 181, the index-image extracting unit 270, the representative-image storage unit 225, the index-image storage unit 280, the selecting unit 241, and the display control unit 251 are similar to those of the image processing apparatus 100 shown in FIG. 1, and accordingly descriptions of these other structures are omitted.

The index-image extracting unit 270 is configured to extract, on the basis of a transformed image output from the image transforming unit 160 and index images stored in the index-image storage unit 280, an index image from each of images constituting a moving image in a moving image file output from the moving-image obtaining unit 140, and outputs the extracted index image, together with a frame number and position information corresponding to the extracted index image, to the index-image storage unit 280. Specifically, the index-image extracting unit 270 extracts an index image on the basis of the rate of overlap between each index image stored in the index-image storage unit 280 and an affine-transformed image corresponding to the current frame.

Also, when the index-image extracting unit 270 has extracted the index image, the index-image extracting unit 270 outputs information indicating that the image corresponding to the current frame is an index image to the image combining unit 181. Note that the index-image extracting method will be described in detail with reference to FIG. 27.

The index-image storage unit 280 is configured to store an index image output from the index-image extracting unit 270 in association with the frame number and position information thereof. The index-image storage unit 280 outputs the stored index image to the display control unit 251, and additionally outputs the frame number and position information to the selecting unit 241. Also, the index-image storage unit 280 outputs the stored position information to the index-image extracting unit 270. Note that each item of information stored in the index-image storage unit 280 will be described in detail with reference to FIG. 26.

When information indicating that the image corresponding to the current frame is an index image is input from the index-image extracting unit 270, the image combining unit 181 adds an index image marker indicating that this image is an index image to the periphery of the image corresponding to the current frame. For example, as indicated by index images 551 to 558 in FIG. 28(*a*), index image markers are added. Note that, since image combining and the like apart from the above are similar to those of the image combining unit 180, descriptions thereof are omitted here.

The representative-image storage unit 225 is configured to store a composite image output from the image combining unit 181 as a panoramic image regarding a moving image stored in the moving-image storage unit 200, and supplies the stored panoramic image to the display control unit 251.

The selecting unit 241 is configured to, when an index-image selecting operation on a panoramic image, which is accepted by the operation accepting unit 230, is entered, select a frame number from among frame numbers stored in the index-image storage unit 280, on the basis of the position information of the index image stored in the index-image storage unit 280, and to output the selected frame number and a moving image ID corresponding to this to the display control unit 251. Note that the selection will be described in detail with reference to FIG. 28.

The display control unit 251 is configured to control displaying of, in response to an operation input of the operation accepting unit 230, a list of index images stored in the index-image storage unit 280, a panoramic image stored in the representative-image storage unit 225, or a moving image stored in the moving-image storage unit 200 on the display unit 260. Also, when the frame number and the moving image ID are input from the selecting unit 241, the display control unit 251 searches the moving-image storage unit 200 for a moving image corresponding to the moving image ID, and additionally starts playing the retrieved moving image from a position corresponding to the frame number.

FIG. 26 is a diagram schematically showing the details stored in the index-image storage unit 280 in the embodiment of the present invention.

In the index-image storage unit 280, items of information regarding index images extracted by the index-image extracting unit 270 are stored in time series on a frame-by-frame basis. Specifically, a moving image ID 281, a frame number 282, position information 283, and an index image 284 are stored in association with one another in the index-image storage unit 280.

The moving image ID 281 is an ID corresponding to each moving image stored in the moving-image storage unit 200.

The frame number 282 is an identification number of a frame corresponding to an index image extracted by the index-image extracting unit 270.

The position information 283 is information that indicates the position of an index image extracted by the index-image extracting unit 270 in the work buffer of the image memory 170. For example, when the work buffer of the image memory 170 has xy coordinates, the coordinate values corresponding to four vertices of an index image extracted by the index-image extracting unit 270 are recorded. That is, coordinate positions in an image capturing space defined by camera movement information at the time of capturing a captured moving image are recorded as the position of an index image extracted by the index-image extracting unit 270. This image capturing space is, for example, an image space corresponding to a representative image generated by the image combining unit 181 using affine transformation parameters calculated on the basis of the amount of the camera movement at the time of capturing a captured moving image input from the moving-image input unit 110. Note that, in the embodiment of the present invention, an example in which coordinate values corresponding to four vertices of an index image extracted by the index-image extracting unit 270 are used as position information of the index image will be described. However, as the position information of the index image, other position information, such as the center position and size of the image, may be used.

The index image 284 is an index image extracted by the index-image extracting unit 270.

Figure 27:
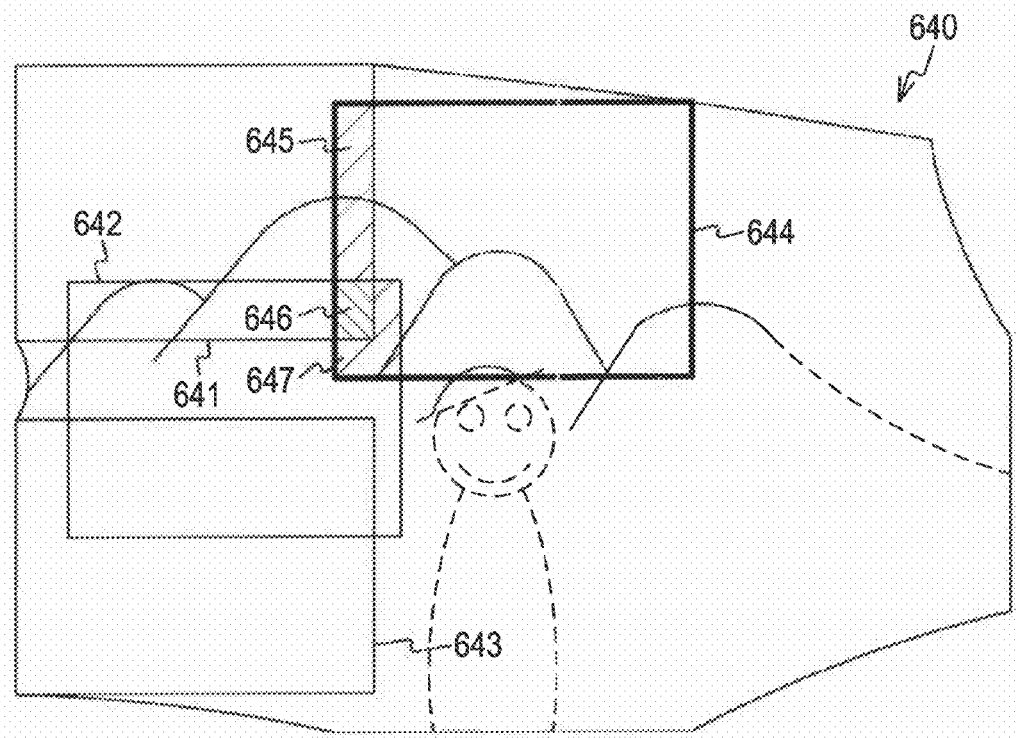
FIG. 27 is a diagram schematically showing an example of an extraction method in the case where an index image is extracted in the embodiment of the present invention.

FIG. 27 is a diagram schematically showing an example of an extraction method in the case where an index image is extracted in the embodiment of the present invention. A composite image 640 shown in FIG. 27 is shown as a simplified composite image that is currently being generated by the image combining unit 180. In this example, in the composite image 640, images 641 to 643 are extracted as index images.

In the case where an index image is to be extracted, a determination is made on the basis of the rate of overlap between each index image stored in the index-image storage unit 280 (image that has already been extracted as an index image) and an affine-transformed image corresponding to the current frame. Specifically, the rate of overlap between each index image stored in the index-image storage unit 280 (image that has already been extracted as an index image) and an affine-transformed image corresponding to the current frame is calculated. For example, it is assumed that an image 644 shown in FIG. 27 is an affine-transformed image corresponding to the current frame. In this case, the rate of overlap between the image 644 and each of the images 641 to 643, which are index images, is calculated. Regarding the image 644, an overlap region 645 that overlaps only the image 641, an overlap region 646 that overlaps the images 641 and 642, and an overlap region 647 that overlaps only the image 642 are regions that overlap the images 641 to 643. In FIG. 27, the overlap regions 645 to 647 are indicated by oblique lines. The areas of the overlap regions 645 to 647 are added. The value of the added areas (the total area of the overlap regions 645 to 647) is compared with a preset threshold, and, when the value of the rate of overlap, which is the proportion of the total area of the overlap regions 645 to 647 to the area of the entire image 644, is less than or equal to the threshold, it is an image that has less overlap with other index images. As above, an image that has less overlap with other index images is extracted as an index image. A frame number corresponding to the extracted index image, the coordinate values corresponding to four vertices of the index image, and the index image are stored in association with the moving image ID in the index-image storage unit 280.

As above, when an index image is extracted, the index-image extracting unit 270 outputs information indicating that the image corresponding to the current frame is an index image to the image combining unit 181. An index image marker indicating that the image corresponding to the current frame is an index image is added to the periphery of the image corresponding to the current frame in the composite image generated by the combining performed by the image combining unit 181. For example, as shown in FIG. 27, a bald border is added to the periphery of the image 644 in the composite image 640. Note that, when a plurality of index images overlap, an index image marker that has the latest image shooting time is written over other index image markers. For example, an index image marker of the image 644 is written over index image markers of the index images 641 to 643. Also, for example, as shown in FIG. 28(*a*), index image markers of the index images 551 to 558 are overwritten in accordance with the image shooting times. In the embodiment of the present invention, an example in which a new index image is extracted on the basis of the rates of overlap between all images that have already been extracted as index images and an affine-transformed image corresponding to the current frame will be described. However, for example, a new index image may be extracted on the basis of the rate of overlap between one or a predetermined number of index images that have been extracted immediately before the current frame and the affine-transformed image corresponding to the current frame. As above, by using one or a predetermined number of index images that have been extracted immediately before the current frame as comparison targets, for images that exist at relatively near positions in the image capturing space, an image with a relatively early image shooting time and an image with a relatively late image shooting time can be extracted as index images.

FIG. 28(*a*) is a diagram showing an example of a panoramic image generated by the combining performed using the image combining unit 181 on a moving image shot by a camera. For a moving image corresponding to a panoramic image 550 shown in FIG. 28(*a*), index images 551 to 558 are extracted. Also, the panoramic image 550 is a panoramic image generated for the same moving image as that of the panoramic image 540 shown in FIG. 20. The panoramic image 550 is different from the panoramic image 540 in that index image markers are added to the periphery of the index images 551 to 558. Note that, since a method of displaying the panoramic image 550 is similar to the panoramic-image displaying method described with reference to FIG. 21 and FIG. 22, a description thereof is omitted here.

FIG. 28(*b*) is a diagram showing the relationship between frames 571 to 578 included in a moving image 570 corresponding to the panoramic image 550 shown in FIG. 28(*a*) and index images 561 to 568. Note that the index images 561 to 568 are images that correspond to the index images 551 to 558 shown in FIG. 28(*a*) and are stored in the index-image storage unit 280. Also, the correspondence relationships between the frames 571 to 578 and the list images 561 to 568 are indicated by arrows. Here, it is assumed that the frames included in the moving image 570 are arranged in time series, starting from "0", which is indicated by an arrow 579.

Next, the case in which a moving image is played using a panoramic image to which index image markers are added will be described in detail with reference to the drawings.

Here, the case in which, in the case where the panoramic image 550 shown in FIG. 28(*a*) is displayed on the display unit 260, the moving image 570 is to be played will be described. In the panoramic image 550 displayed on the display unit 260, a user operates a cursor (not shown in the drawings) by entering an operation input from the operation accepting unit 230 and selects any portion of the index images 551 to 558 included in the panoramic image 550. For example, any portion of the index images 551 to 558 included in the panoramic image 550 is double clicked using a mouse. On the basis of the position selected by this selecting operation, playback of the moving image 570 starts from a predetermined position. Specifically, a rectangle including, in the panoramic image 550, a position selected by performing a selecting operation of any of the index images 551 to 558 is detected in a rectangle specified by the coordinates of four vertices recorded in the position information 283 of the index-image storage unit 280 in correspondence with the moving image 570, and the frame number 282 and the moving image ID 281 corresponding to this rectangle (coordinates of four vertices) are selected. When the selected frame number 282 and moving image ID 282 are output to the display control unit 251, the display control unit 251 searches the moving-image storage unit 200 for a moving image corresponding to the moving image ID 281, and additionally starts playing the retrieved moving image, from a position corresponding to the frame number 282. Note that, when an overlap portion where a plurality of index images overlap is selected from among the index images 551 to 558 included in the panoramic image 550, an index image with the latest image shooting time is selected. That is, an index image with the largest frame number is selected. As above, an index image is selected in accordance with regions surrounded by displayed index image markers.

Alternatively, index images stored in the index-image storage unit 280 may be displayed as list images, and a moving image may be played using the list images. For example, as shown in FIG. 28(*b*), index images can be arranged, on a moving-image-by-moving-image basis, on the basis of image shooting times. By selecting one from among the index images arranged in this manner, a moving image can be played, as has been described above. Also, for example, displaying of a panoramic image to which index image markers are added and displaying of index images arranged in time series on the basis of image shooting times may be switched by performing a click operation using a mouse. In this case, for example, the trails of the index images at the time of switching may be displayed using animation.

Next, the operation of the image processing apparatus 101 in the embodiment of the present invention will be described with reference to the drawings.

Figure 29:
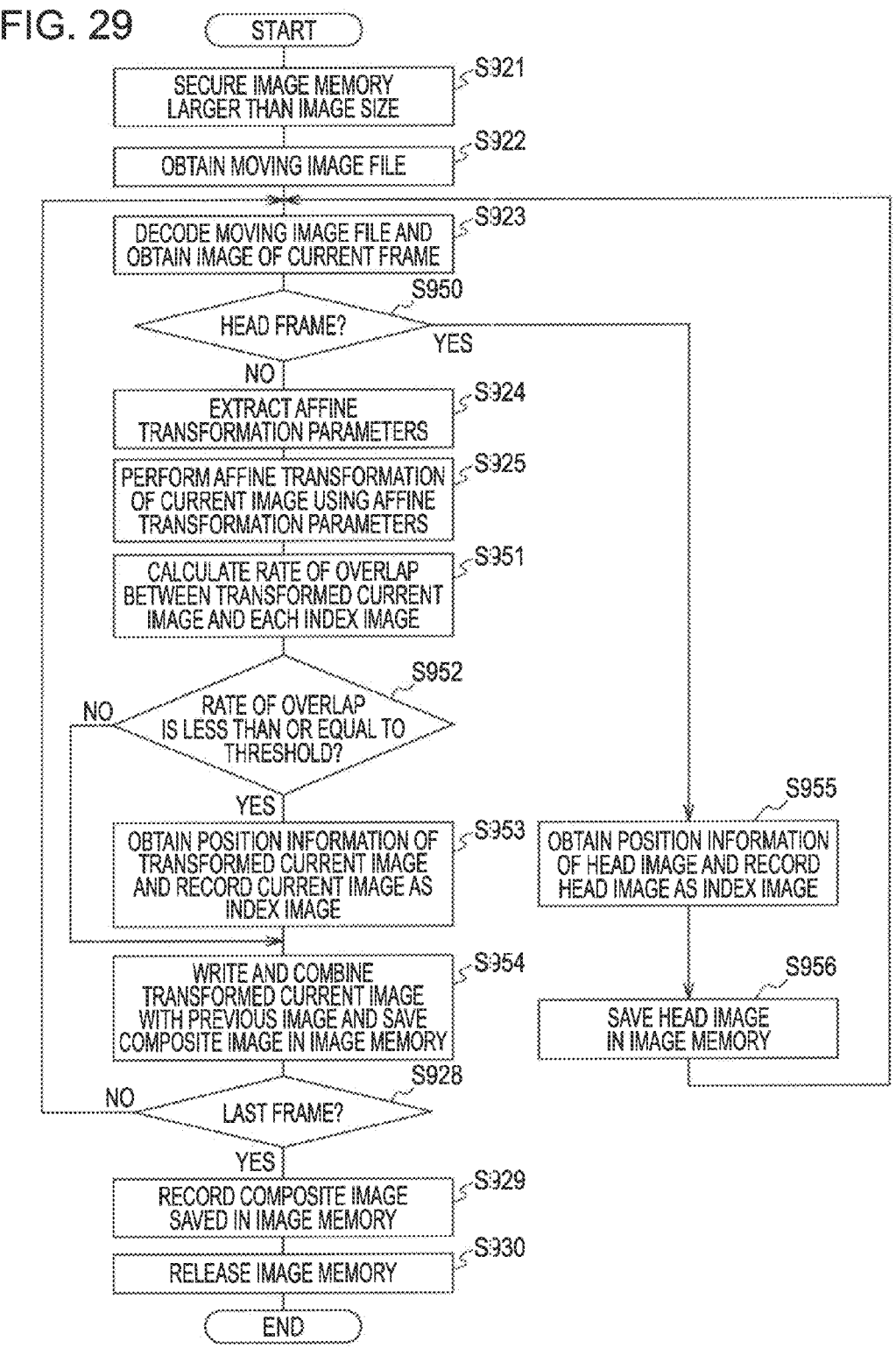
FIG. 29 is a flowchart showing a processing procedure of a panoramic-image generating process performed by the image processing apparatus 101 in the embodiment of the present invention.

FIG. 29 is a flowchart showing a processing procedure of a panoramic-image generating process performed by the image processing apparatus 101 in the embodiment of the present invention. Note that, in the processing procedure shown in FIG. 29, since steps S921 to S925 and steps S928 to S930 are similar to the processing procedure shown in FIG. 23, descriptions thereof are omitted here.

It is determined whether or not the current frame obtained in step S923 is the head frame among frames constituting a moving image (step S950). When the current frame is the head frame (step S950), position information of the image corresponding to the current frame in the work buffer of the image memory 170 is obtained, and the position information and the frame number "1" are recorded in the index-image storage unit 280 (step S955). Then, the image corresponding to the current frame is saved in the image memory 170 (step S956). In contrast, when the current frame is not the head frame (step S950), the flow proceeds to step S924.

The rate of overlap between the image corresponding to the current frame, which has been affine-transformed in step S925 using affine transformation parameters, and each index image stored in the index-image storage unit 280 is calculated (step S951). Then, it is determined whether the value of the rate of overlap, which has been obtained by calculation, is greater than or equal to a threshold (step S952). When the value of the rate of overlap, which has been obtained by calculation, is not less than or equal to the threshold (step S952), the flow proceeds to step S954. In contrast, when the value of the rate of overlap, which has been obtained by calculation, is less than or equal to the threshold (step S952), position information of the image corresponding to the current frame in the work buffer of the image memory 170 is obtained, and the position information and the frame number are recorded in the index-image storage unit 280 (step S953). Then, the affine-transformed image corresponding to the current frame is written over and combined with a composite image of individual images corresponding to frames preceding the current frame, and a composite image combined with the image corresponding to the current frame is saved in the image memory 170 (step S954). In this case, an index image marker is added to the periphery of the image corresponding to the current frame.

Figure 30:
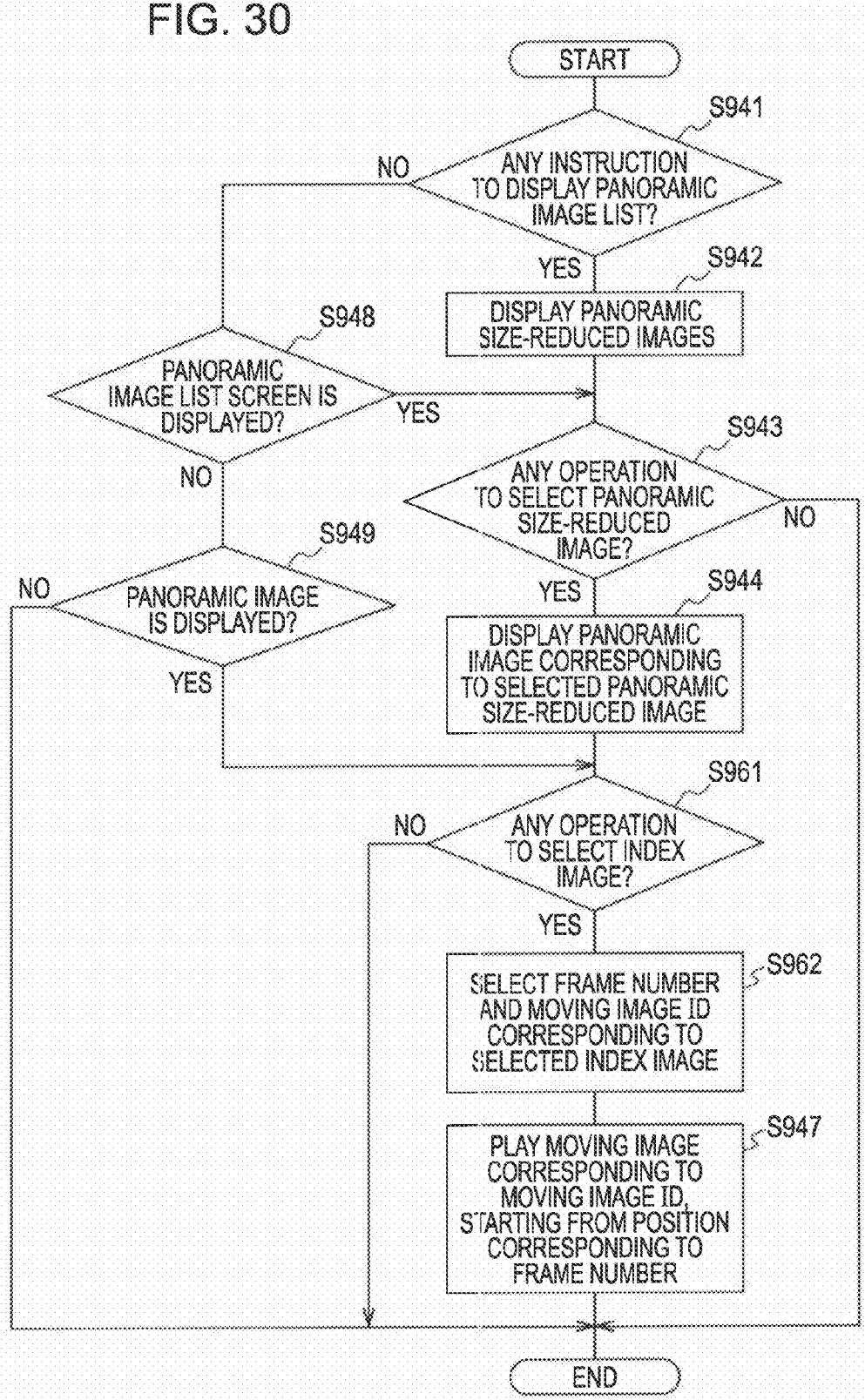
FIG. 30 is a flowchart showing a processing procedure of a moving-image playing process performed by the image processing apparatus 101 in the embodiment of the present invention.

FIG. 30 is a flowchart showing a processing procedure of a moving-image playing process performed by the image processing apparatus 101 in the embodiment of the present invention. In this processing procedure, the case in which a moving image stored in the moving-image storage unit 200 is played, starting from a desired position, using index images included in a panoramic image stored in the representative-image storage unit 225 will be described by way of example. Note that, in the processing procedure shown in FIG. 30, since steps S941 to S944 and steps S947 to S949 are similar to the processing procedure shown in FIG. 24, descriptions thereof are omitted here.

In the case where a panoramic image display screen is displayed on the display unit 260 (step S944 and step S949), it is determined whether or not an operation input for selecting an index image included in a panoramic image on the panoramic image display screen is accepted by the operation accepting unit 230 (step S961). When an operation input for selecting an index image included in the panoramic image is accepted (step S962), the frame number and the moving image ID stored in the index-image storage unit 280 in correspondence with the selected index image are selected (step S962). In contrast, when an operation input for selecting an index image included in the panoramic image on the panoramic image display screen is not accepted (step S961), the moving-image playing process is terminated.

As above, regarding extracted index images, the case where the index images are displayed by adding index image markers to a panoramic image or the case where the index images are arranged in time series and displayed has been described by way of example. Here, an example in which, using frame numbers and position information stored in the index-image storage unit 280, index images are virtually arranged in a three-dimensional space and the index images in the three-dimensional space are displayed will be described in detail with reference to the drawings. That is, the index images virtually arranged in the three-dimensional space are projected onto a plane and displayed as three-dimensional images on the display unit 260. Here, the three-dimensional space in the embodiment of the present invention is space constituted by two-dimensional space (plane) corresponding to a captured image and one-dimensional space corresponding to the time axis.

FIG. 31 and FIG. 32 include diagrams schematically showing the case where index images stored in the index-image storage unit 280 in the embodiment of the present invention are virtually arranged in a three-dimensional space. In FIG. 31 and FIG. 32, the case where index images 701 to 708 are arranged in a three-dimensional space defined by x-axis, y-axis, and t-axis is illustrated. Here, x-axis is an axis that indicates the horizontal direction relative to images constituting a moving image that has been shot. Also, y-axis is an axis that indicates the vertical direction relative to images constituting a moving image that has been shot. Furthermore, t-axis is a time axis relative to images constituting a moving image that has been shot.

FIG. 31(a) and FIG. 32(a) are diagrams showing the case where the index images 701 to 708 arranged in the three-dimensional space are viewed from the front side in the t-axis direction. Note that FIG. 31(a) and FIG. 32(a) are the same diagram. FIG. 31(b) is a diagram showing the case where the index images 701 to 708 arranged in the three-dimensional space are viewed from the upper side in the y-axis direction. Also, FIG. 32(b) is a diagram showing the case where the index images 701 to 708 arranged in the three-dimensional space are viewed from the left lateral side in the x-axis direction. Here, in FIG. 31 to FIG. 34, a description will be given by schematically showing the index images 701 to 708 as rectangles, and additionally, adding the characters "H1" to "H8" to the inside of the rectangles indicating the individual images.

As shown in FIG. 31 and FIG. 32, the index images 701 to 708 are arranged in time series with respect to the t-axis on the basis of the frame numbers stored in association with the individual index images. Also, on the basis of the position information stored in association with the individual index images, the index images 701 to 708 are arranged at positions in the image shooting space with respect to the x-axis and the y-axis.

As above, the index image 701 to 708 virtually arranged in the three-dimensional space are projected onto a plane and displayed as three-dimensional images on the display unit 260.

FIG. 33 includes diagrams showing display examples of the index images 701 to 708 virtually arranged in a three-dimensional space. In FIG. 33(a), an index-image display screen 710 that displays the upper side of the index images 701 to 708 is shown. Note that the arrangement configuration of the index images 701 to 708 included in the index-image display screen 710 is similar to the arrangement configuration shown in FIG. 31(b). In FIG. 33(b), an index-image display screen 720 that displays the lateral side of the index images 701 to 708 is shown. Note that the arrangement configuration of the index images 701 to 708 included in the index-image display screen 720 is similar to the arrangement configuration shown in FIG. 32(b). Note that the upper side and the lateral side of each index image can be schematically displayed using, for example, a rectangle according to the size of each index image.

Here, only display examples of the upper side and the lateral side of the index images 701 to 708 virtually arranged in the three-dimensional space are illustrated. However, besides than these displays, index images virtually arranged in the three-dimensional space can be displayed so that they can be viewed from each direction in accordance with an operation input entered by a user. For example, individual index images can be displayed so that they can be viewed from an upper-diagonally front direction.

As above, when individual index images are displayed, as has been described above, by selecting a desired index image from among the displayed index images, playback of a moving image can be started from a position corresponding to the selected index image. For example, a desired index image can be selected using a cursor 711 shown in FIG. 33(*a*) or a cursor 721 shown in FIG. 33(*b*).

As above, by displaying index images virtually arranged in the three-dimensional space, the space in which the moving image has been shot can be visually and easily understood, and additionally, the time during which the moving image has been shot can be visually and easily understood. Accordingly, spatial information and temporal information at the time of shooting a moving image can be visually and easily understood. Also, the details of the shooting of the moving image can be quickly understood on the basis of these items of information. Furthermore, a search can be easily conducted in the case where the moving image is to be played.

The example where playback of a moving image is started from a desired portion by selecting an index image from among displayed individual index images has been described above. Here, an example where, when index images virtually arranged in the three-dimensional space are displayed, by selecting a plurality of index images from among the displayed index images, a moving image is played, starting from a position corresponding to each of the selected index images, will be described in detail with reference to the drawings.

FIG. 34 includes diagrams showing display examples of the index images 701 to 708 virtually arranged in the three-dimensional space. In FIG. 34(*a*), an index-image display screen 730 that displays the front side of the index images 701 to 708 is shown. Note that the arrangement configuration of the index images 701 to 708 included in the index-image display screen 730 is similar to the arrangement configuration shown in FIGS. 31(*a*) and 32(*a*). In FIG. 34(*b*), an index-image display screen 740 that displays the upper side of the index images 701 to 708 is shown. Note that the arrangement configuration of the index images 701 to 708 included in the index-image display screen 740 is similar to the index-image display screen 720.

In this example, when the index-image display screen 730 or 740 is displayed, a plurality of index images are selected from among the individual index images included in the index-image display screen 730 or 740. For example, on the index-image display screen 730, the index images 701, 702, 707, and 708 are selected from among the index images 701 to 708. As a selecting method therefor, for example, selection can be made by performing a drag operation using a cursor 731 to specify a region enclosing index images to be selected. In FIG. 34(*a*), the region specified using the cursor 731 is indicated by dotted lines. In this case, for example, only index images whose all four corners are enclosed may be selected, or index images whose center positions of the four corners are enclosed may be selected. Also, the same applies to FIG. 34(*b*), and a plurality of index images can be selected using a cursor 741.

As above, when a plurality of index images are selected, the moving image is started from positions corresponding to the selected index images. For example, among the selected individual index images, the moving image is started from a position corresponding to the index image whose corresponding frame number is the smallest. In accordance with the order of corresponding frame numbers, the moving image is started from positions corresponding to the individual index images. That is, playback of the moving image starts in accordance with the image shooting time in ascending order. As above, when playback of the moving image starts from positions corresponding to the selected individual index images, after a predetermined time elapses, playback can be started from the next position. Also, together with the frame number corresponding to a selected index image, frame numbers corresponding to other index images may be output to the display control unit 251, and the moving image from the position corresponding to the selected index image to the position corresponding to the next frame number may be sequentially played.

Note that the selection of a plurality of index images can be similarly applied to the panoramic image shown in FIG. 28. Also, index images may be arranged in a two-dimensional space and displayed. Furthermore, images corresponding to individual frames or images at predetermined intervals may be arranged in the three-dimensional space and displayed.

As above, when index images virtually arranged in the three-dimensional space are displayed, a plurality of index images can be selected and sequentially played. Therefore, even when scenes spatially close to each other are shot at temporarily distant points, these scenes spatially close to each other can be played as a group. Also, a selecting operation therefor is easy.

The example where affine transformation parameters are recorded in a moving image file has been described above. However, affine transformation parameters may be recorded as accompanying information (e.g., meta-data) in a format different from that of a moving image file for each of frames constituting a moving image. Hereinafter, an example where affine transformation parameters are recorded in a meta-data file as accompanying information in a format different from that of a moving image file will be described in detail below with reference to the drawings.

Figure 35:
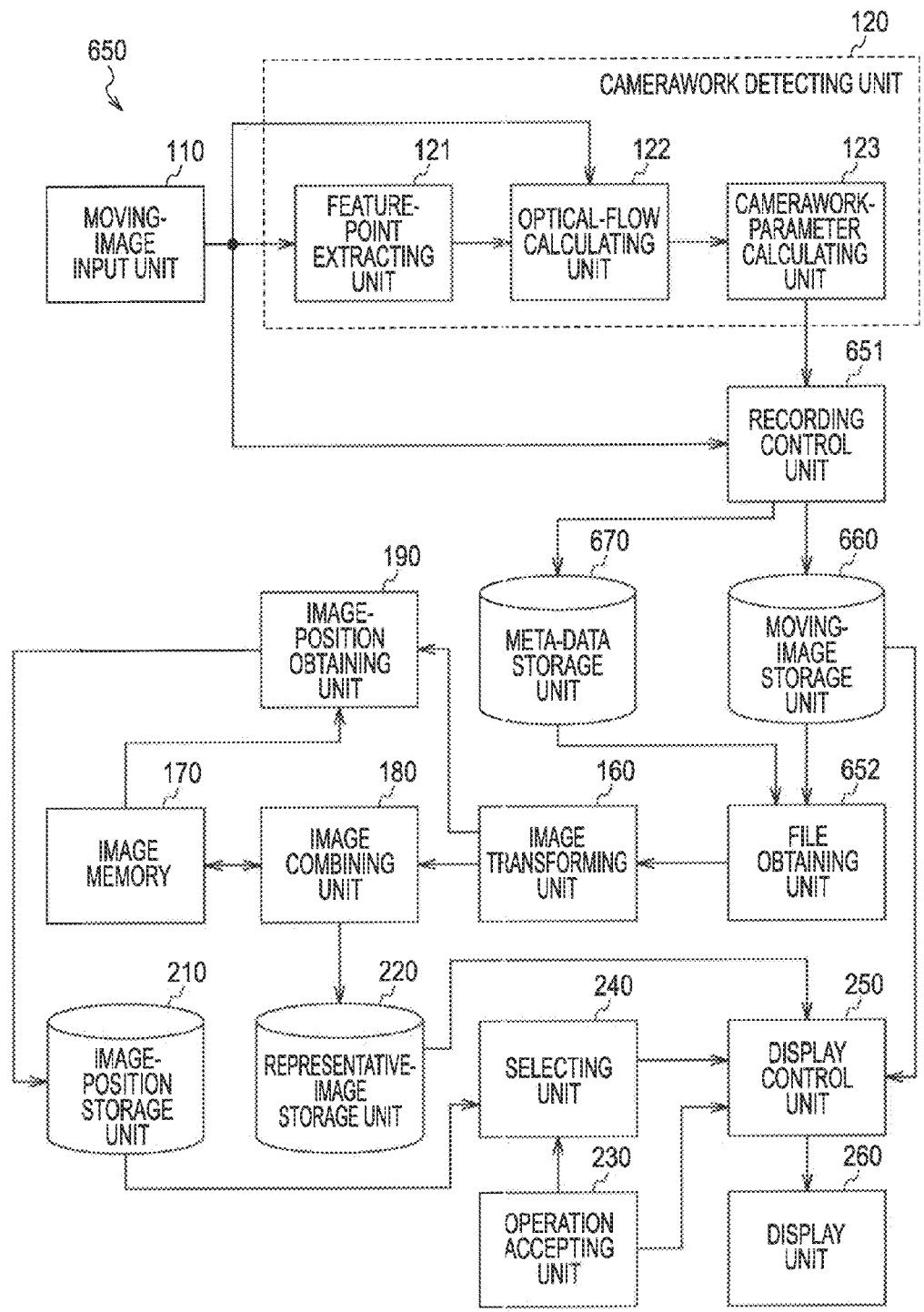
FIG. 35 is a block diagram showing a functional structure example of an image processing apparatus 650 in an embodiment of the present invention.

FIG. 35 is a block diagram showing a functional structure example of an image processing apparatus 650 in an embodiment of the present invention. Here, the image processing apparatus 650 is an apparatus obtained by modifying part of the image processing apparatus 100 shown in FIG. 1. The image processing apparatus 650 is an image processing apparatus in which, instead of the recording control unit 130, the moving-image storage unit 200, the moving-image obtaining unit 140, and the camerawork-parameter extracting unit 150 of the image processing apparatus 100, a recording control unit 651, a moving-image storage unit 660, a meta-data storage unit 670, and a file obtaining unit 652 are provided. Note that structures other than the recording control unit 651, the moving-image storage unit 660, the meta-data storage unit 670, and the file obtaining unit 652 are similar to those of the image processing apparatus 100 shown in FIG. 1, and accordingly descriptions of these other structures are omitted.

The recording control unit 651 is configured to record a moving image output from the moving-image input unit 110 as a moving image file in the moving-image storage unit 660, and additionally to record affine transformation parameters output from the camerawork-parameter calculating unit 123, in association with a corresponding moving image and a frame, as a meta-data file in the meta-data storage unit 670.

The moving-image storage unit 660 is configured to record a moving image output from the moving-image input unit 110 as a moving image file. Also, the moving-image storage unit 660 supplies a moving image file to the file obtaining unit 652 in response to a request from the file obtaining unit 652. Note that a moving image file stored in the moving-image storage unit 660 will be described in detail with reference to FIG. 36.

The meta-data storage unit 670 is configured to store affine transformation parameters output from the camerawork-parameter calculating unit 123 as a meta-data file. Also, the meta-data storage unit 670 supplies a meta-data file to the file obtaining unit 652 in response to a request from the file obtaining unit 652. Note that a meta-data file stored in the meta-data storage unit 670 will be described in detail with reference to FIG. 36.

The file obtaining unit 652 is configured to obtain a moving image file stored in the moving-image storage unit 660 and a meta-data file stored, in association with the moving image file, in the meta-data storage unit 670, and outputs a moving image in the obtained moving image file and affine transformation parameters in the meta-data file to the image transforming unit 160.

FIG. 36 includes diagrams schematically showing individual files recorded in the moving-image storage unit 660 and in the meta-data storage unit 670 in the embodiment of the present invention. In FIG. 36(*a*), moving image files 661 to 663 stored in the moving-image storage unit 660, and meta-data files 671 to 673 stored, in association with the moving image files 661 to 663, in the meta-data storage unit 670 are shown. Here, it is assumed that a moving image ID which is identification information for identifying each moving image file stored in the moving-image storage unit 660 is given to each moving image file. For example, "#1" is given to the moving image file 661; "#2" is given to the moving image file 662; and "#n" is given to the moving image file 663.

In FIG. 36(*b*), the moving image file 661 stored in the moving-image storage unit 661, and the meta-data file 671 stored, in association with the moving image file 661, in the meta-data storage unit 670 are schematically shown. Here, the moving image file 661 is a file containing a moving image constituted by n frames, and these n frames are indicated as frames 1 (664) to n (667).

Also, a moving image ID 674, a frame number 675, and affine transformation parameters 676 are stored in association with one another in the meta-data file 671.

The moving image ID 674 is a moving image ID given to a corresponding moving image file. For example, "#1" given to the moving image file 661 is stored.

The frame number 675 is a serial number of each of frames constituting a moving image in a corresponding moving image file. For example, "1" to "n" corresponding to the frames 1 (664) to n (667) constituting the moving image in the moving image file 661 are stored.

The affine transformation parameters 676 are affine transformation parameters calculated for each of frames of a moving image, which correspond to the frame number 675. Note that the affine transformation parameters 676 "a1, b1, c1, d1, e1, and f1" corresponding to the frame number 675 "1" are affine transformation parameters of an identity matrix. Also, the affine transformation parameters 676 "am, bm, cm, dm, em, and fm" corresponding to the frame number 675 "m (m is an integer greater than or equal to 2)" are affine transformation parameters corresponding to the frame "m−1" that immediately precedes the frame "m".

The image processing apparatus 650 obtained by modifying part of the image processing apparatus 100 shown in FIG. 1 has been described above as an example of recording affine transformation parameters in a meta-data file. The same technique can be similarly applied to the image processing apparatus 101 shown in FIG. 24.

Next, the case where a feature-point extracting process and an optical-flow calculating process in the embodiment of the present invention are performed with a multi-core processor will be described in detail with reference to the drawings.

Figure 37:
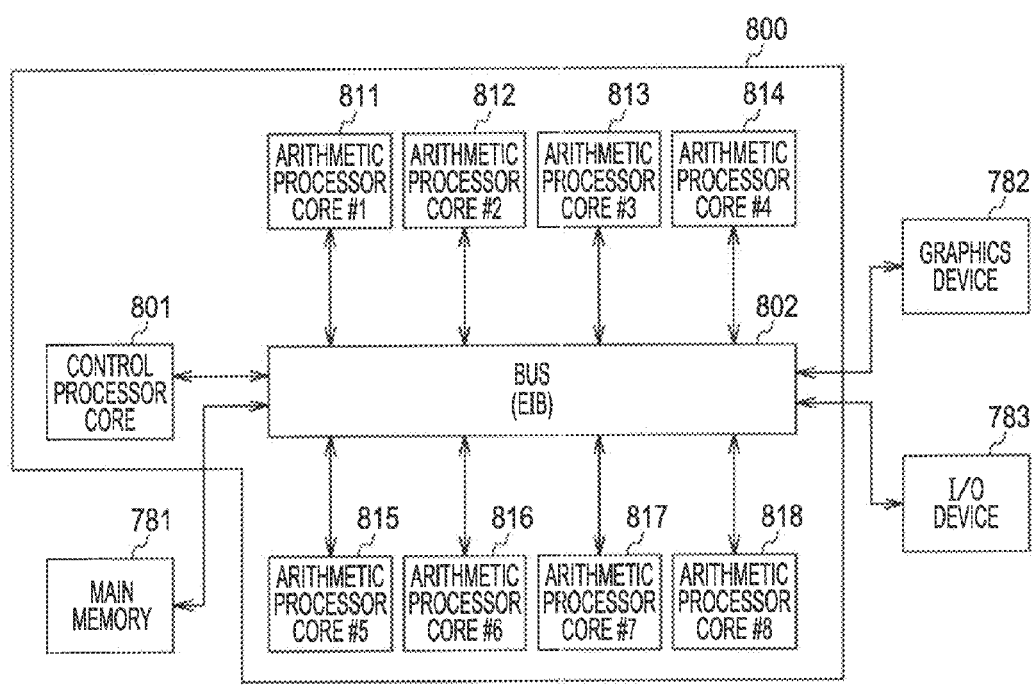
FIG. 37 is a diagram showing a structure example of a multi-core processor 800 in an embodiment of the present invention.

FIG. 37 is a diagram showing a structure example of a multi-core processor 800 in an embodiment of the present invention. The multi-core processor 800 is a processor in which a plurality of different types of processor cores are mounted on a single CPU (Central Processing Unit) package.

That is, in order to maintain the processing capability of each processor core unit and additionally to make the configuration simple, a plurality of processor cores including two types, one type corresponding to all applications and the other type optimized, to a certain degree, for a predetermined application, are mounted in the multi-core processor 800.

The multi-core processor 800 includes a control processor core 801, arithmetic processor cores (#1) 811 to (#8) 818, and a bus 802, and is connected to a main memory 781. Also, the multi-core processor 800 is connected to other devices, such as a graphics device 782 and an I/O device 783. As the multi-core processor 800, for example, "Cell (Cell Broadband Engine)", which is a microprocessor developed by the applicant of the present application, and the like can be adopted.

The control processor core 801 is a control processor core that mainly performs frequent thread switching, as in an operating system. Note that the control processor core 801 will be described in detail with reference to FIG. 38.

The arithmetic processor cores (#1) 811 to (#8) 818 are simple and compact arithmetic processor cores that are good at multimedia processing. Note that the arithmetic processor cores (#1) 811 to (#8) 818 will be described in detail with reference to FIG. 39.

The bus 802 is a high-speed bus called an EIB (Element Interconnect Bus). Each of the control processor core 801 and the arithmetic processor cores (#1) 811 to (#8) 818 is connected to the bus 802. Each processor core accesses data via the bus 802.

The main memory 781 is a main memory connected to the bus 802. The main memory 781 stores various programs to be loaded to each processor core, and data needed for processing performed by each processor core. Additionally, the main memory 781 stores data processed by each processor core.

The graphics device 782 is a graphics device connected to the bus 802. The I/O device 783 is an external input/output device connected to the bus 802.

Figure 38:
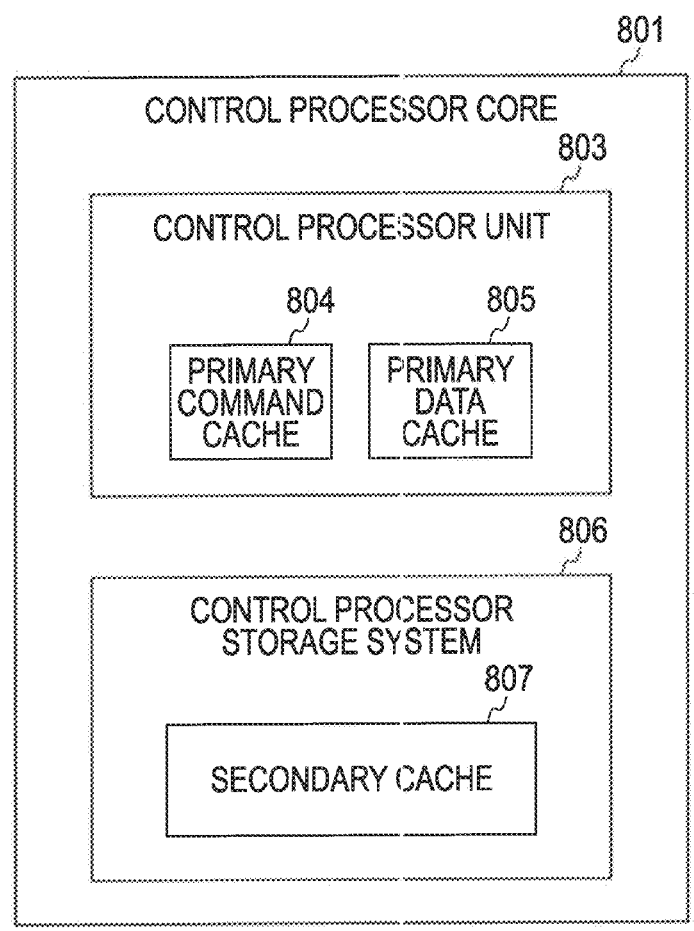
FIG. 38 is a diagram showing a structure example of a control processor core 801 in the embodiment of the present invention.

FIG. 38 is a diagram showing a structure example of the control processor core 801 in the embodiment of the present invention. The control processor core 801 includes a control processor unit 803 and a control processor storage system 806.

The control processor unit 803 is a unit that serves as a core that performs arithmetic processing performed by the control processor core 801 and includes a command set based on the architecture of a microprocessor. As primary caches, a command cache 804 and a data cache 805 are mounted. The command cache 804 is, for example, a 32-KB command cache. The data cache 805 is, for example, a 32-KB data cache.

The control processor storage system 806 is a unit that controls data access from the control processor unit 803 to the main memory 781. In order to increase the speed of memory access from the control processor unit 803, a 512-KB secondary cache 807 is mounted.

Figure 39:
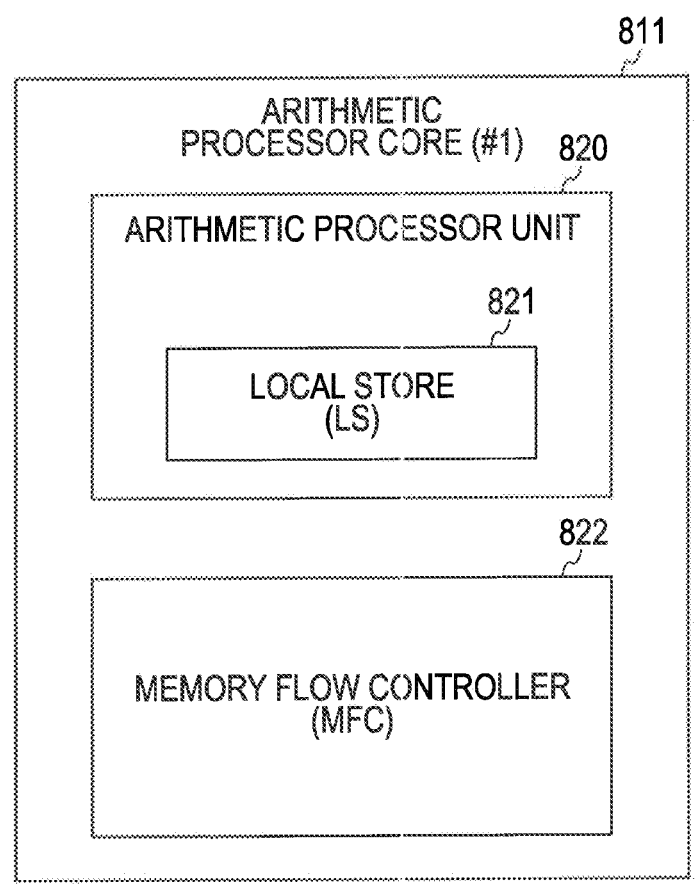
FIG. 39 is a diagram showing a structure example of an arithmetic processor core (#1) 811 in the embodiment of the present invention.

FIG. 39 is a diagram showing a structure example of the arithmetic processor core (#1) 811 in the embodiment of the present invention. The arithmetic processor core (#1) 811 includes an arithmetic processor unit 820 and a memory flow controller 822. Note that, since the arithmetic processor cores (#2) 812 to (#8) 818 have a structure similar to that of the arithmetic processor core (#1) 811, descriptions thereof are omitted here.

The arithmetic processor unit 820 is a unit that serves as a core that performs arithmetic processing performed by the arithmetic processor core (#1) 811 and includes a unique command set different from that of the control processor unit 803 in the control processor core 801. Also, a local store (LS) 821 is mounted in the arithmetic processor unit 820.

The local store 821 is a dedicated memory of the arithmetic processor unit 820, and, at the same time, an only memory that can be directly referred to from the arithmetic processor unit 820. As the local store 821, for example, a memory whose capacity is 256 KB can be used. Note that, in order that the arithmetic processor unit 820 may access the main memory 781 and local stores in the other arithmetic processor cores (arithmetic processor cores (#2) 812 to (#8) 818), it is necessary to use the memory flow controller 822.

The memory flow controller 822 is a unit for exchanging data between the main memory 781 and the other arithmetic processor cores and the like and is a unit called an MFC (Memory Flow Controller). Here, the arithmetic processor unit 820 requests the memory flow controller 822 via an interface called a channel to transfer data, for example.

Various programming models have been proposed as programming models of the multi-core processor 800 illustrated above. Among these programming models, a model that executes a main program on the control processor core 801 and executes sub-programs on the arithmetic processor cores (#1) 811 to (#8) 818 is known as the most basic model. In the embodiment of the present invention, an arithmetic method of the multi-core processor 800 using this model will be described in detail with reference to the drawings.

Figure 40:
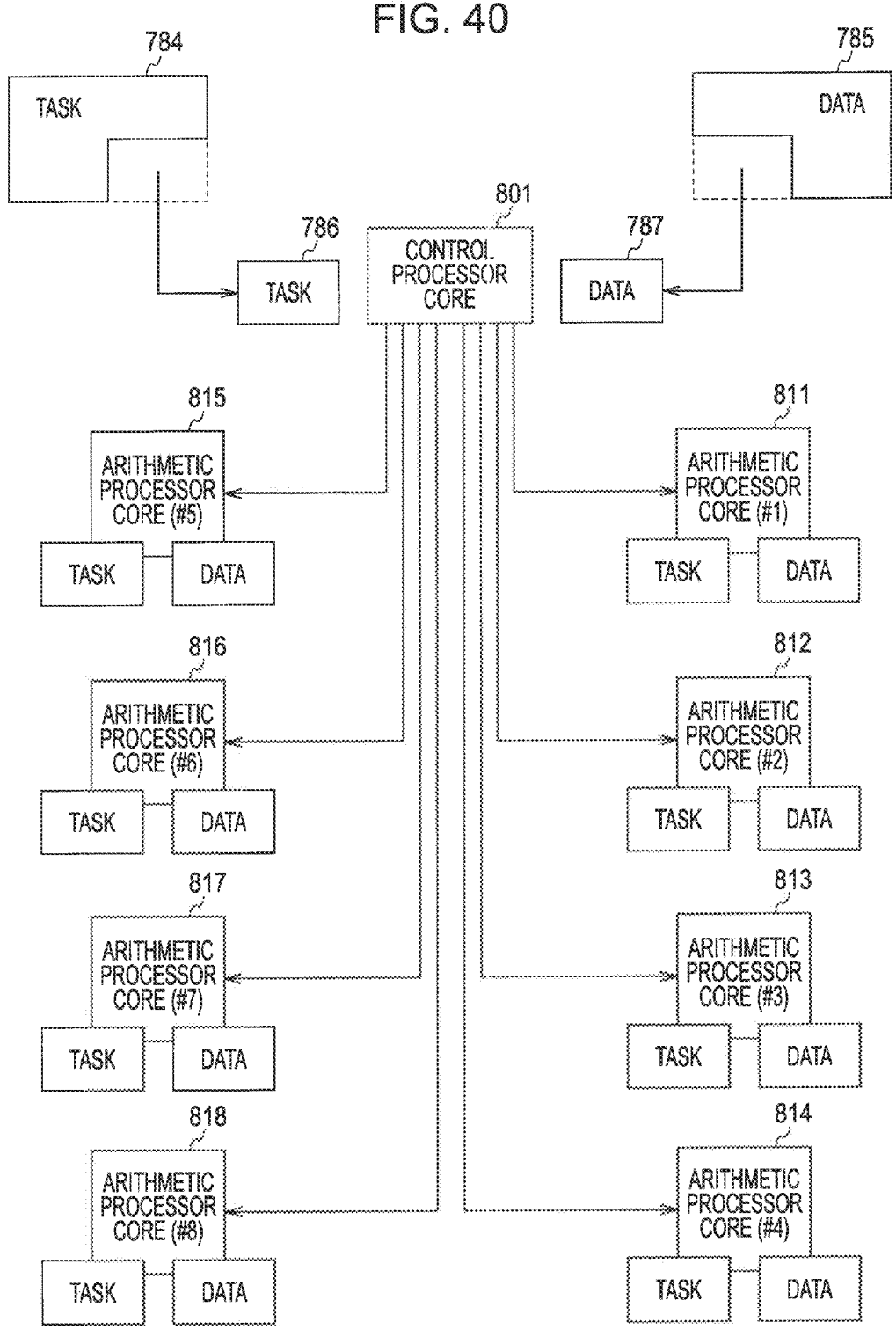
FIG. 40 is a diagram schematically showing an arithmetic method of the multi-core processor 800 in the embodiment of the present invention.

FIG. 40 is a diagram schematically showing an arithmetic method of the multi-core processor 800 in the embodiment of the present invention. In this example, the case where, when the control processor core 801 executes a task 784 using data 785, the control processor core 801 uses data 787 (part of the data 785) needed for processing of a task 786 that is part of the task 784 and causes individual arithmetic processor cores to execute the task 786 will be illustrated by way of example.

As shown in the diagram, when the control processor core 801 executes the task 784 using the data 785, the control processor core 801 uses the data 787 (part of the data 785) needed for processing of the task 786, which is part of the task 784, and causes individual arithmetic processor cores to execute the task 786. In the embodiment of the present invention, arithmetic processing is performed by individual arithmetic processor cores for each of frames constituting a moving image.

As shown in the diagram, when the multi-core processor 800 performs an operation, the arithmetic processor cores (#1) 811 to (#8) 818 can be used in parallel and many operations can be performed in a relatively short time. Additionally, relatively many arithmetic processes can be performed with a smaller number of commands by using a SIMD (Single Instruction/Multiple Data) operation on the arithmetic processor cores (#1) 811 to (#8) 818. Note that the SIMD operation will be described in detail with reference to FIG. 44 to FIG. 47 and the like.

Figure 41:
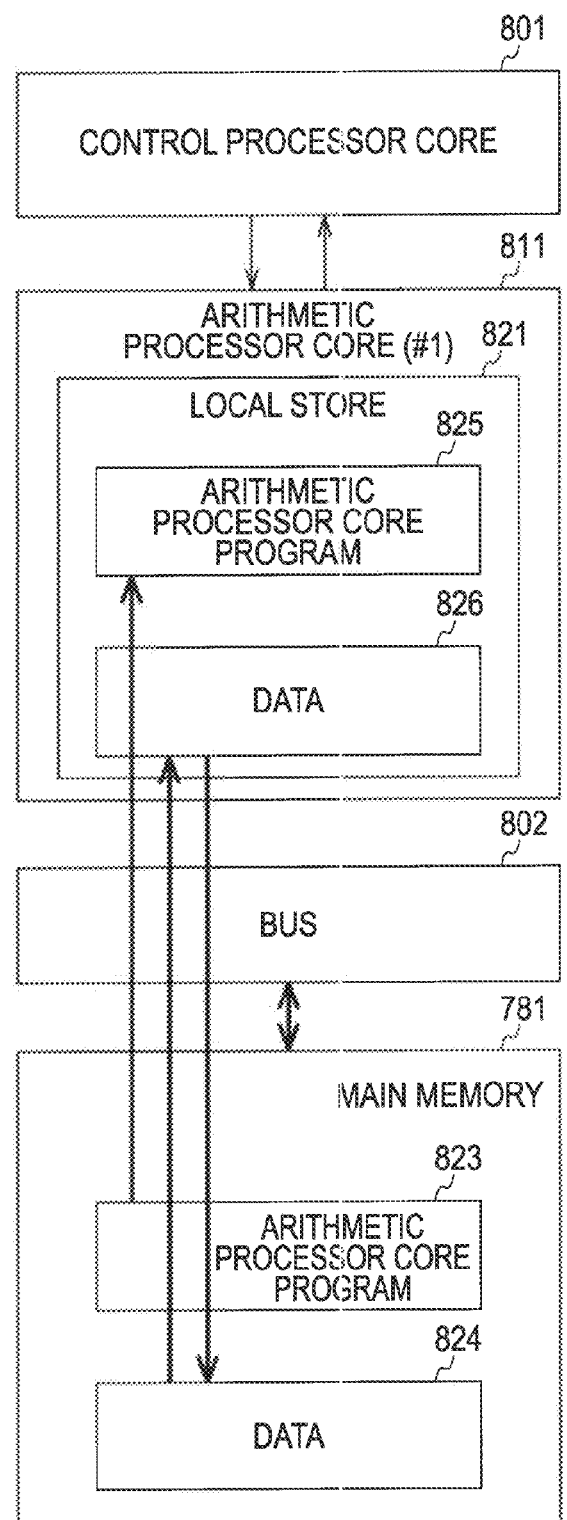
FIG. 41 is a diagram schematically showing programs and the flow of data in the case where operations are performed by the multi-core processor 800 in the embodiment of the present invention.

FIG. 41 is a diagram schematically showing programs and the flow of data in the case where operations are performed by the multi-core processor 800 in the embodiment of the present invention. Here, the description concerns, among the arithmetic processor cores (#1) 811 to (#8) 818, the arithmetic processor core (#1) 811 by way of example. However, the operations can be similarly performed using the arithmetic processor cores (#2) 812 to (#8) 818.

At first, the control processor core 801 sends, to the arithmetic processor core (#1) 811, an instruction to load an arithmetic processor core program 823 stored in the main memory 781 to the local store 821 of the arithmetic processor core (#1) 811. Accordingly, the arithmetic processor core (#1) 811 loads the arithmetic processor core program 823 stored in the main memory 781 to the local store 821.

Then, the control processor core 801 instructs the arithmetic processor core (#1) 811 to execute an arithmetic processor core program 825 stored in the local store 821.

Then, the arithmetic processor core (#1) 811 transfers, from the main memory 781 to the local store 821, data 824 needed for executing and processing the arithmetic processor core program 825 stored in the local store 821.

Then, on the basis of the arithmetic processor core program 825 stored in the local store 821, the arithmetic processor core (#1) 811 processes data 826 transferred from the main memory 781, executes processing in accordance with conditions, and stores the processing result in the local store 821.

Then, the arithmetic processor core (#1) 811 transfers, from the local store 821 to the main memory 781, the processing result of the processing executed on the basis of the arithmetic processor core program 825 stored in the local store 821.

Then, the arithmetic processor core (#1) 811 notifies the control processor core 801 of termination of the arithmetic processing.

Next, a SIMD operation performed using the multi-core processor 800 will be described in detail with reference to the drawings. Here, a SIMD operation is an arithmetic scheme that performs processing of a plurality of items of data using a single command.

FIG. 42(a) is a diagram schematically showing the outline of an arithmetic scheme of performing processing of a plurality of items of data using individual commands. The arithmetic scheme shown in FIG. 42(a) is a normal arithmetic scheme and is called, for example, a scalar operation. For example, a command to add data "A1" and data "B1" gives a processing result of data "C1". Also, the other three operations can be similarly performed. A command to add items of data "A2", "A3", and "A4" and items of data "B2", "B3", and "B4" in the same row is performed in each process. With this command, values in each row are added and processed, and the processing results are obtained as "C2", "C3", and "C4". As above, in a scalar operation, for processing of a plurality of items of data, it is necessary to execute a command for processing of each item of data.

FIG. 42(b) is a diagram schematically showing the outline of a SIMD operation, which is an arithmetic scheme that performs processing of a plurality of items of data using a single command. Here, groups of items of data for a SIMD operation (items of data enclosed by dotted lines 827 and 828) may be called items of vector data. Also, a SIMD operation performed using such vector data may be called a vector operation.

For example, a single command to add vector data enclosed by dotted lines 827 ("A1", "A2", "A3", and "A4") and vector data enclosed by dotted lines 828 ("B1", "B2", "B3", and "B4") gives a processing result of "C1", C2", "C3", and "C4" (items of data enclosed by dotted lines 829). As above, since processing of a plurality of items of data can be performed using a single command in a SIMD operation, arithmetic processing can be quickly performed. Also, a command for these SIMD operations is executed by the control processor core 801 in the multi-core processor 800, and, for arithmetic processing of items of data in response to the command, the arithmetic processor cores (#1) 811 to (#8) 818 perform parallel processing.

In contrast, for example, processing to perform addition of data "A1" and "B1", subtraction of data "A2" and "B2", multiplication of data "A3" and "B3", and division of data "A4" and "B4" cannot be performed by a SIMD operation.

That is, when different processing is to be done on a plurality of items of data, processing cannot be performed by a SIMD operation.

Next, a specific arithmetic method of a SIMD operation in the case where a feature-point extracting process and an optical-flow calculating process are performed will be described in detail with reference to the drawings.

Figure 43:
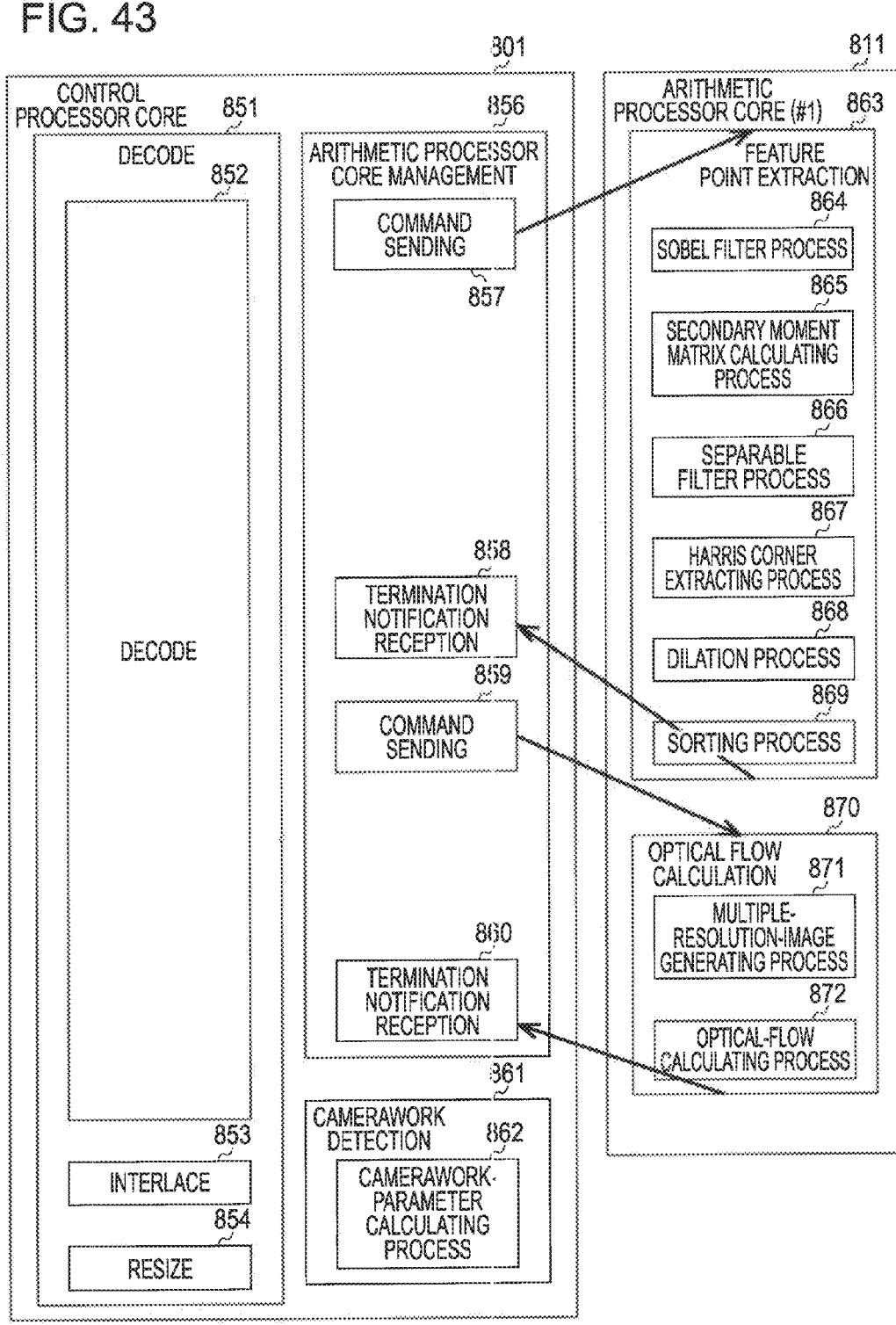
FIG. 43 is a diagram showing a structure example of a program executed by the control processor core 801 or the arithmetic processor core (#1) 811 in the embodiment of the present invention.

FIG. 43 is a diagram showing a structure example of a program executed by the control processor core 801 or the arithmetic processor core (#1) 811 in the embodiment of the present invention. Here, only the arithmetic processor core (#1) 811 is illustrated. However, similar processing is performed by the arithmetic processor cores (#2) 812 to (#8) 818.

The control processor core 801 executes, as decoding 851, decoding 852, interlacing 853, and resizing 854. The decoding 852 is a process to decode a moving image file. The interlacing 853 is a process to deinterlace each decoded frame. The resizing 854 is a process to reduce the size of each deinterlaced frame.

Also, the control processor core 801 executes, as arithmetic processor core management 856, command sending 857 and 859 and termination notification reception 858 and 860. The command sending 857 and 859 is a process to send a command to execute a SIMD operation to the arithmetic processor cores (#1) 811 to (#8) 818. The termination notification reception 858 and 860 is a process to receive, from the arithmetic processor cores (#1) 811 to (#8) 818, a termination notification of a SIMD operation in response to the above-described command. Furthermore, the control processor core 801 executes, as camerawork detection 861, a camerawork-parameter calculating process 862. The camerawork-parameter calculating process 862 is a process to calculate affine transformation parameters on a frame-by-frame basis on the basis of optical flows calculated by a SIMD operation performed by the arithmetic processor cores (#1) 811 to (#8) 818.

The arithmetic processor core (#1) 811 executes, as a feature-point extracting process 863, a Sobel filter process 864, a secondary moment matrix (Second Moment Matrix) process 865, a separable filter process 866, a Harris corner point extracting (Calc Harris) process 867, a dilation process 868, and a sorting process 869.

The Sobel filter process 864 is a process to calculate a value dx in the x direction obtained by using a P2 filter (x direction), and a value dy in the y direction obtained by using a filter in the Y direction. Note that calculation of the value dx in the x direction will be described in detail with reference to FIG. 44 to FIG. 47.

The secondary moment matrix process 865 is a process to calculate individual values $dx^2$, $dy^2$, and $dx \cdot dy$ by using dx and dy calculated by the Sobel filter process 864.

The separable filter process 866 is a process to apply a Gaussian filter (blurring process) to $dx^2$, $dy^2$, and $dx \cdot dy$ obtained by the secondary moment matrix process 865.

The Harris corner point extracting process 867 is a process to calculate the score for Harris corners using the individual values $dx^2$, $dy^2$, and $dx \cdot dy$ to which the blurring process is applied by the separable filter process 866. The score S for Harris corners is calculated by, for example, the following equation.

$$S=(dx^2 \times dy^2 - dx \cdot dy \times dx \cdot dy)/(dx^2+dy^2+\epsilon)$$

The dilation process 868 is a process to perform a blurring process of an image constituted by the scores for Harris corners, which are calculated by the Harris corner point extracting process 867.

The sorting process 869 is a process of sorting pixels in descending order of the scores for Harris corners, which are calculated by the Harris corner point extracting process 867, picking up a predetermined number, starting from the highest score, and extracting the picked up points as feature points.

The arithmetic processor core (#1) 811 executes, as an optical-flow computing process 870, a multiple-resolution-image generating (Make Pyramid Image) process 871 and an optical-flow calculating (Calc Optical Flow) process 872.

The multiple-resolution-image generating process 871 is a process to sequentially generate size-reduced images obtained by reducing, at multiple levels, the image size of an image at the time of image capturing using a camera. The generated images are called multiple-resolution images.

The optical-flow calculating process 872 is a process to calculate optical flows in an image with the lowest resolution, among multiple-resolution images generated by the multiple-resolution-image generating process 871, and, using the calculated result, calculate again optical flows in an image with the next higher resolution. This series of processes is repeatedly performed until an image with the highest resolution is reached.

As above, for example, for the feature-point extracting process performed by the feature-point extracting unit 121 shown in FIG. 1 and the like and the optical-flow calculating process performed by the optical-flow calculating unit 122, processing results can be obtained by performing a SIMD operation using the multi-core processor 800 performing parallel processing. Note that the feature-point extracting process and the optical-flow calculating process shown in FIG. 43 and the like are only exemplary. A SIMD operation may be performed using the multi-core processor 800 performing other processing implemented by various filtering processes, threshold processes, and the like performed on images constituting a moving image.

FIG. 44 includes diagrams schematically showing the data structure and the flow of a process in the case where a filtering process is performed using a Sobel filter 830 on image data stored in the main memory 781 (image data corresponding to one frame included in a moving image captured by a camera) in the embodiment of the present invention. Note that image data stored in the main memory 781 shown in the drawing is simplified and shown as having 32 horizontal pixels. Also, the Sobel filter 830 is a 3×3 edge extraction filter. As shown in the diagram, a filtering process of image data stored in the main memory 781 is performed using the Sobel filter 830, and the result of the filtering process is output. In this example, an example where four filtering results are obtained at the same time using a SIMD operation will be described.

Figure 45:
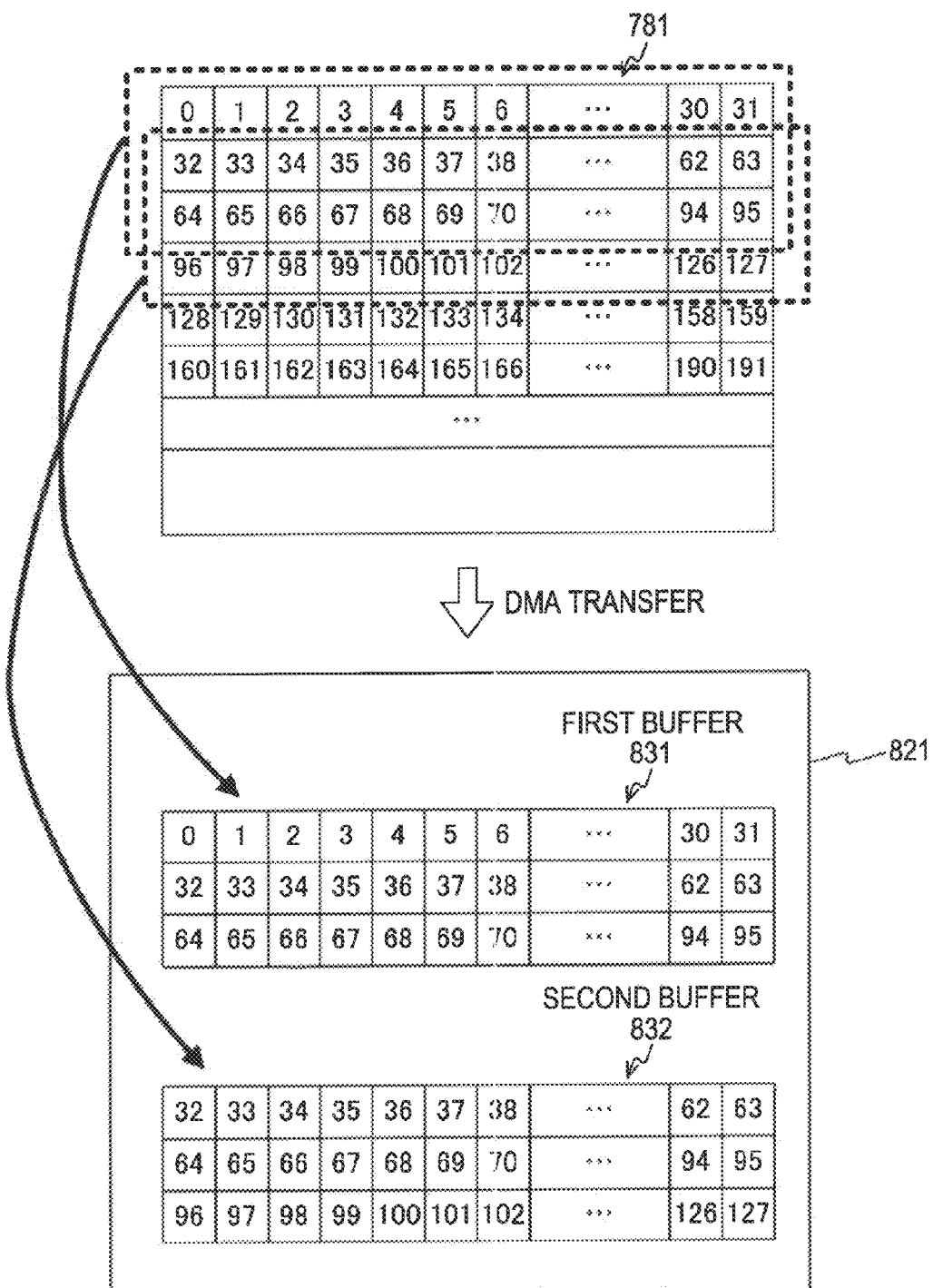
FIG. 45 is a diagram schematically showing the flow of data in the case where a SIMD operation is performed using the Sobel filter 830 on the image data stored in the main memory 781 in the embodiment of the present invention.

FIG. 45 is a diagram schematically showing the flow of data in the case where a SIMD operation is performed using the Sobel filter 830 on the image data stored in the main memory 781 in the embodiment of the present invention. At first, a predetermined number of lines (e.g., three lines), including the first line, of image data stored in the main memory 781 are DMA (Direct Memory Access)-transferred to a first buffer 831 included in the local store 821 of an arithmetic processor core. Additionally, the lines that have been DMA-transferred to the first buffer 831 are individually shifted one line down, and the next predetermined number of lines are DMA-transferred to a second buffer 832. As above, delay due to DMA transfer can be concealed by using double buffers.

Figure 46:
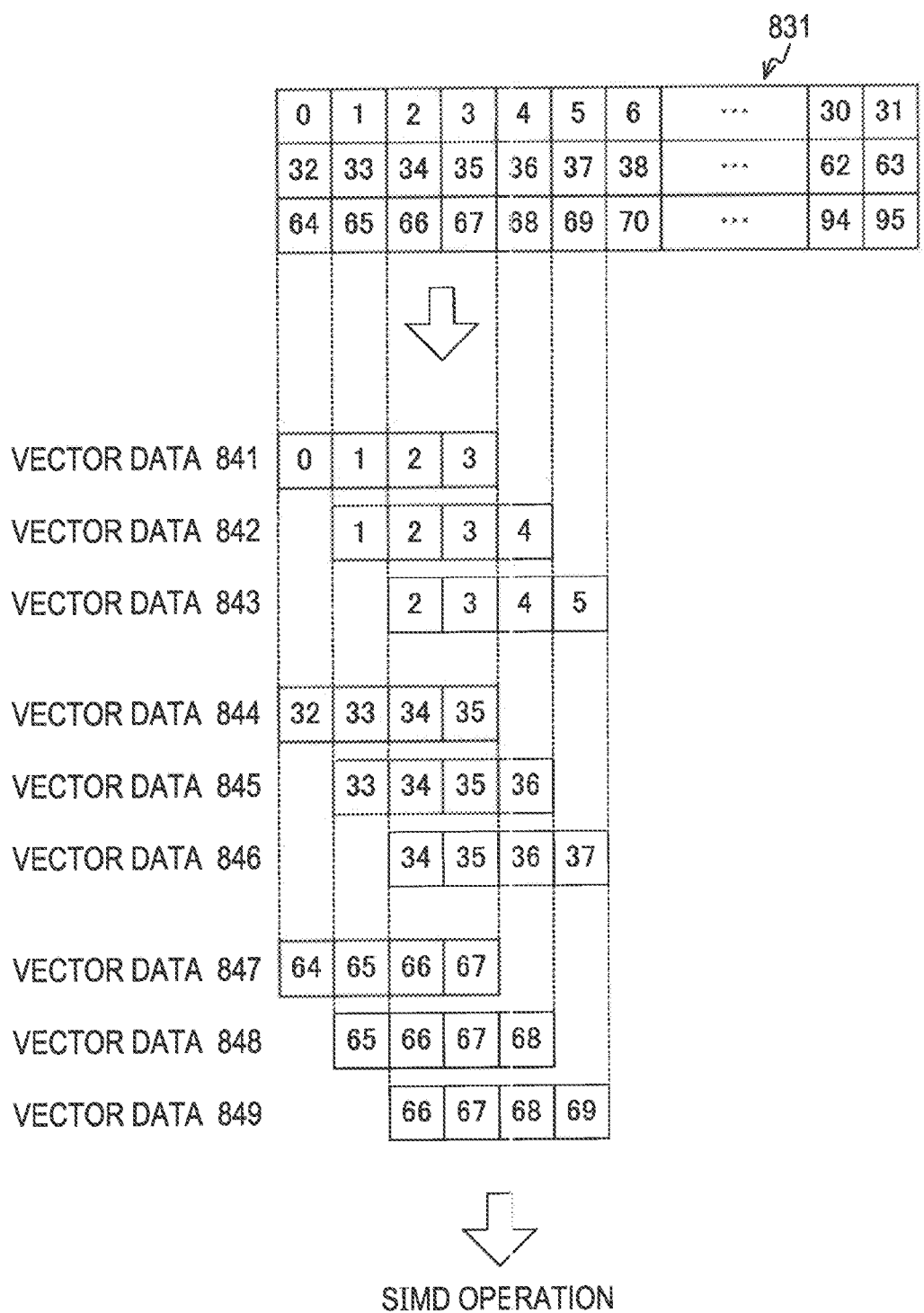
FIG. 46 is a diagram schematically showing a vector generating method of generating nine vectors from image data stored in a first buffer 831 in the case where a filtering process is performed using the Sobel filter 830 in the embodiment of the present invention.

FIG. 46 is a diagram schematically showing a vector generating method of generating nine vectors from image data stored in the first buffer 831 in the case where a filtering process is performed using the Sobel filter 830 in the embodiment of the present invention. As shown in FIG. 45, after DMA transfer is performed, nine vectors are generated from image data stored in the first buffer 831. Specifically, vector data 841 is generated from four items of data, starting from the left-hand corner, of one line of image data stored in the first buffer 831. These four items of data are shifted one to the right, and, from the next four items of data, vector data 842 is generated. Similarly, the four items of data are shifted one to the right, and, from the next four items of data, vector data 843 is generated. Also, items of vector data 844 to 849 are similarly generated individually from four items of data of the second line and the third line.

FIG. 47 is a diagram schematically showing a vector operation method of performing vector operations using SIMD commands on the items of vector data 841 to 849 in the case where a filtering process is performed using the Sobel filter 830 in the embodiment of the present invention. Specifically, SIMD operations are sequentially performed on the items of vector data 841 to 843, and a vector A is obtained. In the SIMD operations, at first, a SIMD operation of "'−1'בvector data 841'" is performed. Then, a SIMD operation of "'0'בvector data 842'" is performed, and a SIMD operation of "'1'בvector data 843'" is performed. Here, since the operation result of "'0'בvector data 842'" has been determined to be "0", this operation may be omitted. Also, since the operation result of "'1'בvector data 843'" has been determined to be the same value as the "vector data 843", this operation may be omitted.

Then, an addition process of the operation result of "'−1'בvector data 841'" and the operation result of "'0'בvector data 842'" is performed using a SIMD operation. Then, an addition process of the result of this addition process and the operation result of "'1'בvector data 843'" is performed using a SIMD operation. Here, for example, an operation on the data structure "vector data 1"×"vector data 2"+"vector data 3" can be performed using SIMD operations. Therefore, for an operation for the vector A, for example, SIMD operations of "'0'בvector data 842'" and "'1'בvector data 843'" may be omitted, and "'−1'בvector data 841'+'vector data 843'" may be performed using a single SIMD operation.

Also, similarly, SIMD operations are performed on the items of vector data 844 to 846, and a vector B is obtained. SIMD operations are performed on the items of vector data 847 to 849, and a vector C is obtained.

Then, a SIMD operation of the vectors A to C obtained by the SIMD operations is performed, and a vector D is obtained. As above, the results, the number of which is the number of components of a vector (four items of data in this example), can be obtained at the same time by performing a SIMD operation.

After the vector D is calculated, the position of data to be taken out is shifted one to the right in the image data stored in the first buffer 831 shown in FIG. 45, and similar processes are repeatedly executed, thereby sequentially calculating individual vectors D. When the processing of an item at the right end of the image data stored in the first buffer 831 shown in FIG. 45 is completed, the processing results are DMA-transferred to the main memory 781.

Then, of image data stored in the main memory 781, individual lines that are DMA-transferred to the second buffer 832 are shifted one down, and the next predetermined number of lines are DMA-transferred to the first buffer 831. Additionally, the above-described processes are repeatedly performed on image data stored in the second buffer 832. Similar processes are repeatedly performed until, among the individual lines of image data stored in the main memory 781, a line at the bottom end is reached.

Similarly, the major part of processing of feature point extraction and optical flow calculation is performed using SIMD operations, whereby an increase in the speed can be realized.

Figure 48:
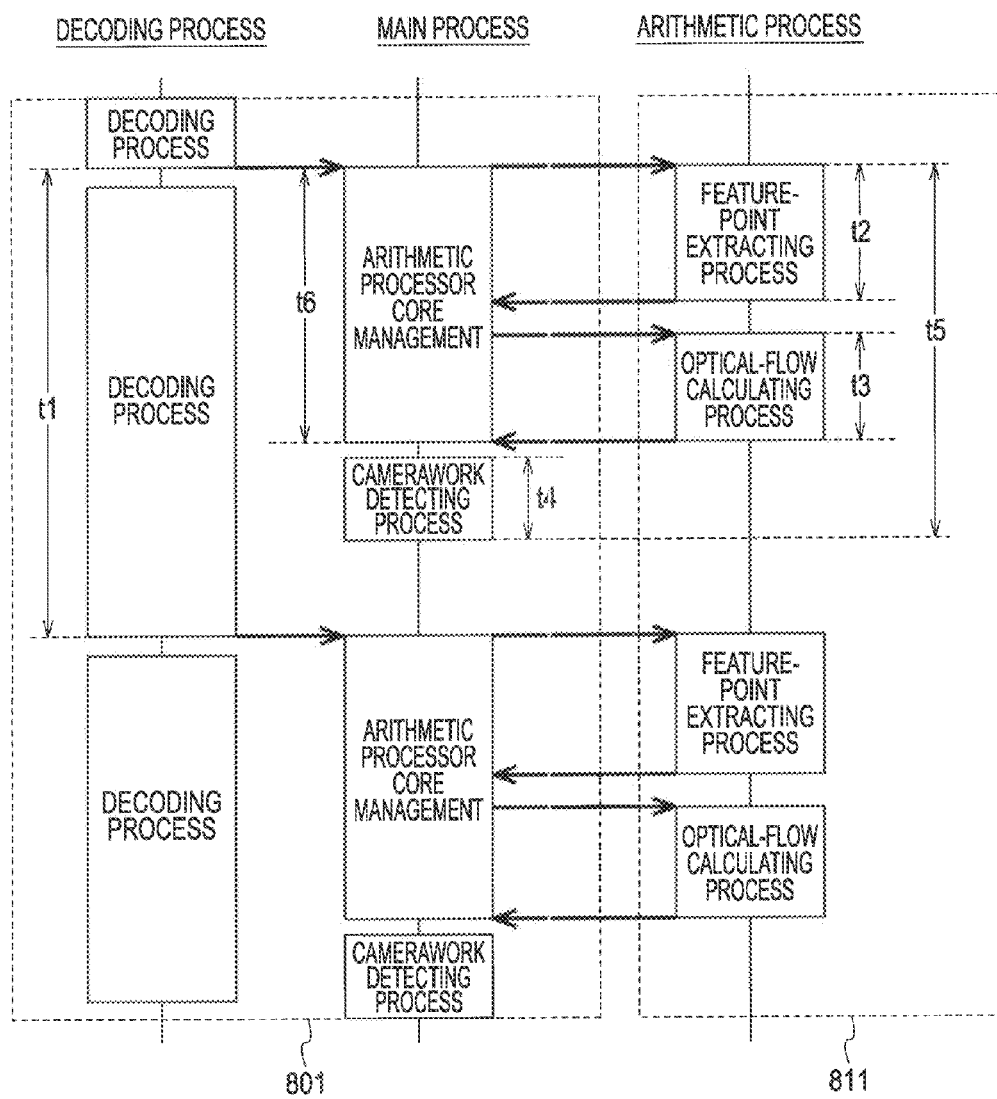
FIG. 48 is a diagram schematically showing the flow of a camerawork-parameter calculating process in time series in the embodiment of the present invention.

FIG. 48 is a diagram schematically showing the flow of a camerawork-parameter calculating process in time series in the embodiment of the present invention. As has been described above, for example, decoding and analysis processing of a moving image can be performed in parallel by performing SIMD operations using the multi-core processor 800. Therefore, the analysis time of one frame included in a moving image can be reduced to be shorter than the decoding time.

For example, in the diagram, t1 denotes a time required for the control processor core 801 to perform a decoding process of one frame included in a moving image; t2 denotes a time required for the arithmetic processor cores (#1) 811 to (#8) 818 to perform a feature-point extracting process of one frame included in a moving image; t3 denotes a time required for the arithmetic processor cores (#1) 811 to (#8) 818 to perform an optical-flow calculating process of one frame included in a moving image; and t4 denotes a time required for the control processor core 801 to perform a camerawork detecting process of one frame included in a moving image. Note that t5 denotes a time required for the control processor core 801 and the arithmetic processor cores (#1) 811 to (#8) 818 to perform a camerawork detecting process of one frame included in a moving image. Also, t6 denotes a time required for the control processor core 801 to perform a process of managing the arithmetic processor cores (#1) 811 to (#8) 818. For example, t1 can be set to "25.0 ms", t2 can be set to "7.9 ms", t3 can be set to "6.7 ms" t4 can be set to "1.2 ms", and t5 can be set to "15.8 ms".

Next, the case where moving image content is played using a meta-data file in an embodiment of the present invention will be described in detail with reference to the drawings.

Figure 49:
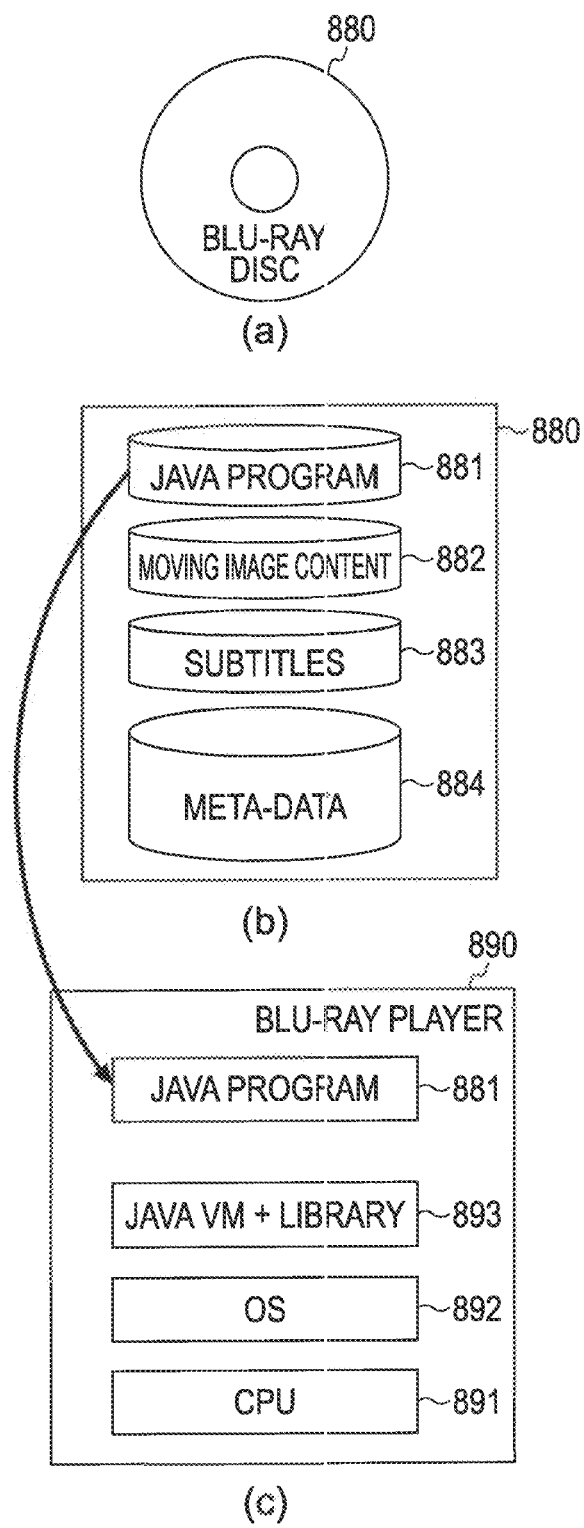
FIG. 49 includes a diagram schematically showing a Blu-ray Disc 880 which is an example of a recording medium, a diagram schematically showing items of data 881 to 884 recorded on the Blu-ray Disc 880, and a diagram schematically showing the internal structure of a Blu-ray player 890 that can play the Blu-ray Disc 880.

FIG. 49(a) is a top view schematically showing a Blu-ray Disc (registered trademark) 880 which is an example of a recording medium, and FIG. 49(b) is a diagram schematically showing items of data 881 to 884 recorded on the Blu-ray Disc 880. On the Blu-ray Disc 880, for example, together with moving image content 882 which is a moving image captured by a camera or the like, subtitles 883 of the moving image content 882, and meta-data obtained by analyzing the moving image content 882 (e.g., items of information shown in FIG. 2, FIG. 3, FIG. 26, and FIG. 36(b)) 884, a Java (registered trademark) program 881 relating to playback of a moving image in the embodiment of the present invention is recorded.

FIG. 49(c) is a diagram schematically showing the internal structure of a Blu-ray player (Blu-ray Disc Player) 890 that can play the Blu-ray Disc 880. Here, since the Blu-ray player 890 capable of playing a Blu-ray disc includes, as a standard, besides a CPU 891 and an OS 892, a Java (registered trademark) VM (Java (registered trademark) virtual machine) and library 893, the Blu-ray player 890 can execute a Java (registered trademark) program. Therefore, by mounting the Blu-ray Disc 880 into the Blu-ray player 890, the Blu-ray player 890 can load and execute the Java (registered trademark) program 881. Accordingly, when playing the moving image content 882, the Blu-ray player 890 can display a panoramic image corresponding to a moving image in the embodiment of the present invention, search for a moving image from among a plurality of moving images, and the like, using the meta-data 884. That is, playback of a moving image in the embodiment of the present invention can be realized on all Blu-ray players without using dedicated PC software or the like.

As has been illustrated above, according to the embodiments of the present invention, when a moving image shot by an image capturing apparatus is to be viewed, a panoramic image corresponding to the moving image can be displayed, whereby the details of each moving image can be easily understood. Also, when a desired moving image is to be retrieved from among a plurality of moving images, a search can be conducted by referring to panoramic size-reduced images, whereby a desired moving image can be quickly detected. Furthermore, since a moving image can be played, starting from a desired position, by selecting an arbitrary position on a panoramic image, a search within a moving image can be quickly performed.

Also, when index images are to be extracted from a moving image, the index images can be extracted on the basis of spatial positions, whereby the index images based on which the details of the moving image can be easily understood can be extracted. Also, the playback position of a moving image can be more easily specified by spatially arranging, on a panoramic image, index images extracted from the moving image. As above, since a search can be conducted using index images, a place in an image shooting space for a desired frame in a moving image can be specified and quickly detected.

Also, spatial information and temporal information at the time of shooting a moving image can be visually and easily understood by displaying index images virtually arranged in a three-dimensional space, whereby the details of shooting the moving image can be quickly understood on the basis of these items of information. Also, a search can be easily conducted in the case where a moving image is to be played.

That is, a moving image can be appreciated with fun using a panoramic image or index images that spatially expand the moving image using past frames. Accordingly, for example, a viewer can play a moving image while looking at a panoramic image or index images that are arranged in a three-dimensional space, whereby the viewer can appreciate the moving image with much fun.

Also, according to the embodiments of the present invention, affine transformation parameters of one frame can be calculated within a decoding process time of one frame by calculating affine transformation parameters using SIMD operations by using a multi-core processor. Accordingly, generation of a panoramic image, extraction of index images, and the like can be quickly performed.

Note that a composite image generated by the combining in steps S926, S954, and the like may be recorded on a recording medium or the like so that the composite image may be used for other types of playback and display. Also, in the embodiments of the present invention, the example in which images are combined using pre-calculated affine transformation parameters has been described. However, affine transformation parameters may be calculated at the time of combining images, and, using the calculated affine transformation parameters, the images may be combined.

Also, in the embodiments of the present invention, the example in which a composite image is generated by repeating a composite-image generating process on all frames constituting an input moving image file has been described. However, a composite image may be generated by repeating a composite-image generating process on at least a certain number of frames among the frames constituting an input image file, and the composite image may be recorded in the representative-image storage unit 220. Also, in the embodiments of the present invention, the example in which a composite image is generated by repeating a composite-image generating process, starting from the head frame included in a moving image, has been described. However, for example, a composite image may be generated by repeating a composite-image generating process, starting from the last frame toward the head frame.

Also, in the embodiments of the present invention, the case in which the camera movement is obtained in the case where the size of a moving object is relatively small with respect to the area of an image included in a moving image, and, using the camera movement, the moving image is played has been described. However, the embodiments of the present invention are also applicable to the case where the size of a moving image is relatively large with respect to the area of an image included in a moving image. For example, when an image of a train departing from a station is captured, with the train serving as a central subject of the image, so that the proportion of the train with respect to the image area becomes large, if the above-described affine transformation parameters are calculated, the movement of the train is calculated. In this case, using the train movement, a composite image can be generated by the above-described composite-image generating method. As above, movement information regarding the amount of movement of a camera relative to the amount of movement of a subject at the time of capturing an image can be calculated and used as transformation information for transforming images constituting a moving image.

Also, in the embodiments of the present invention, an image processing apparatus that displays a composite image or index images on a display unit has been described by way of example. However, the embodiments of the present invention are applicable to an image processing apparatus that has image output means for outputting image information for displaying a composite image or index images on another image display apparatus. Furthermore, the embodiments of the present invention are applicable to a moving-image playing apparatus capable of playing a moving image, an image capturing apparatus such as a digital video camera capable of playing a shot moving image, and the like.

Also, in the embodiments of the present invention, an image processing apparatus has been described by way of example. However, the embodiments of the present invention are applicable to a moving-image playing apparatus capable of playing a moving image, or the like. Also, in the embodiments of the present invention, a moving image captured by a camera has been described. However, for example, the embodiments of the present invention are applicable to an edited moving image in the case where a moving image captured by a camera is edited, a moving image partially added with animation or the like, or the like.

Note that the embodiments of the present invention are illustrated by way of example to realize the present invention. Although there is a correspondence between the embodiments and the features of the claims, which will be described below, the present invention is not limited thereto, and various modifications can be made without departing from the gist of the present invention.

That is, in claim 1 or 15, moving-image storage means corresponds to, for example, the moving-image storage unit 200 or 660. Also, image holding means corresponds to, for example, the image memory 170. Also, transformation-information calculating means corresponds to, for example, the camerawork detecting unit 120. Also, image transforming means corresponds to, for example, the image transforming unit 160. Also, image combining means corresponds to, for example, the image combining unit 180. Also, image-position obtaining means corresponds to, for example, the image-position obtaining unit 190. Also, image-position storage means corresponds to, for example, the image-position storage unit 210. Also, display means corresponds to, for example, the display unit 260. Also, operation accepting means corresponds to, for example, the operation accepting unit 230. Also, display control means corresponds to, for example, the display control unit 250.

Also, in claim 2, selecting means corresponds to, for example, the selecting unit 240.

Also, in claim 4 or 5, representative-image storage means corresponds to, for example, the representative-image storage unit 220.

Also, in claim 6, moving-image input means corresponds to, for example, the moving-image input unit 110. Also, transformation-information calculating means corresponds to, for example, the camerawork detecting unit 120. Also, image transforming means corresponds to, for example, the image transforming unit 160. Also, index-image storage means corresponds to, for example, the index-image storage unit 280. Also, index-image extracting means corresponds to, for example, the index-image extracting unit 270.

Also, in claim 10 or 11, display control means corresponds to, for example, the display control unit 251.

Also, in claim 12, moving-image storage means corresponds to, for example, the moving-image storage unit 200. Also, operation accepting means corresponds to, for example, the operation accepting unit 230. Also, selecting means corresponds to, for example, the selecting unit 241.

Also, in claim 13, image holding means corresponds to, for example, the image memory 170. Also, image combining means corresponds to, for example, the image combining unit 181. Also, representative-image storage means corresponds to, for example, the representative-image storage unit 225.

Also, in claim 14, moving-image storage means corresponds to, for example, the moving-image storage unit 200. Also, display means corresponds to, for example, the display unit 260. Also, operation accepting means corresponds to, for example, the operation accepting unit 230. Also, selecting means corresponds to, for example, the selecting unit 241. Also, display control means corresponds to, for example, the display control unit 251.

Also, in claim 16 or 17, a transformation-information calculating step corresponds to, for example, steps S903 to S913. Also, an image transforming step corresponds to, for example, step S925. Also, an image combining step corresponds to, for example, steps S926 and S954. Also, an image-position obtaining step corresponds to, for example, step S927. Also, a step of storing in image-position storage means corresponds to, for example, step S927. Also, a display step corresponds to, for example, step S942. Also, an operation accepting step corresponds to, for example, step S945. Also, a display control step corresponds to, for example, step S947.

Note that the processing procedures described in the embodiments of the present invention may be considered as a method having the series of procedures or may be considered as a program for allowing a computer to execute the series of procedures or as a recording medium having the program recorded thereon.

According to the present invention, a great advantage that the details of a moving image shot by an image capturing apparatus can be easily understood can be achieved.

The invention claimed is:

1. An image processing apparatus comprising:
a moving-image storage unit configured to store a captured moving image captured by an image capturing apparatus;
an image holding unit configured to hold captured images constituting the captured moving image as history images;
a transformation-information calculating unit configured to calculate transformation information for transforming, with reference to at least one captured image among the captured images, another captured image;
an image transforming unit configured to transform the captured image on the basis of the calculated transformation information;
an image combining unit configured to combine the transformed captured image with the history images to generate a new history image and causing the image holding unit to hold the new history image;
an image-position obtaining unit configured to obtain a coordinate position of the transformed captured image in the history image generated by the image combining unit;
an image-position storage unit configured to store the obtained coordinate position and the captured image in association with each other;
a display unit configured to display the history image as a representative image that represents the captured moving image;
an operation accepting unit configured to accept a selecting operation of selecting a position in the displayed representative image; and
a display control unit configured to play, on the basis of the selected position in the representative image, the captured moving image stored in the moving-image storage unit, starting from a captured image corresponding to the selected position.

2. The image processing apparatus according to claim 1, wherein the image-position obtaining unit obtains a center position of the transformed captured image as the coordinate position, the image-position storage unit stores the obtained center position and the captured image in association with each other, and the image processing apparatus further comprises a selecting unit configured to select the captured image corresponding to the selected position by selecting, from among center positions stored in the image-position storage unit, a center position that is closest to the selected position in the representative image.

3. The image processing apparatus according to claim 2, wherein the image-position obtaining unit obtains the center position of the transformed captured image and a size thereof as the coordinate position, the image-position storage unit stores the obtained center position and size and the captured image in association with each other, and the selecting unit selects, when a plurality of center positions that are closest to the selected position in the representative image are detected among the center positions stored in the image-position storage unit, the captured image corresponding to the selected position by comparing sizes corresponding to the plurality of detected center positions.

4. The image processing apparatus according to claim 1, wherein the transformation-information calculating unit sequentially calculates the transformation information for each of frames constituting the captured moving image, the image transforming unit sequentially transforms the captured images for each of the frames, the image combining unit sequentially combines, for each of the frames, the transformed captured image with the history images and generates a new history image, the image holding unit sequentially holds the new history image for each of the frames, and the image processing apparatus further comprises a representative-image storage unit configured to store, as the representative image, the history image generated by combining images corresponding to at least a certain number of frames among the frames constituting the captured moving image.

5. The image processing apparatus according to claim 1, wherein the image combining unit generates a size-reduced image of the representative image, the image processing apparatus further comprises a representative-image storage unit configured to store the representative image and the size-reduced image in association with each other, and the display control unit displays the size-reduced image stored in the representative-image storage means as a selectable image in a list.

6. A moving-image playing apparatus comprising:
a moving-image storage unit configured to store a captured moving image captured by an image capturing apparatus;
an image holding unit configured to hold captured images constituting the captured moving image as history images;
a transformation-information calculating unit configured to calculate transformation information for transforming, with reference to at least one captured image among the captured images, another captured image;
an image transforming unit configured to transform the captured image on the basis of the calculated transformation information;
an image combining unit configured to combine the transformed captured image with the history images to generate a new history image and causing the image holding unit to hold the new history image;
an image-position obtaining unit configured to obtain a coordinate position of the transformed captured image in the history image generated by the image combining unit;
an image-position storage unit configured to store the obtained coordinate position and the captured image in association with each other;
a display unit configured to display the history image as a representative image that represents the captured moving image;
an operation accepting unit configured to accept a selecting operation of selecting a position in the displayed representative image; and
a display control unit configured to play, on the basis of the selected position in the representative image, the captured moving image stored in the moving-image storage unit, starting from a captured image corresponding to the selected position.

7. An image processing method in an image processing apparatus including a moving-image storage unit configured to store a captured moving image captured by an image capturing apparatus and an image holding unit configured to hold captured images constituting the captured moving image as history images, comprising:
calculating transformation information for transforming, with reference to at least one captured image among the captured images, another captured image;
transforming the captured image on the basis of the calculated transformation information;
combining the transformed captured image with the history images to generate a new history image and causing the image holding unit to hold the new history image;
obtaining a coordinate position of the transformed captured image in the history image generated by the combining;
storing the obtained coordinate position and the captured image in association with each other in an image-position storage unit;
displaying the history image as a representative image that represents the captured moving image;
accepting a selecting operation of selecting a position in the displayed representative image; and
playing, on the basis of the selected position in the representative image, the captured moving image stored in the moving-image storage unit, starting from a captured image corresponding to the selected position.

8. A non-transitory computer readable medium encoded with computer readable instructions which when loaded in a processor of an image processing apparatus including a moving-image storage unit configured to store a captured moving image captured by an image capturing apparatus and an image holding unit configured to hold captured images constituting the captured moving image as history images, cause the processor to perform a method comprising:
calculating transformation information for transforming, with reference to at least one captured image among the captured images, another captured image;
transforming the captured image on the basis of the calculated transformation information;
combining the transformed captured image with the history images to generate a new history image and causing the image holding unit to hold the new history image;
obtaining a coordinate position of the transformed captured image in the history image generated by the combining;
storing the obtained coordinate position and the captured image in association with each other in an image-position storage unit;
displaying the history image as a representative image that represents the captured moving image;
accepting a selecting operation of selecting a position in the displayed representative image; and
playing, on the basis of the selected position in the representative image, the captured moving image stored in the moving-image storage unit, starting from a captured image corresponding to the selected position.

9. An apparatus for controlling display of a panoramic moving image which is generated by combining different frames of an input moving image, the different frames having overlapping positions, the apparatus comprising:
a display image generation unit configured to generate the panoramic moving image for each frame of the input moving image by combining each input frame of the input moving image with a history image which corresponds to a previous frame of the panoramic moving image by aligning positions between the history image and the input frame of the input moving image;
a selecting unit configured to specify a frame from the input moving image in response to a user selected position in a displayed still image which encompasses a wider field of view than that of a single frame of the input moving image, and
a control unit configured to control a display image generation unit to output each frame of the panoramic motion image for display so that the panoramic motion image is displayed from a frame corresponding to the user selected position.

10. The apparatus according to claim 9, wherein the selecting unit specifies a three dimensional frame in the displayed image including a plurality of three dimensional frames.

11. The apparatus according to claim 10, wherein the selecting unit specifies a front side of the three dimensional frame in the displayed image including a front side of the plurality of three dimensional frames.

12. The apparatus according to claim 10, wherein the selecting unit specifies an upper side of the three dimensional frame in the displayed image including an upper side of the plurality of three dimensional frames.

13. The apparatus according to claim 9, wherein the displayed image is generated by combining index images each extracted from the input moving image.

14. The apparatus according to claim 13, wherein the index images are extracted based on a rate of overlap between each frame of the input motion image and a previously extracted index image.

15. The apparatus according to claim 9, wherein the displayed image encompasses field of view covering field of view of all frames of the input moving image.

16. A method for controlling display of a panoramic moving image which is generated by combining different frames of an input moving image, the different frames having overlapping positions, the method comprising:
generating the panoramic moving image for each frame of the input moving image by combining each in input frame of the in input moving image with a history image which corresponds to a previous frame of the panoramic moving image by aligning positions between the history image and the input frame of the input moving image;
specifying a frame from the input moving image in response to a user selected position in a displayed still image which encompasses a wider field of view than that of a single frame of the input moving image, and
controlling a display image generation unit to output each frame of the panoramic motion image for display so that the panoramic motion image is displayed from a frame corresponding to the user selected position.

17. A non-transitory computer readable medium encoded with computer readable instructions which when loaded in a processor of an apparatus causes the processor to perform a method for controlling display of a panoramic moving image which is generated by combining different frames of an input moving image, the different frames having overlapping positions, the method comprising:
generating the panoramic moving image for each frame of the input moving image by combining each input frame of the input moving image with a history image which corresponds to a previous frame of the panoramic moving image by aligning positions between the history image and the input frame of the input moving image;
specifying a frame from the input moving image in response to a user selected position in a displayed still image which encompasses a wider field of view than that of a single frame of the input moving image, and
controlling a display image generation unit to output each frame of the panoramic motion image for display so that the panoramic motion image is displayed from a frame corresponding to the user selected position.

* * * * *